United States Patent
Rhoads et al.

(10) Patent No.: US 10,853,968 B2
(45) Date of Patent: Dec. 1, 2020

(54) WATERMARK SENSING METHODS AND ARRANGEMENTS

(71) Applicant: Digimarc Corporation, Beaverton, OR (US)

(72) Inventors: Geoffrey B. Rhoads, West Linn, OR (US); Utkarsh Deshmukh, Hillsboro, OR (US); John D. Lord, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 50 days.

(21) Appl. No.: 16/141,587

(22) Filed: Sep. 25, 2018

(65) Prior Publication Data

US 2019/0266749 A1 Aug. 29, 2019

Related U.S. Application Data

(60) Provisional application No. 62/643,101, filed on Mar. 14, 2018, provisional application No. 62/611,404, filed on Dec. 28, 2017, provisional application No. 62/581,523, filed on Nov. 3, 2017, provisional application No. 62/573,601, filed on Oct. 17, 2017, provisional application No. 62/565,659, filed on Sep. 29, 2017.

(51) Int. Cl.
| | |
|---|---|
| *G06K 9/36* | (2006.01) |
| *G06T 7/73* | (2017.01) |
| *G06T 7/00* | (2017.01) |
| *G06T 1/00* | (2006.01) |
| *G06T 5/00* | (2006.01) |

(52) U.S. Cl.
CPC ............ *G06T 7/74* (2017.01); *G06T 1/0021* (2013.01); *G06T 1/0064* (2013.01); *G06T 5/003* (2013.01); *G06T 7/97* (2017.01); *G06T 2201/0051* (2013.01); *G06T 2201/0061* (2013.01); *G06T 2201/0065* (2013.01); *G06T 2201/0081* (2013.01); *G06T 2201/0601* (2013.01)

(58) Field of Classification Search
USPC ....................................................... 382/291
See application file for complete search history.

(56) References Cited

U.S. PATENT DOCUMENTS

| | | | |
|---|---|---|---|
| 6,122,403 | A | 9/2000 | Rhoads |
| 6,307,949 | B1 | 10/2001 | Rhoads |
| 6,345,104 | B1 | 2/2002 | Rhoads |
| 6,408,082 | B1 | 6/2002 | Rhoads |
| 6,424,725 | B1 | 7/2002 | Rhoads |

(Continued)

*Primary Examiner* — Stephen P Coleman
(74) *Attorney, Agent, or Firm* — Digimarc Corporation

(57) ABSTRACT

The geometric pose of a patch of watermark data is estimated based on the position of a similar, but non-identical, patch of information within a data structure. The information in the data structure corresponds to a tiled array of calibration patterns that is sampled along at least three non-parallel paths. In a particular embodiment, the calibration patterns are sampled so that edges are globally-curved, yet locally-flat. Use of such information in the data structure enables enhanced pose estimation, e.g., speeding up operation, enabling pose estimation from smaller patches of watermark signals, and/or enabling pose estimation from weaker watermark signals. A great variety of other features and arrangements are also detailed.

20 Claims, 42 Drawing Sheets

(56) References Cited

U.S. PATENT DOCUMENTS

| | | |
|---|---|---|
| 6,483,927 B2 | 11/2002 | Brunk |
| 6,535,642 B1 | 3/2003 | De Bonet |
| 6,580,809 B2 | 6/2003 | Stach |
| 6,583,823 B1 * | 6/2003 | Shimada ............ H04N 5/21 348/607 |
| 6,590,996 B1 | 7/2003 | Reed |
| 6,631,198 B1 | 10/2003 | Hannigan |
| 6,681,029 B1 | 1/2004 | Rhoads |
| 6,724,914 B2 | 4/2004 | Brundage |
| 6,912,295 B2 | 6/2005 | Reed |
| 6,973,197 B2 | 12/2005 | Miller |
| 6,975,744 B2 | 12/2005 | Sharma |
| 7,046,819 B2 | 5/2006 | Sharma |
| 7,688,996 B2 | 3/2010 | Bradley |
| 8,401,224 B2 | 3/2013 | Rhoads |
| 9,182,778 B2 | 11/2015 | Sharma |
| 9,280,577 B1 | 3/2016 | Hines |
| 2006/0004744 A1 | 1/2006 | Nevidomski |
| 2006/0013395 A1 | 1/2006 | Brundage |
| 2007/0214130 A1 | 9/2007 | Miller |
| 2007/0230740 A1 * | 10/2007 | Asano ............ G06T 1/0064 382/100 |
| 2007/0260595 A1 | 11/2007 | Beatty |
| 2010/0150434 A1 | 6/2010 | Reed |
| 2010/0165158 A1 | 7/2010 | Rhoads |
| 2010/0325117 A1 | 12/2010 | Sharma |
| 2011/0274310 A1 | 11/2011 | Rhoads |
| 2012/0046071 A1 | 2/2012 | Brandis |
| 2012/0078989 A1 | 3/2012 | Sharma |
| 2013/0114847 A1 | 5/2013 | Petrovic |
| 2013/0176324 A1 * | 7/2013 | Yamashita ............ G09G 5/02 345/589 |
| 2013/0223673 A1 * | 8/2013 | Davis ............ G06K 9/78 382/100 |
| 2014/0029809 A1 | 1/2014 | Rhoads |
| 2014/0071268 A1 | 3/2014 | Lord |
| 2014/0108020 A1 | 4/2014 | Sharma |
| 2014/0119593 A1 | 5/2014 | Filler |
| 2015/0016664 A1 | 1/2015 | Rodriguez |
| 2015/0055855 A1 | 2/2015 | Rodriguez |
| 2015/0271505 A1 * | 9/2015 | Ma ............ H04N 19/27 375/240.08 |
| 2016/0055606 A1 | 2/2016 | Petrovic |
| 2016/0189381 A1 | 6/2016 | Rhoads |
| 2016/0217547 A1 | 7/2016 | Stach |
| 2016/0275639 A1 | 9/2016 | Holub |
| 2017/0024840 A1 | 1/2017 | Holub |
| 2017/0193628 A1 | 7/2017 | Sharma |
| 2018/0005343 A1 | 1/2018 | Rhoads |

* cited by examiner $S_1 = SQRT[r_1^2 sin^2(\Theta) + r_1^2(1-cos^2(\Theta))]$ $S_2 = S_1$

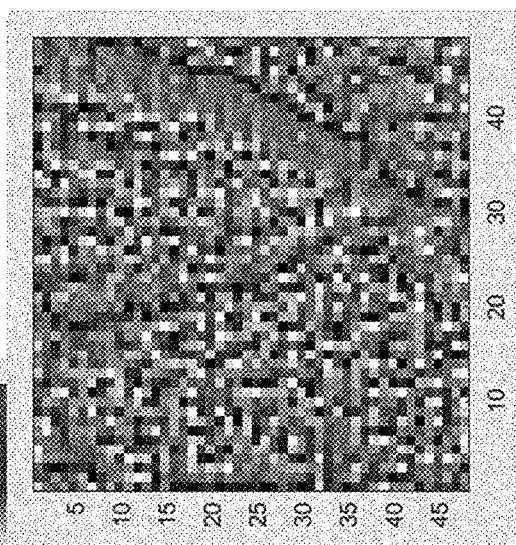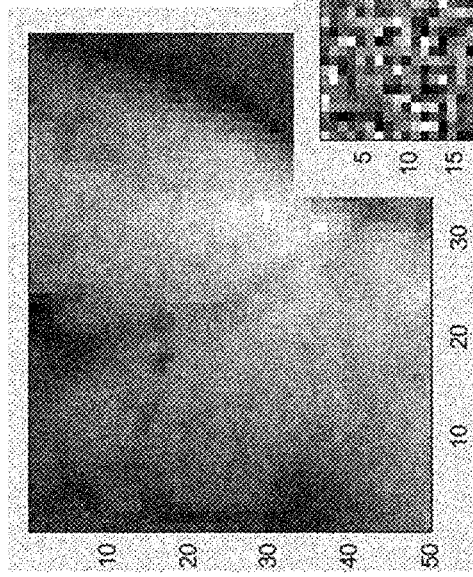
FIG. 27C
FIG. 27B
FIG. 27A

WATERMARK SENSING METHODS AND ARRANGEMENTS

RELATED APPLICATION DATA

This application claims priority to copending applications 62/643,101, filed Mar. 14, 2018, 62/611,404, filed Dec. 28, 2017, 62/581,523, filed Nov. 3, 2017, 62/573,601, filed Oct. 17, 2017, and 62/565,659, filed Sep. 29, 2017.

The present subject matter expands on that detailed in application Ser. No. 15/641,081, filed Jul. 3, 2017 (now published as 20180005343), which claims priority to provisional applications 62/379,578, filed Aug. 25, 2016; 62/371,601, filed Aug. 5, 2016; 62/366,571, filed Jul. 25, 2016; 62/363,152, filed Jul. 15, 2016; and 62/357,879, filed Jul. 1, 2016.

The disclosures of the above-referenced applications are incorporated herein by reference.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present technology concerns digital watermarking, and more particularly concerns enhancing the detectability of watermarks, e.g., allowing them to be embedded at lower amplitudes in artwork of consumer packaging, and detected from smaller image patches.

BACKGROUND AND SUMMARY

Digital watermark technology is known, e.g., from Digimarc's U.S. Pat. Nos. 6,408,082, 6,590,996 and 7,046,819, and publications 20060013395 and 20110274310, which are incorporated herein by reference.

As is familiar to artisans, and as detailed in the cited patents, a digital watermark steganographically conveys a payload of hidden auxiliary data, e.g., in imagery. It also often includes a watermark calibration signal. This calibration signal (which can comprise a known reference signal in a transform domain, such as a pattern of plural peaks in the spatial frequency domain, which is equivalent to a summed set of sine waves in the spatial domain) enables a watermark detector to discern how an image submitted for decoding has been geometrically transformed since it was originally encoded. For example, the calibration signal (which may be called an orientation signal or reference signal or grid signal) allows the detector to discern an amount by which the image has been shifted in X- and Y-directions (translation), an amount by which it has been changed in scale, and an amount by which it has been rotated. Other transform parameters (e.g., relating to perspective or shear) may also be determined. With knowledge of such "pose" information (geometric state information), the watermark detector can compensate for the geometrical distortion of the image since its original watermarking, and can correctly extract the payload of hidden auxiliary data (watermark message).

As camera-equipped processing devices (e.g., smartphones and point of sale terminals) proliferate, so do the opportunities for watermark technology. However, in certain applications, the computational burden of determining pose (e.g., the scale, rotation and/or translation of the watermarked object as depicted in imagery captured from the sensor's viewpoint, relative to an original, nominal state) can be an impediment to adoption of the technology.

An example is in supermarket point of sale (POS) scanners that are used to read watermarked product identifiers (e.g., "Global Trade Identifier Numbers," or GTINs) encoded in artwork of certain retail product packages (e.g., cans of soup, boxes of cereal, etc.). Such POS cameras commonly grab 40-60 frames every second. If all frames are to be processed, each frame must be processed in 25 (or 16) milliseconds, or less. Since watermarked product markings have not yet supplanted barcode markings, and are not expected to do so for many years, POS scanners must presently look for both barcodes and watermarks in captured image frames. The processor chips employed in POS systems are usually modest in their computational capabilities.

For many years, POS scanners processed only barcodes, and were able to apply nearly all of the available processing capability, and nearly the full 25 millisecond frame interval, to the task. With the emergence of watermarked GTINs, POS equipment had to perform two image processing tasks in the time formerly allocated to only one, i.e., now processing both barcodes and watermarks. Given the larger installed base of barcodes, barcode processing gets the lion's share of the processing budget. The smaller processing budget allocated to watermark processing (sometimes just a few milliseconds per frame) must encompass both the task of determining the pose with which the object is depicted in the image frame, and then extracting the GTIN identifier through use of the pose data. Between the two tasks, the former is the more intensive.

There are various approaches to determining pose of a watermarked object depicted in imagery. One employs a transform from the pixel (spatial) domain, into a Fourier-Mellin (a form of spatial-frequency) domain, followed by matched filtering, to find the calibration signal within the frame of captured imagery. This is shown, e.g., in U.S. Pat. Nos. 6,424,725, 6,590,996 and 6,681,029. Another employs a least squares approach, as detailed in U.S. Pat. No. 9,182,778, publication 20170193628, and in pending application Ser. No. 15/628,400, filed Jun. 20, 2017 (now U.S. Pat. No. 10,242,434). (These just-noted documents are incorporated herein by reference.) The former method employs processor-intensive operations, such as a domain transformation of the input image data to the Fourier-Mellin domain. The latter method employs simpler operations, but is iterative in nature, so it must cycle in order to converge on a satisfactory output. Both approaches suffer in applications with tight constraints on processing time.

The very short increment of time allocated for watermark processing of each captured image, and the computational intensity of the pose-determination task, has been a persistent problem. This has led prior art approaches to resort to analyzing just a very small subset of the captured imagery for watermark data. An illustrative system analyzes just 3 or 4 small areas (e.g., of 128×128 pixels each), scattered across a much larger image frame (e.g., 1280×1024 pixels), or on the order of 5% of the captured imagery.

The performance of watermark-based systems would be improved if the computational complexity of pose determination could be shortcut.

Another challenge is the extent of watermarked imagery that is required to determine the watermark pose. Existing watermark detectors commonly operate on image excerpts of 128×128 elements (e.g., pixels, or "waxels"—which may be square regions of, e.g., 1×1 or 2×2 pixels each). Successful pose determination can usually be achieved if the watermark signal spans an area of about 64×64 elements, or larger. But sometimes the image excerpt selected for processing depicts a smaller part of a watermarked object. For example, a block of imagery that is submitted for decoding may depict just a 50×50 element watermarked region in the corner of a 128×128 element block. Or the watermarked object depicted in the imagery may, itself, be so small (e.g., a neck label on a small bottle of vanilla extract) that it doesn't span more than 50×50 pixels in the captured imagery—even if centered in the processed block. Or if a watermarked item is non-planar, e.g., a bag of peas, or shrink-wrap on an irregularly-shaped product, the geometry of the item may present only small pseudo-planar facets from which the watermark is to be decoded.

Thus, there are many situations in which the performance of watermark-based systems would be improved if watermark pose could be determined reliably from excerpts of watermarked imagery smaller than 64×64 elements.

Pose data includes scale of a watermark, and watermark scale is directly related to viewing distance. As a consequence, distance to a watermarked object can be discerned from 2D imagery captured by a conventional camera. If such distance information is determined to different locations on a watermarked object, a 3D model of the object can be derived. The smaller the surface patch from which such pose (distance) data is derived, the higher the resolution of the 3D model—yet another reason that an ability to derive pose data from small watermark patches is desirable.

There is also a need to increase the imperceptibility of steganographic digital watermarks, while still enabling their detection. Watermarks most commonly take the form of subtle local variations in color or luminance of an image or artwork. Natural images, e.g., photographs of landscapes or people, typically have innate variations in pixel color/luminance that help conceal the added watermark variations. But retail artwork, such as product labels on consumer packaged goods, commonly includes ink floods of uniform colors (e.g., the uniform red color covering most of a can of Coke soft drink). For watermarks to remain imperceptible in such situations, their amplitudes must be very low.

A similar issue arises with black-on-white labels, such as are printed by in-store thermal printers for bakery and deli items. Such labels may be marked with a fine pattern of dots (a so-called sparse mark) to encode GTIN or other information. These marks must be especially subtle if they are to remain unobtrusive to human viewers.

Naturally, the weaker the watermark signal, the more difficult it is for a point of sale scanner to detect. However, reliable detection is key if watermarks are to serve their product-identifying function.

In the prior art, some regions of product labels/artwork were simply not watermarked, because the low signal levels required to maintain imperceptiveness/unobtrusiveness defeated the goal of reliable detection. Yet if the fraction of the package "real estate" that was watermarked was not large enough, then this, too, worked against the goal of reliable detection. Graphic designers often struggled to weigh these competing considerations, and mask-out watermark signals from areas where the needed watermark strength would impair imperceptibility. (The adage that 80% of the work took 50% of the time, and final 20% of the work took an equal amount of time, commonly applied to graphic designers grappling with the issues of strength and visibility, in deciding where and how to embed digital watermark signals in packaging artwork.)

Accordingly, watermark-based systems would be improved if watermark decoder sensitivity was enhanced so that lower amplitude signals could be more widely applied, while maintaining imperceptiveness/unobtrusiveness, and reliable detection. This would also simplify and speed the work of graphic designers who embed watermark signals in packaging artwork.

Different aspects of the presently-described technology address different of the foregoing issues, as well as others.

In some embodiments, the geometric pose of a patch of watermark data is estimated based on the position of a similar, but non-identical, patch of information within a data structure. The information in the data structure corresponds to a tiled array of calibration patterns that is sampled along at least three non-parallel paths. In one particular embodiment, the calibration patterns are sampled so that edges are globally-curved, yet locally-flat.

Features and advantages of the present technology will be more readily apparent from the following Detailed Description, which proceeds with reference to the accompanying drawings.

BRIEF DESCRIPTION OF THE DRAWINGS

FIG. 27A shows an image of an egret, encoded with tiled watermark signal blocks.

FIG. 27B shows an excerpt of the FIG. 27A image, to which certain embodiments of the present technology can be applied.

FIG. 27C shows an oct-axis filtered counterpart of the excerpt of FIG. 27B.

DETAILED DESCRIPTION

By way of review, this specification begins with a brief review of illustrative digital watermark encoding and decoding arrangements. Fuller descriptions are provided in the documents incorporated by reference.

Figure 1A:
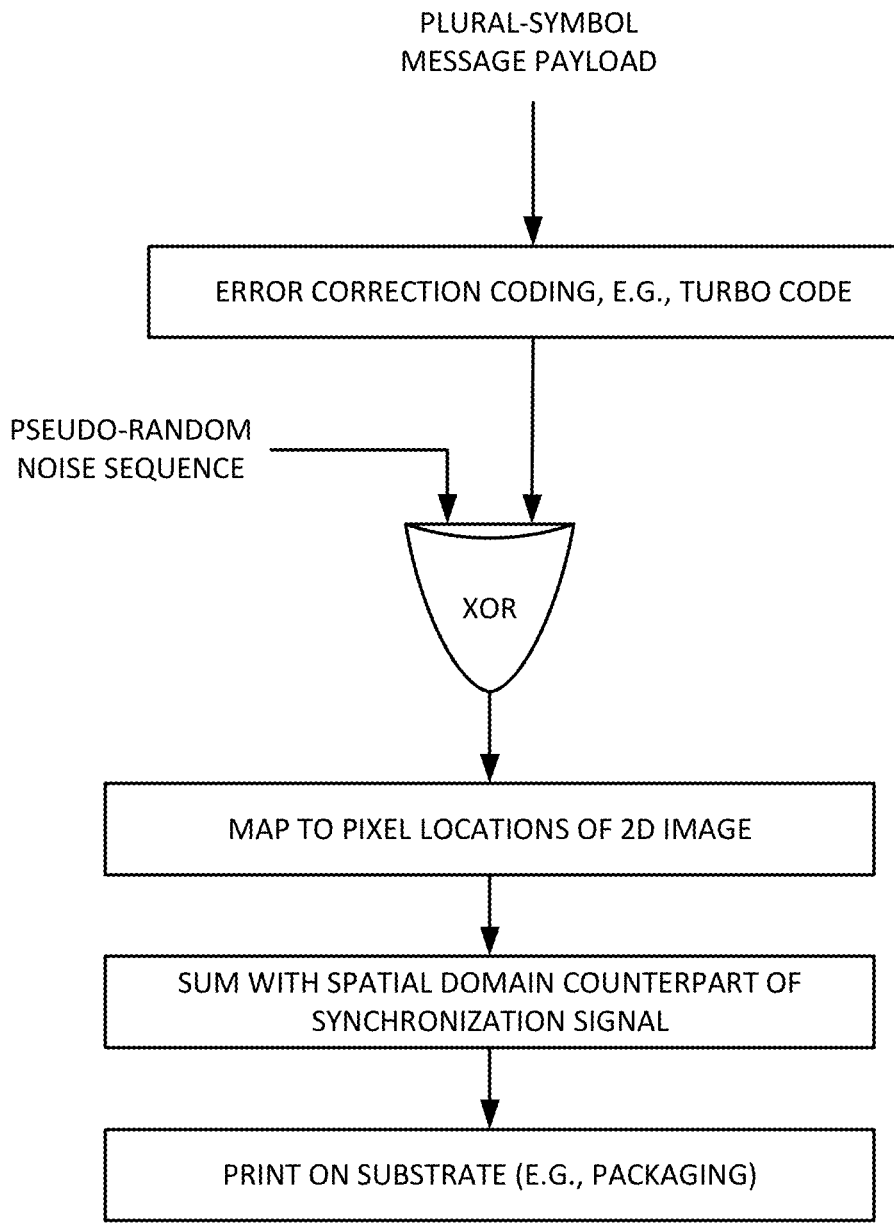
FIG. 1A is an illustration of a prior art watermark encoder.

FIG. 1A shows an illustrative direct sequence spread spectrum watermark generator. A plural-symbol message payload (e.g., 40 binary bits, which may represent a supermarket product's Global Trade Identification Number, or GTIN) is applied to an error correction coder. This coder transforms the symbols of the message payload into a much longer array of encoded message elements (e.g., binary or M-ary elements) using an error correction method. (Suitable coding methods include block codes, BCH, Reed Solomon, convolutional codes, turbo codes, etc.) The coder output may comprise hundreds or thousands of binary bits, e.g., 1,024, which may be termed "raw bits."

These raw bits each modulate a pseudorandom noise (carrier) sequence of length 16, e.g., by XORing. Each raw bit thus yields a 16-bit modulated carrier sequence, for an enlarged payload sequence of 16,384 elements. This sequence is mapped to elements of a square block having 128×128 embedding locations. These locations correspond to pixel samples at a configurable spatial resolution, such as 100 or 300 dots per inch (DPI). (In a 300 DPI embodiment, a 128×128 block corresponds to an area of about 1.7 inches square.) Such blocks can be tiled edge-to-edge to for printing on the substrate (e.g., paper or plastic) of a product package/label.

There are several alternatives for mapping functions to map the enlarged payload sequence to embedding locations. In one, the sequence is pseudo-randomly mapped to the embedding locations. In another, they are mapped to bit cell patterns of differentially encoded bit cells as described in published patent application 20160217547. In the latter, the block size may be increased to accommodate the differential encoding of each encoded bit in a pattern of differential encoded bit cells, where the bit cells correspond to embedding locations at a target resolution (e.g., 300 DPI).

The enlarged payload sequence of 16,384 elements is a bimodal signal, e.g., with values of −1 and 1. It is locally-scaled in accordance with attributes of the host image (artwork) to which it will be added, so that the alteration is below a threshold of human perceptibility.

A synchronization signal is commonly included in a digital watermark, to help discern parameters of any affine transform to which the watermark may have been subjected prior to decoding (e.g., by image capture with a camera having an oblique view of the pattern), so that the payload can be correctly decoded. A particular synchronization signal (sometimes termed a calibration signal, or registration signal, or grid signal) comprises a set of dozens of magnitude peaks in the Fourier domain (corresponding to spatial sinusoids of pseudorandom phase in a spatial, e.g., pixel, domain). This signal is transformed to the spatial domain in a 128×128 block size (e.g., by an inverse Fast Fourier transform), corresponding to the 128×128 embedding locations to which the enlarged payload sequence is mapped. This signal, too, is scaled so as to remain imperceptible in the embedded host image. The scaled spatial domain synchronization signal is summed with the block-mapped 128×128 payload sequence to yield a final watermark signal block.

Figure 1B:
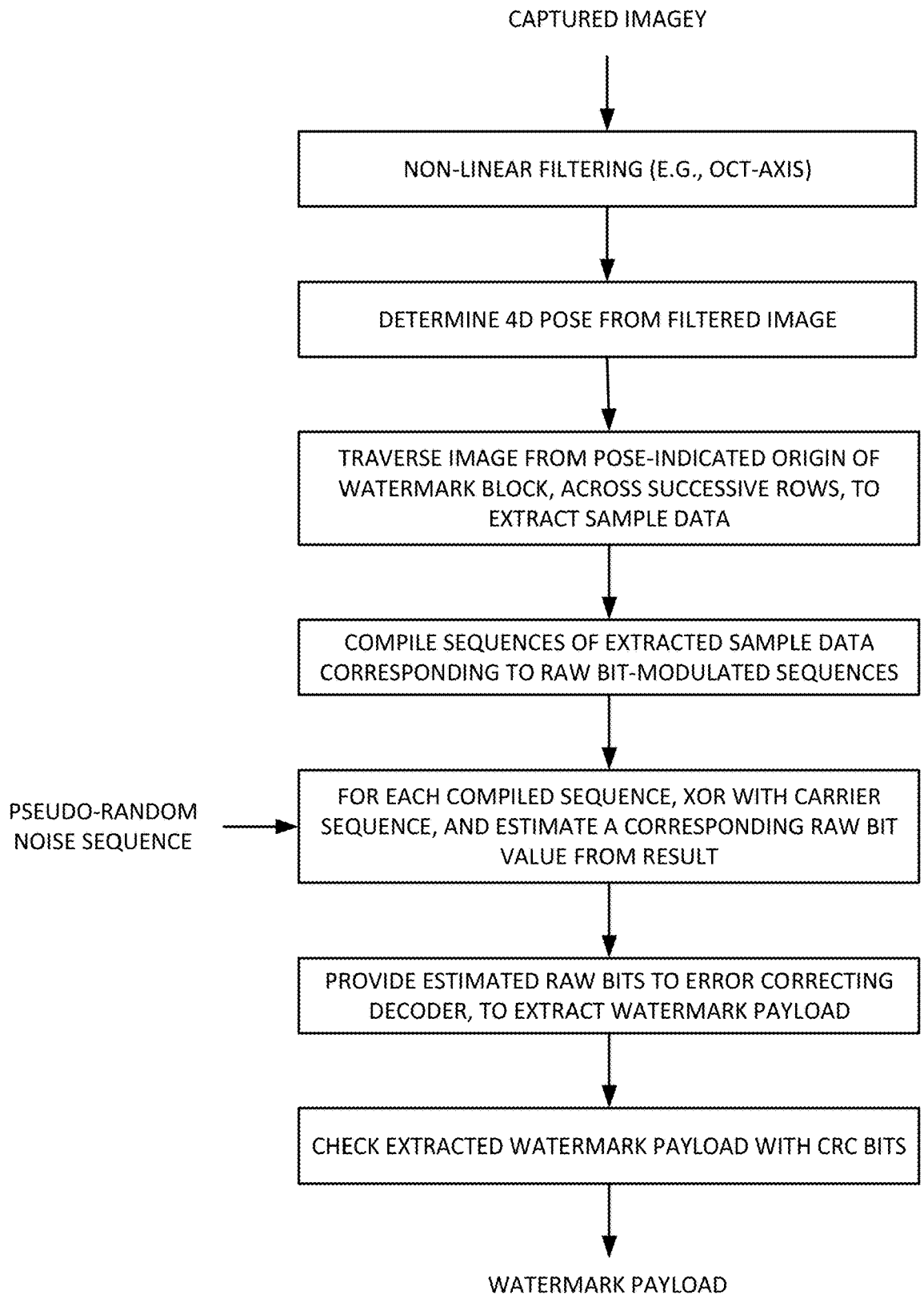
FIG. 1B is an illustration of a prior art watermark decoder.

As shown in FIG. 1B, decoding of a camera-captured image (e.g., captured by a mobile phone or point-of-sale retail scanner) typically begins with a high-pass filtering operation, to attenuate the host signal artwork elements, and thereby emphasize the added, higher frequency, watermark signals. Oct-axis filtering (discussed below) or Wiener filtering can be used. The filtered signal is then processed to determine its pose state, i.e., the affine transformation with which the watermark signal is represented in the captured imagery. Improvements to this process form a central aspect of the present technology. Prior art techniques for determining pose state (which may optionally be used to refine embodiments of the present technology described herein) are noted above and detailed in the cited patent documents.

From x- and y-translation data of the pose state information, the decoder knows the location of the upper left corner of the watermark signal block within the camera-captured, filtered imagery. The decoder also knows the rotation of the watermark block—so it knows in which direction to traverse the imagery to recover a row of signal elements (and in which direction to proceed to find the next and subsequent rows). The decoder further knows the scale of the watermark block, so it knows with what size steps, in pixel space, it should examine the imagery to extract samples corresponding to watermark elements.

The decoder steps through the captured imagery, starting from the upper-left corner of the included watermark block, in the direction indicated by the determined rotation data, and with steps of a pixel size corresponding to the determined scale data. From its sampling of the filtered imagery, the decoder obtains data points corresponding to different instances of the modulated (XOR'd) 16 element carrier sequence. Each is XOR'd with the carrier sequence. The result indicates whether the modulated sequence more likely represents a "1" bit or its complement ("0" or "−1"—depending on implementation). These estimated raw bits are compiled—1,024 of them in the illustrative embodiment, and provided to an error correcting decoder corresponding to the encoding scheme. The decoder outputs the original 40 bit GTIN message. (Extra bits, such as CRC bits, are typically included in the payload to permit validation of the output GTIN.)

The just-reviewed and other watermark encoding/decoding processes are more particularly detailed in the patent documents earlier cited.

Figure 2:
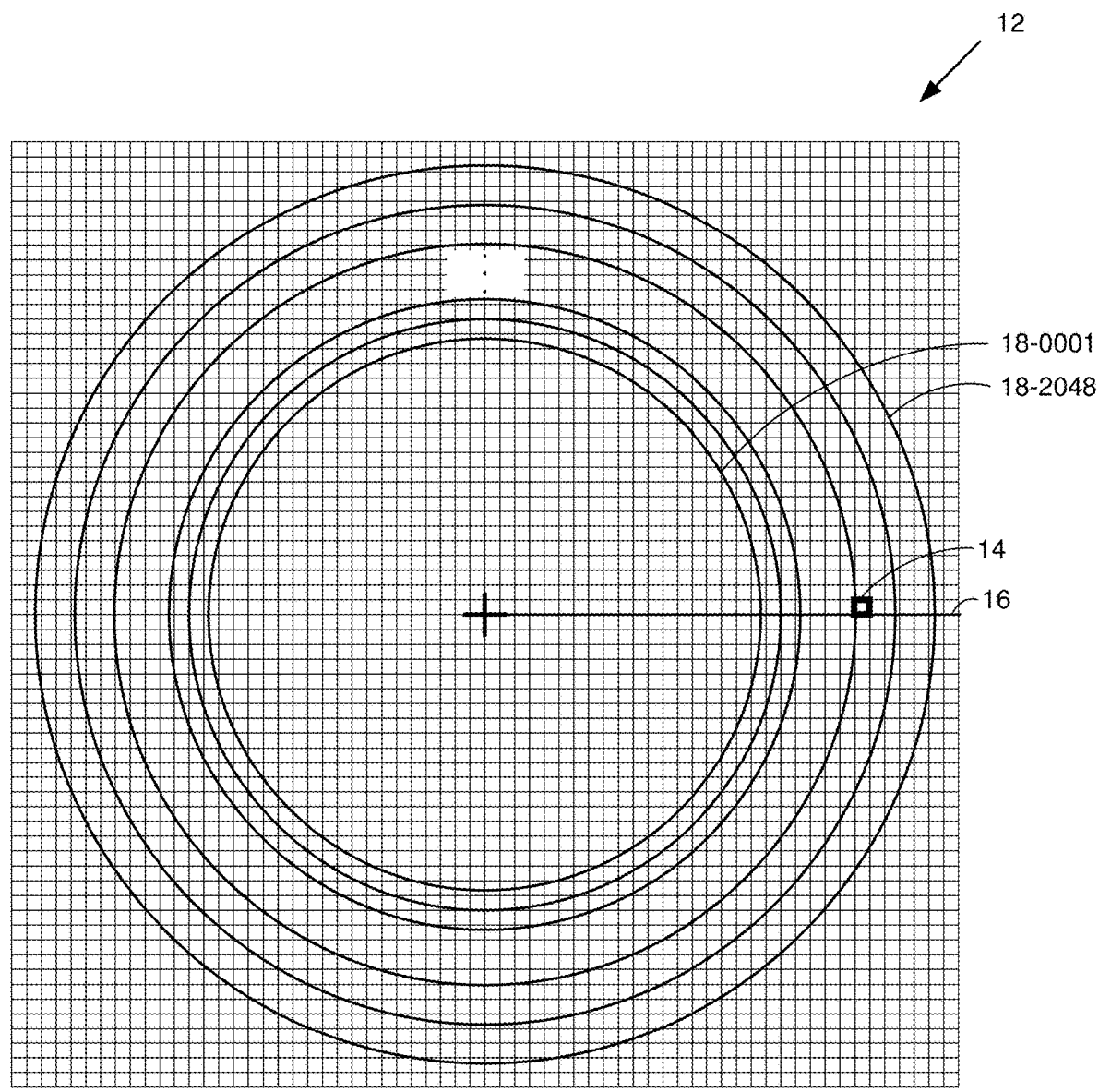
FIG. 2 conceptually illustrates a multitude of curved paths through a tiled array of 2D signal blocks, with spacing that varies with radial distance.
Figure 3:
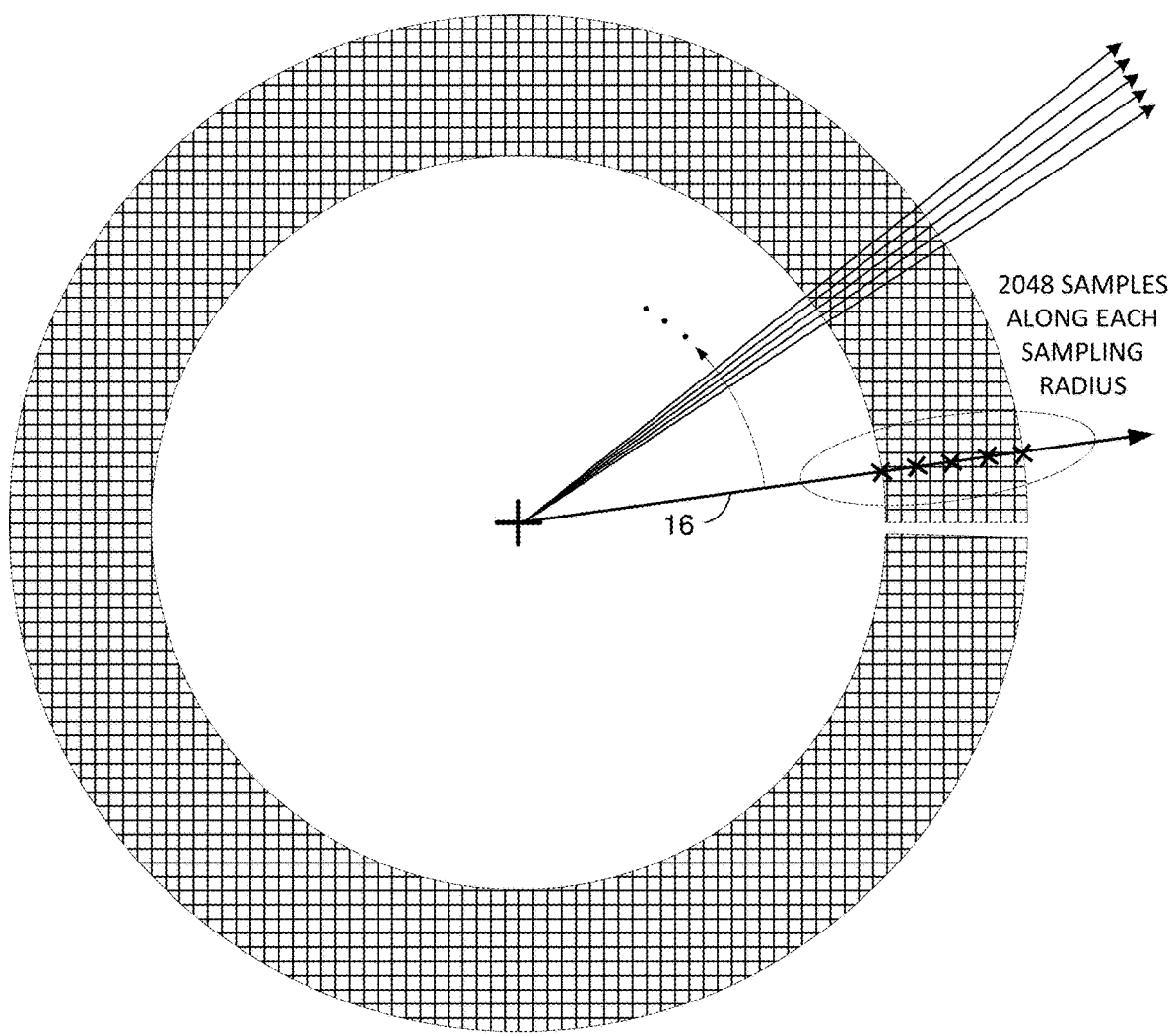
FIG. 3 is a variant of FIG. 2, detailing that samples from the signal blocks are collected in two dimensions: spaced along a radial line, and spaced along the curved arcs, through a donut-shaped region.

Turning now to FIG. 2, there is shown a tiled array 12 of watermark signal blocks 14. Each block is 128×128 waxels (e.g., pixels) in an illustrative embodiment. A number of circular arcs 18 pass through this tiled array—2048 in the depicted arrangement. Along each arc, 65,536 values are sampled from the tiled watermark signal, at points uniformly spaced along the arc. That is, if we think of a sampling radius 16 that sweeps counterclockwise along the arcs, this radius stops at 65,536 different angular positions (every 360°/65,536, or 0.005493°), where a radial array of 2048 samples is taken. This is depicted in FIG. 3 (which shows only the "donut"-shaped part of the tiled signal array that is being sampled). This sampled data will fill a regular 2D array, or table, of dimensions 65,536×2048.

If the watermark signal is a continuous signal (e.g., a calibration signal comprised of plural spatial domain sine waves, summed), then sampling simply involves determining the value of the signal at a particular sample point. If the watermark signal is a discrete signal (e.g., pixelated), then sampling can proceed by interpolation—such as using bicubic interpolation based on a set of the nearest 16 signal values.) In the illustrated arrangement, the sampling arcs 18 are generally spaced non-uniformly.

For example, they may be spaced exponentially. As can be seen in FIG. 2, the outer arcs are spaced further apart than the inner arcs. (Naturally, only a few of the 2048 arcs are shown.) In this example, the set of 2048 samples taken at each radial position are also spaced exponentially—in the radial direction.

The first arc, 18-0001, is far removed from the origin of the signal array (denoted by a "+" at the center of FIGS. 2 and 3). If the horizontal axis is calibrated in terms of waxels (again, with each depicted block 14 being 128 waxels on a side), the first arc 18-0001 passes through waxel number 9,455.54—more than 70 signal blocks away from the origin. (The drawing is not to scale, for clarity's sake.)

The reason that sampling is performed at such a large distance away from the origin is that the arcs desirably approximate straight lines, locally, so that sampling generally corresponds to a regular array of pixels, with orthogonal (rectilinear) rows and columns of data points.

Figure 4:
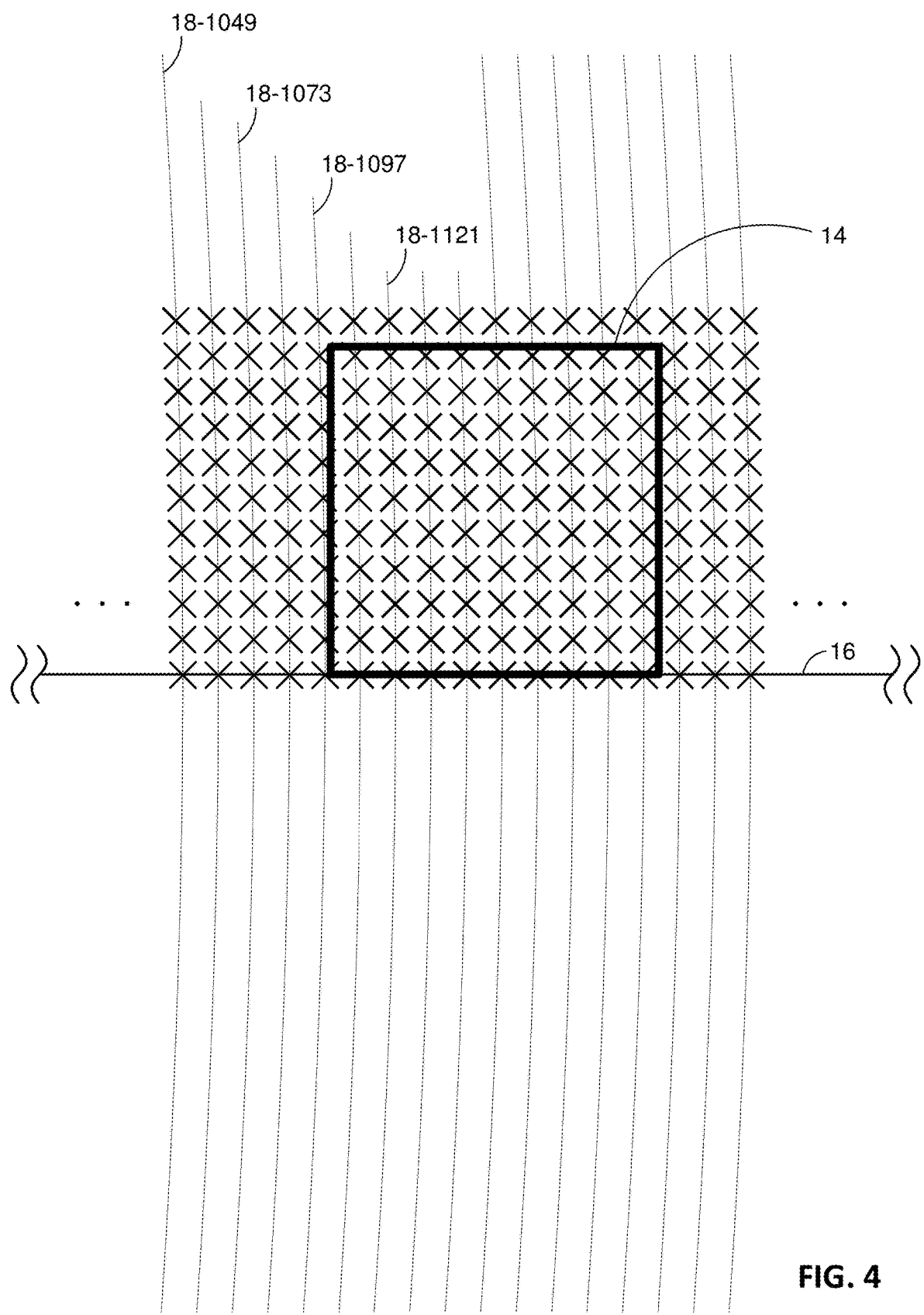
FIG. 4 is an enlarged view from FIG. 3, showing how the 2D array of sampling points essentially has perpendicular rows and columns, on a local basis.

FIG. 4 shows this effect. The arcs 18 define sampling paths that diverge slightly from straight lines. Yet the curvature is small enough to be forgiven in certain of the processing steps that later follow.

We want sampling of data points to be performed at generally uniform spatial increments in both of the two sampling directions (which may be termed radial and angular). If, as noted below, sampling along the radial line 16 begins at spacings of about 0.9 waxels, and spacing along the circular arc is at increments of 0.005493°, then the first sample must be taken 9,455.54 waxels from the origin for these two spacings to be equal.

Figure 5:
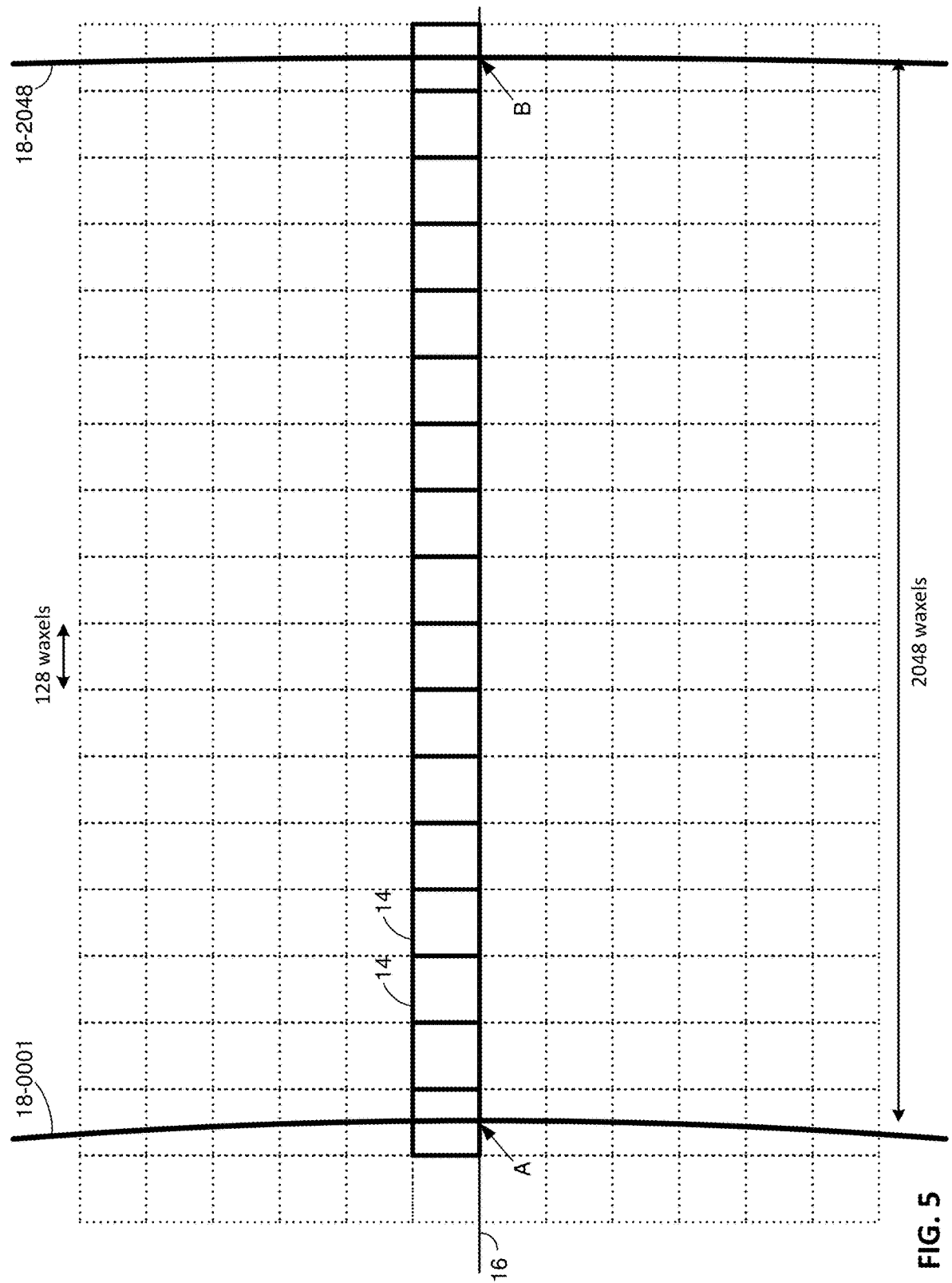
FIG. 5 is another enlargement of FIG. 3, showing how the sampling arcs traversing different blocks are differently-curved.

FIG. 5 is a magnified view showing the watermark blocks through which the sampling radius 16 initially passes. The first sampling point "A," along arc 18-0001, is at waxel coordinate 9,455.54 on the horizontal axis. The last sampling point "B" on this sampling radius, which is along arc 18-2048, is at coordinate 11,505.72 waxels on the depicted radial line 16 shown in FIG. 5.

As noted, the arcs are not uniformly spaced. In particular, the second arc, 18-0002 (which is not shown but is infinitesimally to the right of 18-0001 in FIG. 5) is spaced about 0.9 waxels further to the right, i.e., at coordinate 9,456.44 along the horizontal axis). In contrast, the penultimate arc 18-2047 (also not shown) is spaced about 1.1 waxels to the left of arc 18-2048. That is, the inner-most arcs start with about a 0.9 waxel spacing, and the outer-most arcs end with about a 1.1 waxel spacing.

The different spacings of these arcs serve to effectively sample the watermark signal at different scales—here ranging between 110% (corresponding to the 0.9 waxel sample spacings) and 90% (corresponding to the 1.1 waxel sample spacings).

And, correspondingly, the angular progression of the sampling radius serves to effectively sample the watermark signal at different rotations.

Figure 6:
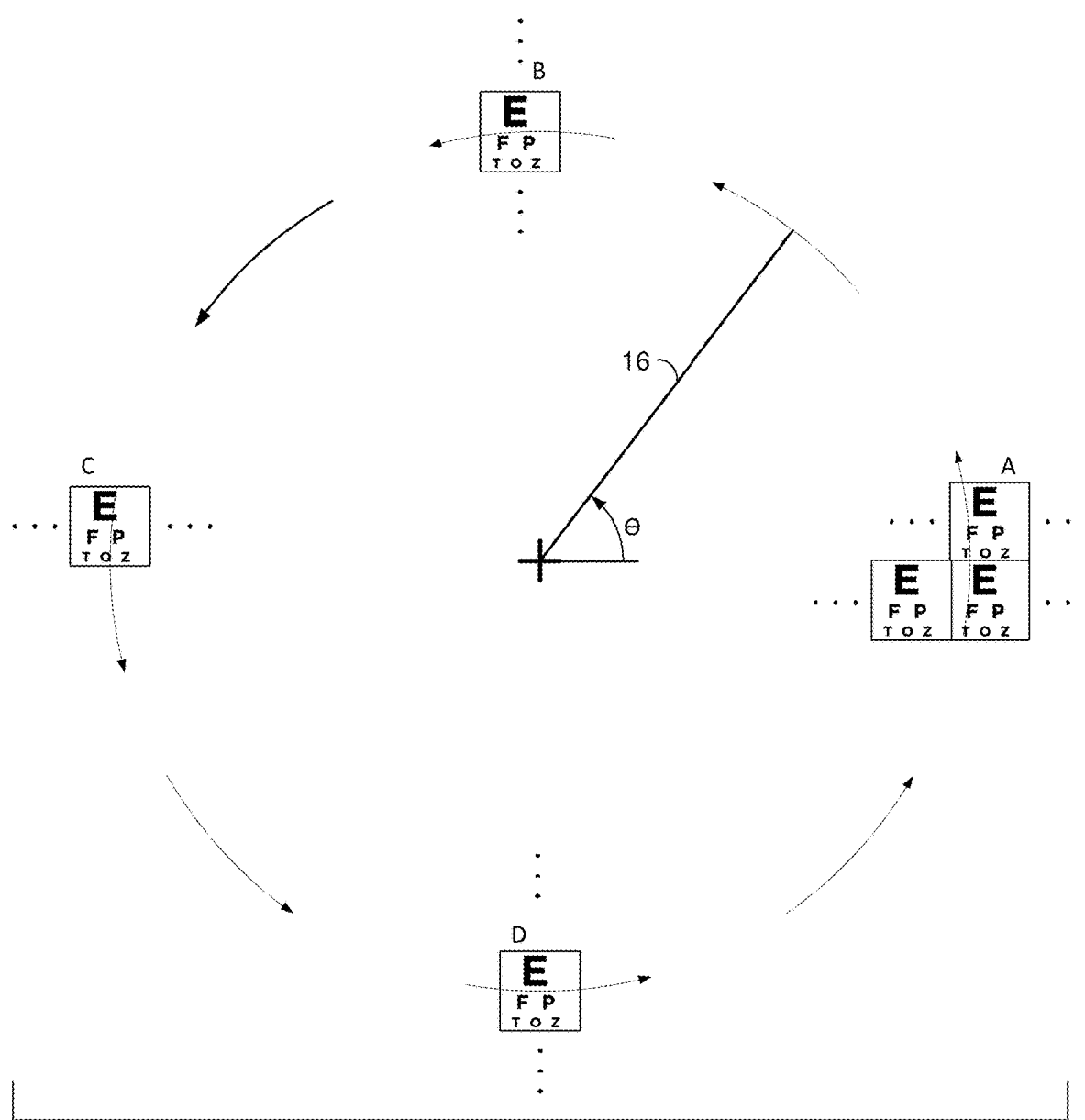
FIGS. 6 and 7 depict how the different angular positions of the radial sampling arcs, as they traverse and sample blocks at different locations in the tiled array, result in differently-rotated versions of the blocks.

FIG. 6 shows this latter effect, in greatly exaggerated form. (An eye chart graphic is employed instead of a watermark block, for clarity of illustration.) At the beginning of its counter-clockwise transit, when the sampling radius 16 extends to the right ("east," or θ=0°), the radius sweeps up through blocks "A," traversing them from the bottom to the top. The first row of samples, taken from blocks A when the sampling radius points to the east, fills the bottom row of the 65,536×2048 sample table. The second row of samples fills the second-from-the-bottom row of the sample table, and so forth. The FIG. 6 signal blocks sampled in this fashion, when the sampling radius 16 sweeps up through its first approximately 142 angular positions (i.e., 128/0.9) fill the bottom rows of the sample table with patterns like the illustrative "A" in FIG. 7, i.e., the signal blocks at their nominal orientations.

Figure 7:
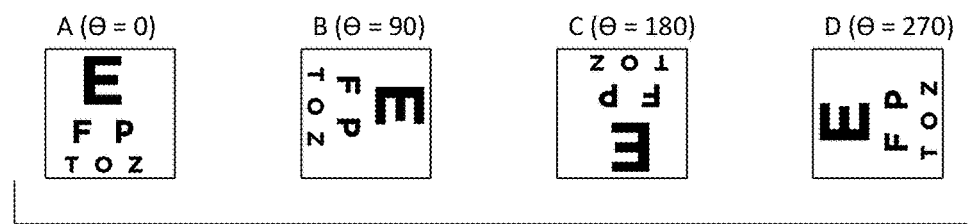

When orientation of sampling radius 16 reaches straight-up (θ=90°), it traverses other signal blocks "B" in FIG. 7. This time the radius approaches these signal blocks from the right side but, continuing with the earlier convention, these samples continue filling rows of the 65,536×2048 sample table (which is now one-quarter filled) from the bottom towards the top. As shown at "B" in FIG. 7, such sampling yields blocks that are rotated clockwise 90° degrees.

It will be noted that, although the sampling radius 16 has rotated 90° in a counterclockwise direction, the sampled blocks stored in the 65,536×2048 sample table have rotated 90° degrees in a clockwise direction.

And so it continues, when the sampling radius reaches the midpoint of its travel—now pointing to the left. It here samples signal blocks "C" from the top down. But each row of samples continues filling the 65,536×2048 sample table (which is now half-filled) from the bottom-up. This causes a 180° inversion of the signal block pattern, as stored in the table, as shown by block "C" in FIG. 7.

When the sampling radius 16 sweeps through the south (now 270° through its counter-clockwise transit), it encounters blocks "D" from their left sides. These samples are again written to successively higher rows in the sample table. This causes them to appear, in the sample table, oriented 270 degrees clockwise, as shown by representative block D in FIG. 7.

Again, it will be seen that sampling in this fashion effects an inversion of the block's rotation. While the radius is rotating counter-clockwise, as it progresses from "A" to "B" to "C" to "D", the resulting sampled blocks rotate clockwise (as shown at A-D in FIG. 7).

Although not shown in FIGS. 6 and 7, it will also be understood that signal blocks nearer the origin, which are sampled more densely, yield sampled data sets of larger scale, and vice versa.

Figure 8:
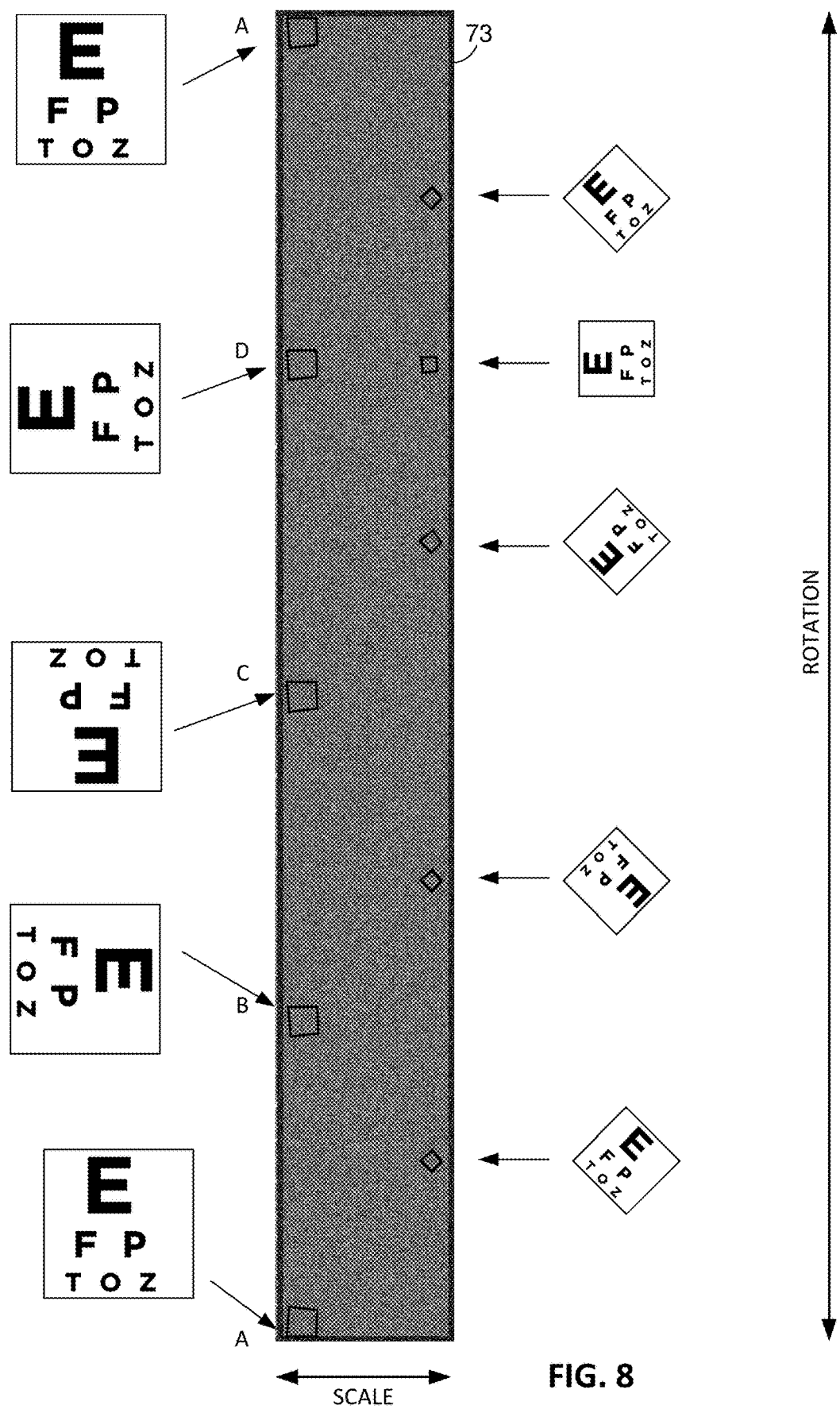
FIG. 8 shows the donut region of FIG. 3 unwrapped into a rectangle to form a spatial domain signal block template containing a two dimensional array of samples (corresponding to dimensions of scale and rotation)—annotated to indicate the scale and rotation of the sampled signal blocks therein.

FIG. 8 shows the sample table 73 (sometimes termed a spatial domain signal block template 73) produced by the foregoing operations. (The watermark signal has an appearance of noise.) Hundreds of blocks are represented in sampled form, at different scales and orientations, as shown by the few sampled blocks shown in the figure.

The blocks on the left edge of the signal block template 73 correspond to the inner part of the FIG. 3 donut, where the samples were relatively closely spaced (0.9 waxels). Blocks sampled with this fine spacing are thus rendered at a larger size, when the sample points are uniformly arrayed in rows and columns, as in signal block template 73. Conversely, the blocks on the right edge of the signal block template correspond to the outer part of the donut, where the samples were relatively widely spaced (1.1 waxels). These are rendered at a smaller size when such samples are uniformly spaced in the 2D signal block template. (Some scale exaggeration is employed in FIG. 8 for clarity of illustration.)

The letters A, B, C, D and A appearing to the left of the FIG. 8 graphic correspond to the angular scanning positions denoted by those letters in FIG. 7.

Figure 9:
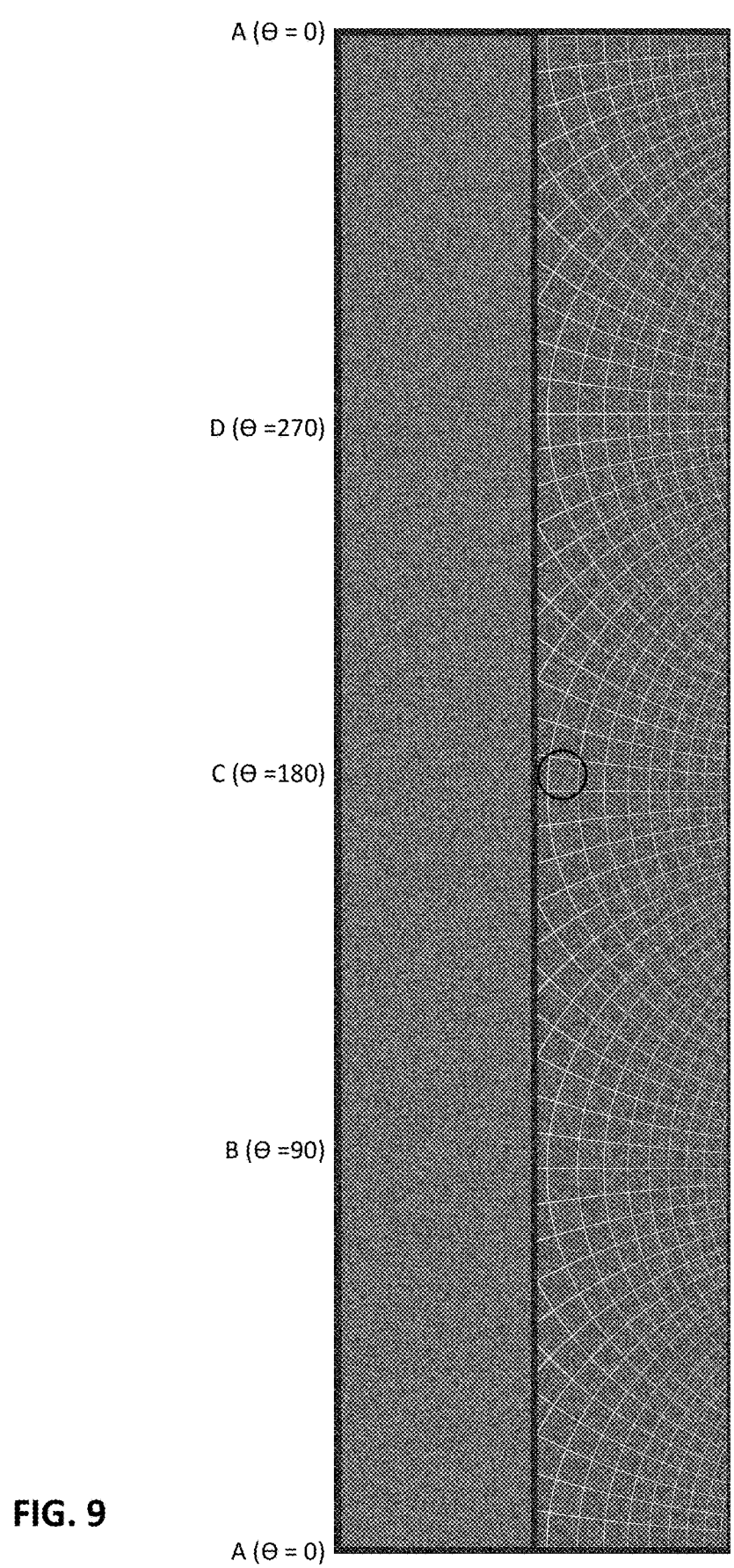
FIG. 9 shows, on the left, the signal block template of FIG. 8, and on the right, the same template annotated to show the boundaries of the sampled signal blocks.

The mapping of the square signal blocks from the array 12, into the signal block template 73, via the described angular/radial sampling, is made further apparent by FIG. 9. The sampled watermark signal is shown on the left. On the right, the same sampled watermark signal is shown—here annotated with light lines showing the boundaries of each of the sampled watermark signal blocks from the original rectilinear array 12.

It will be noted that the sampled signal blocks outlined inside the template, in bold, in FIG. 8, correspond to similarly-sized and shaped quadrilaterals in the right side of FIG. 9

It will also be noted that, although the original signal blocks are all square, and of the same size and orientation (e.g., as shown in FIGS. 2, 3 and 5), the sampled signal blocks in the template 73 are all unique—characterized by different scales and rotations. None is a square.

At the very top of this right region in FIG. 9, eight full blocks can be identified, with partial blocks at each side. The observant reader will note that these blocks should correspond to the swath of blocks depicted in bold in FIG. 5—the blocks initially traversed by the sampling radius 16. FIG. 5 shows this swath as comprising 16 blocks. FIG. 9 was generated from data traversing only eight blocks, so as to allow the quadrilaterals to be more clearly visible.

To make the range of scale states more clear, a larger scale range of 70-140% was used to generate the right side graphic of FIG. 9.

It will be recognized that the two coordinates of the FIG. 8 (and FIG. 9) signal block template 73 correspond to two of the affine parameters: scale (in the horizontal direction) and rotation angle (in the vertical direction).

In the foregoing text and associated drawings, as elsewhere in this specification, the description does not strictly correspond to a preferred implementation (e.g., as set forth in appended software code). One difference is that the preferred embodiment does not begin with a tiled array of signal blocks (as at numeral 12 in FIG. 2). Rather, the sampling is performed on a single signal block—in modulo fashion. FIGS. 10A-D, and 11A-D illustrate.

Figure 10A:
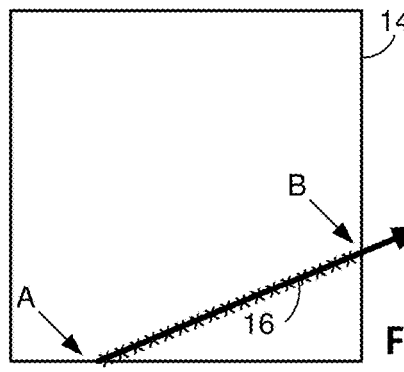
FIGS. 10A-D and 11A-D illustrate how the array of signal blocks in FIGS. 2-6 can be replaced with a unit 2D signal block, sampled in modulo fashion.
Figure 11A:
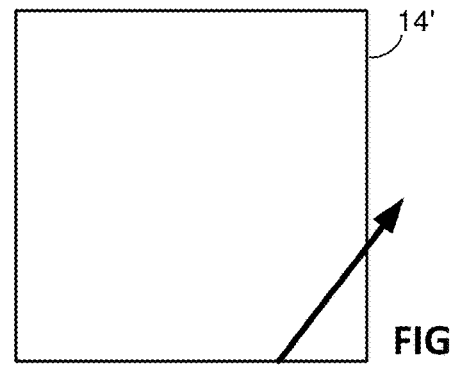

In FIG. 10A, the path of the radial sampling line 16 passes through a watermark signal block 14, entering the block at point A along its bottom edge, and exiting at point B along its right edge. A few of the sampling locations are indicated by "X"s (omitted in the later diagrams for clarity of illustration).

This sampling line continues through the block that adjoins to the right, entering through its left side, at a vertical position identical to that of point B in FIG. 10A. This is shown by the bold arrow in FIG. 10B (with the path traversed through the block in FIG. 10A shown in dashed lines).

Figure 10B:
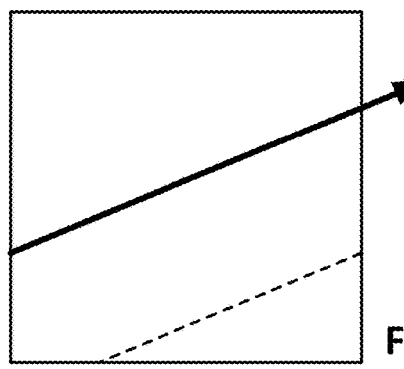
Figure 11B:
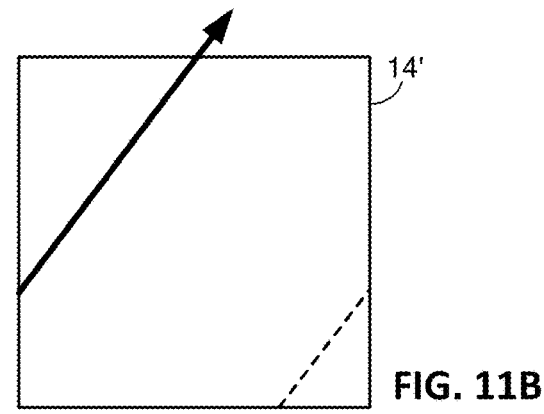

Again, the sampling line—after traversing the block of FIG. 10B—exits the right side, to enter the left edge of the right-adjoining block at the same vertical position. This is shown in FIG. 10C.

Figure 10C:
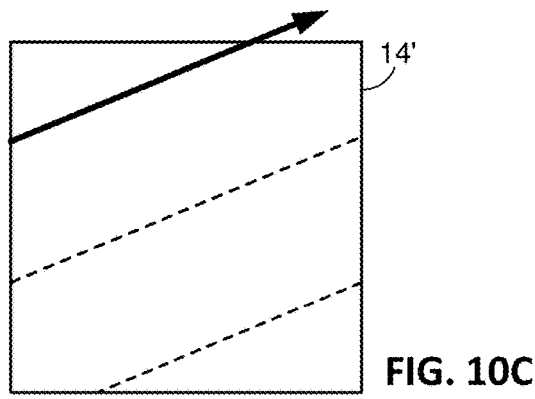
Figure 11C:
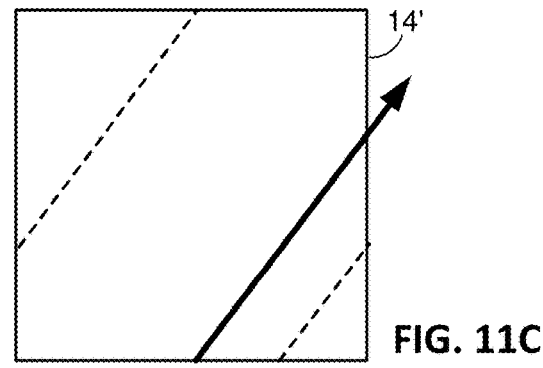

In FIG. 10C, the bold arrow indicating the radial sampling line 16 exits the block out the top. It thus enters the next block through its bottom edge (at a horizontal position identical to its exit position in FIG. 10C).

Figure 10D:
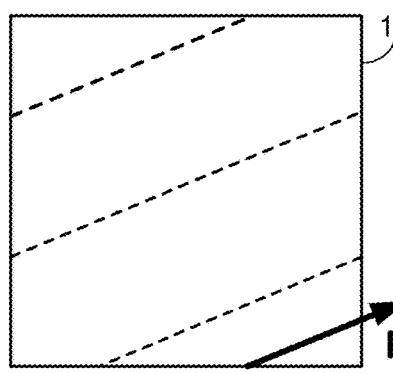
Figure 11D:
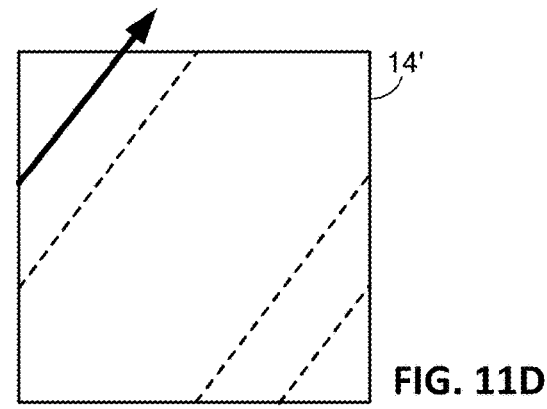

Such entry into this next block, through the bottom edge, is shown in FIG. 10D.

Although the foregoing description includes a temporal aspect—with arrows entering and leaving blocks, in actual practice, all 2048 points along the line may be sampled in a single operation—depending on the form of implementation. For that matter, the 65,536 different radial lines may be sampled together, or in any order.

After the 2048 samples have been collected from the sampling locations along a radial line 16, from 16-23 blocks in this example (depending on the angle), the radial line advances one increment in angle (0.005493°) and the process repeats.

FIGS. 11A-D show the process many increments later, with the radial sampling line 16 traversing a single block at a much-incremented angle.

Sampling the data in this fashion, from a single signal block—rather than from an array of thousands of blocks—conserves memory.

In a simple embodiment, the watermark signal block from which the spatial domain template 73 is based can comprise the calibration component of the watermark (which, as noted, is sometimes termed the "synchronization," "reference" or "grid" signal)—without any payload data. This calibration signal can be non-linearly filtered prior to sampling. Oct-axis processing is used in a particular embodiment. In such embodiment, the sampled data in the signal block template 73 comprises oct-axis data, e.g., in the range of 1 to 9, as described in predecessor application Ser. No. 15/641,081 (published as 20180005343).

(Oct-axis filtering is also detailed in Digimarc's U.S. Pat. Nos. 6,580,809, 6,724,914, 6,631,198, 6,483,927, 7,688, 996, and in publications 20100325117 and 20100165158. These documents are incorporated herein by reference.)

It will be recognized that the spatial domain signal block template 73 produced by such sampling includes 128 million elements (65,536 angular positions of the sampling radius 16, by 2048 sampling points along the sampling radius). Each of these elements may be viewed as the center of a surrounding patch of signal block template elements. Each of these signal block template patches is characterized by an associated (and unique) pair of scale/rotation data that defines the scale and rotation of the patch. Similarly, each element in the signal block template is a sample taken from a particular x- and y-offset (translation) within the sampled signal block. (Again, various frames of reference can be used. One indicates offset of a sampled point relative to the center of the signal block.) These parameters—scale, rotation, x-translation, and y-translation—comprise a 4D affine state describing the pose of the patch centered at a particular one of the 128 million elements of the signal block template 73.

A data table can store some or all of this association information. That is, for each of the 128 million element locations in the signal block template (here, and elsewhere, boundary issues are disregarded; the artisan can deal with same), the table can store an associated quartet of scale/rotation/x-translation/y-translation data defining the affine state of the surrounding patch. (In another embodiment, x-translation is stored in one table—termed aPTX, and y-translation is stored in a second table—termed aPTY. Scale and rotation are computed from the horizontal and vertical coordinates of the element within the signal block template 73.) In different implementations, this affine state data can be indexed in association with any consistent location, e.g., the center of the patch, its upper left corner, or its lower right corner.

In use, signal block template 73 is employed to determine the affine state of an excerpted region of query pixels taken from imagery depicting a watermarked subject (e.g., a consumer's smartphone picture depicting a watermarked food package in a grocery store). An illustrative excerpted region may be 48×48 pixels. (For clarity's sake, applicant endeavors to use the terms "excerpt" and "region" when referring to the data from the captured imagery, as opposed to use of the term "patch" when referring to the signal block template data. Data based on the captured imagery is also commonly referred to as "query" data.)

Such process starts by non-linearly filtering the query image excerpt. Again, oct-axis processing is used as an example. Such filtering serves to attenuate the lower-frequency image energy in the excerpted region corresponding to the food package artwork (intended for human visual perception), while leaving most of the higher-frequency watermark energy (intended for machine signaling). Next, this processed excerpt of data is—conceptually—slid across and down the template 73 of sampled oct-axis data, to find a 48×48 element patch in the signal block template with which the excerpt most closely corresponds. When the location, within the signal block template, of closest correspondence, is found, the coordinates of the lower right-most pixel in the patch are used to determine the scale/rotation data corresponding to the center element of the matching patch within the signal block template. (As noted, the two axes of the signal block template 73 directly correspond to scale and translation). These coordinates are also used to index into the data table(s) to retrieve the x-translation and the y-translation of the excerpted region, within the frame of reference defined by the watermark signal, within the package artwork.

It is not generally practical to virtually move the excerpted image region to each of the 128 million locations within the signal block template 73, to check for correspondence. Instead, this process is shortcut by a convolution performed as an element-wise multiplication in the frequency domain.

In particular, the 65,536×2048 spatial domain signal block template 73 is first Fourier-transformed into the frequency domain (e.g., by an FFT operation), and stored as frequency domain template data 73'. This transformation need only occur once; the stored data can be thereafter used to determine the affine state of any region of pixels excerpted from watermarked imagery.

Next, the 48×48 pixel excerpt from the captured imagery is placed in a 65,536×2048 array that is otherwise zero-filled (e.g., in the upper left corner, or in the center). This mostly-zero-filled array is similarly Fourier-transformed into the frequency domain, yielding a frequency domain counterpart to the image excerpt.

This frequency domain counterpart to the image excerpt is next pointwise-multiplied with the frequency domain template data 73'. The product is then inverse-FFT'd back to the spatial domain, yielding a 65,536×2048 element result array. The values in this result array indicate the correlations between the image excerpt and each of the correspondingly-sized patches in the spatial domain signal block template 73. The largest values ("peaks") in this result array correspond to patch locations within the template 73 to which the excerpted 48×48 pixel query excerpt most nearly corresponds. This 65,536×2048 element result array may be termed a spatial domain "peaks" array.

(The artisan will note that the element-wise multiplication of the Fourier-counterpart of the template 73, with the Fourier-counterpart of the image excerpt, more accurately yields the convolution of the two spatial domain functions—not their correlation. The conjugate of the latter Fourier array should be used to achieve correlation. Suitable adjustment can be made prior to the multiplication (i.e., by using the conjugate), or correction may be made to the peaks array after the inverse Fourier transformation—or still later in the process.)

As noted, each location in the sampled spatial domain signal block template 73 is associated with a unique combination of 4D affine state data: scale, rotation, x-translation and y-translation. So, too, with each location in the spatial domain "peaks" array. That is, the data in the "peaks" template identifies the spatial position at which the image excerpt most closely corresponds to data in the spatial domain signal block template. This spatial position indicates the 4D pose of the captured image excerpt, relative to the camera. This information is then passed to a watermark decoder, which uses it to extract the payload bits encoded in the image excerpt—now that the geometry of the payload bits' representations in the image excerpt is understood.

In an ideal world, the element in the "peaks" template having the highest value would indicate the 4D pose data. This approach ("top peak") can be used much of the time, with no ill effects—particularly if the value of the top-ranked peak exceeds the second-ranked peak by an appreciable margin (e.g., 10%, 25% of 50% of its value). But in other instances, further refinement of the pose may be desired. Or there may be several similarly-valued high-ranking peaks in the peaks template. These instances can be addressed by further processing.

As a preamble to further discussion, it should be recalled that the template 73 is globally curved. None of the hundreds of watermark blocks sampled within it (i.e., outlined on the right side of FIG. 9) has four straight sides, connected by right angles. Each of the blocks is distorted in a non-linear fashion. As a consequence, no camera-captured imagery, which depicts an affine-distorted watermark, will perfectly correlate with a patch in the template 73—even if it depicted a pure watermark signal, with perfect fidelity. Correlation will always be less than 1.0. Consequently, no value in the peaks array will attain a value of 1.0; the peaks will always fall short in value, due to the curved distortion of the template 73' on which the peaks array is based.

Figure 12:
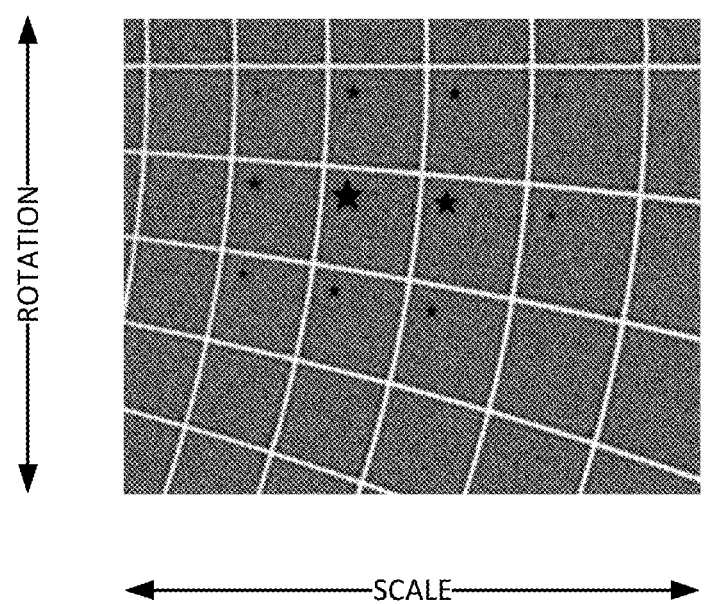
FIG. 12 shows how correlation peaks may not be clustered together.

Moreover, there will commonly be situations in which the highest values in the peaks array do not all adjoin one another. FIG. 12 shows an illustrative case. Here, the relative values of different peaks, at different positions in the peaks array, are indicated by stars of different sizes. The outlined map of FIG. 9 is overlaid to give spatial context. The peaks are each in the upper left of their respectively-outlined quadrilateral, showing consistency between the x- (and y-) translation values indicated by these peaks. But for a given triple of x-translation/y-translation/scale, the FIG. 9 template provides only about 80 different rotation values. And for a given triple of x-translation/y-translation/rotation, the FIG. 9 template provides only about 9 different scale values. So it is common for the correlation peaks not to perfectly match any of these discrete values, but instead to be smeared across several discrete rotation, and scale, states—resulting in the array of spaced-apart stars in FIG. 12.

One form of further processing is a pose refinement operation. This operation desirably does not use the globally-curved template 73, but rather is conducted using the original, flat, watermark signal block 14—the one on which the sampled template 73 was based.

An illustrative refinement method starts by transforming the filtered, camera-captured image excerpt to compensate for (counteract) the 4D pose indicated by the top peak, so as to restore the data to the rotation, scale and translation at which the watermark signal block was originally embedded in the imagery. A baseline correlation is then computed, between the pose-corrected image excerpt and the original watermark signal block. Then each of the 4 parameters is perturbed in turn (or jointly) and the process repeated, to determine whether the correlation gets better—or worse, compared with the baseline value. Such process continues—pursuing tweaks that improve correlation and reversing tweaks that degrade correlations—until further perturbations yield changes that are below a threshold value, or until all further perturbations serve only to make the correlation worse—indicating an optimum 4D transform has been determined. This refined 4D pose state is then passed to the watermark decoder, to guide it in extracting the payload from the image excerpt.

The just-described process is commonly implemented with a Jacobian function—a so-called first derivative hill climbing optimization process. An alternative is to employ a Hessian function, which makes use of second derivative information to gain more insight into how to "climb the hill" of optimization. (Additional information about optimization processes based on Jacobian and Hessian functions is available, e.g., in Gill, et al, *Practical Optimization*, Academic Press, 1981.)

Such a refinement operation is sometimes termed "spidering" by applicant—stepping in different directions to check things out.

A second approach to pose determination is to sort the top peaks by value, determine the pose indicated by each peak, and compute a weighted average-pose from the top N consecutive peaks that all indicate a consistent pose.

(Consistency can be determined by threshold values, respectively applied to the scale parameter, rotation parameter, and total translation. Two pose states may be said to be consistent if, e.g., the rotation state of one is within four degrees of the other, the scale state is within seven percent, and the translation is within two waxels. Each of these thresholds is fairly generous (and could be reduced, e.g., by 50% or more in a different embodiment), but when ANDed together, they effect a suitable filter.)

The pose state indicated by the top-ranked peak is used as a starting point. If the pose state indicated by the #2 peak is consistent with that of the top-ranked peak, it is added to the group. If the pose state indicated by the #3 peak is consistent with either peak #1 or peak #2, it is added to the group. This process continues until a peak is encountered that indicates a pose state that is not consistent with one or more of the higher-ranked peaks. The peak selection process is then ended.

The poses indicated by the grouped peaks are next combined using a weighted average, where the weight is the (correlation) value of each respective peak. The weighted average pose can then be passed to the pose refinement operation, detailed earlier.

Figure 13:
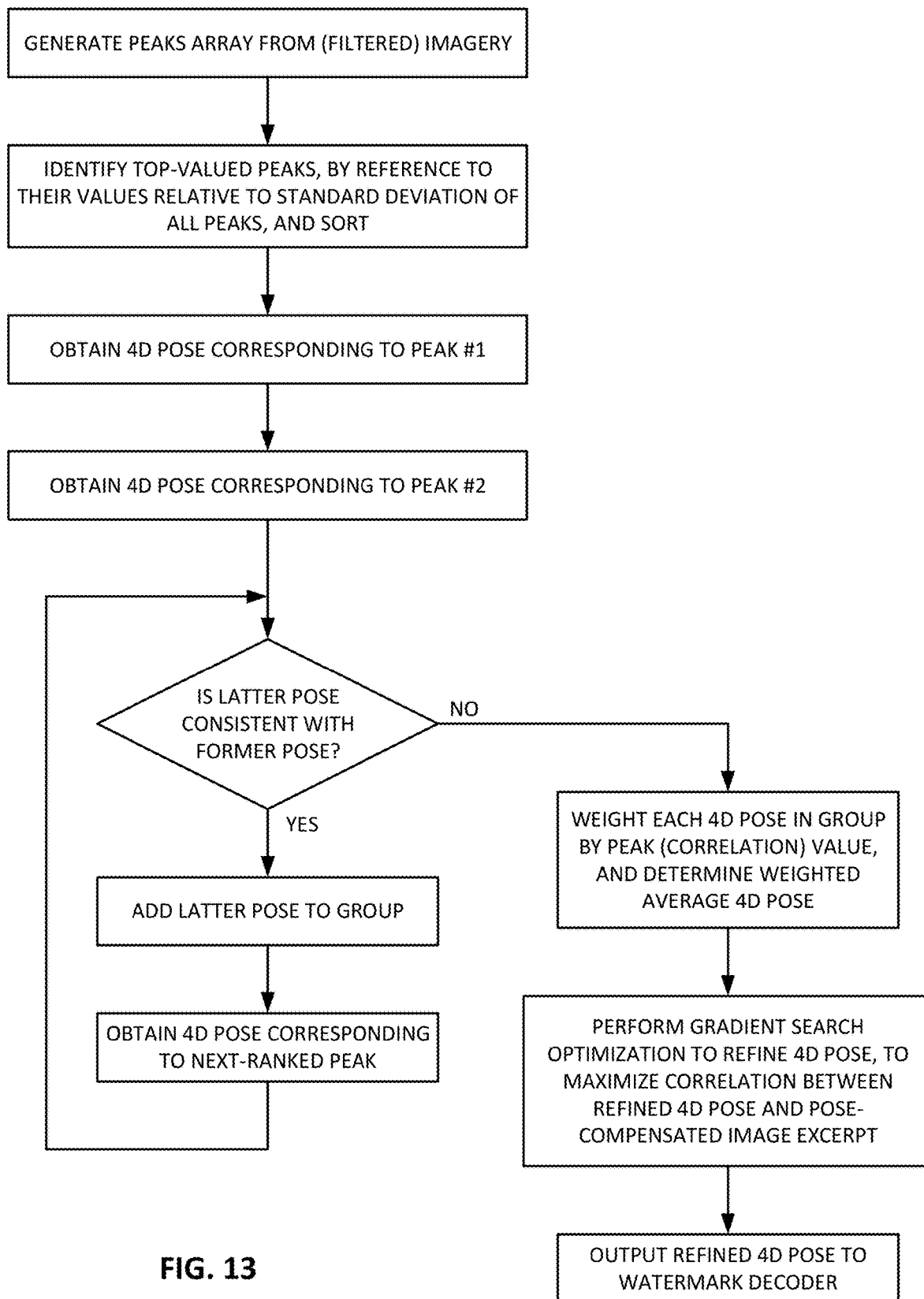
FIG. 13 details an algorithm according to one embodiment of the present technology.

This second approach to pose determination may be termed the "top consistent peaks" approach. A corresponding flow chart is shown in FIG. 13.

Figure 14A:
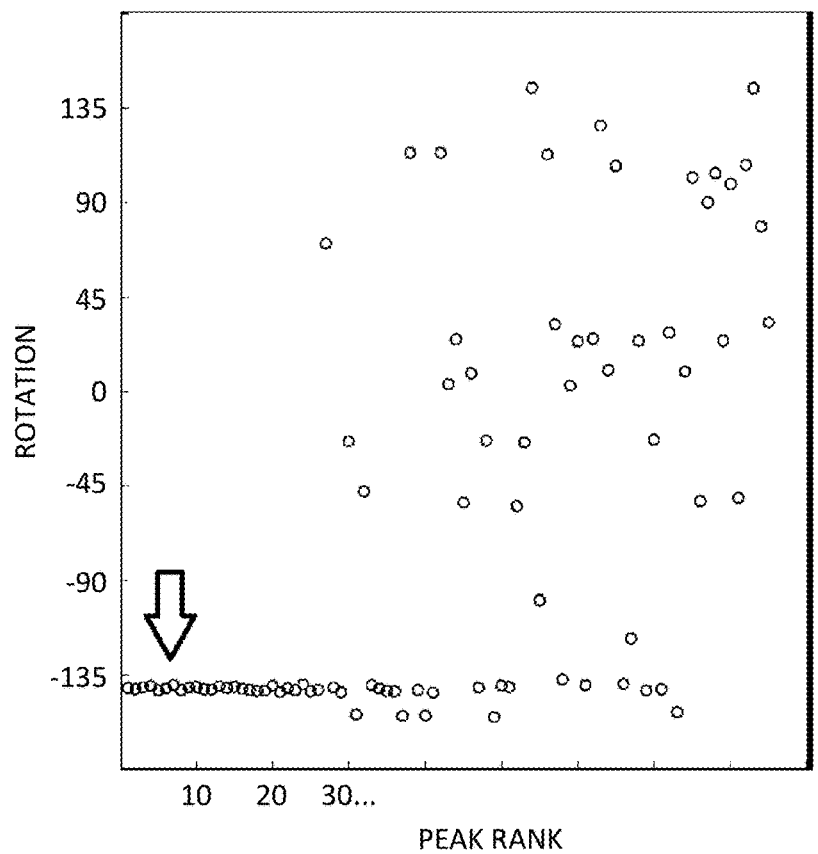
FIGS. 14A and 14B show that the top "peaks" produced in one aspect of the technology consistently indicate the same rotation state of an excerpt of sampled imagery.

To put this approach in context, FIG. 14A shows the rotation data indicated by the top 100 peaks for a particular image excerpt. As can be seen, the top 30 or so peaks consistently indicate a rotation of about −139.5 degrees. Although not shown in FIG. 14A, similar consistency is observed among the other parameters (scale, x-translation, and y-translation).

Figure 14B:
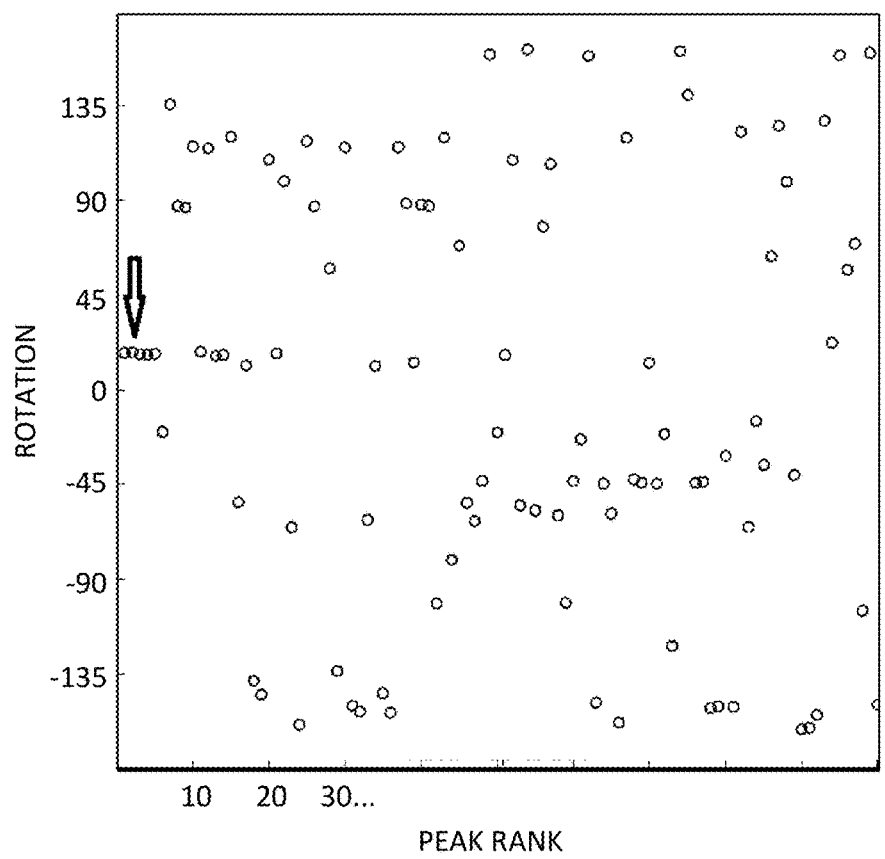

FIG. 14B is similar to FIG. 14A, but corresponds to different captured imagery, bearing a weaker watermark signal. Here, the top five candidates consistently indicate the same rotation. Again, similar consistency is found among the other parameters.

Figure 15:
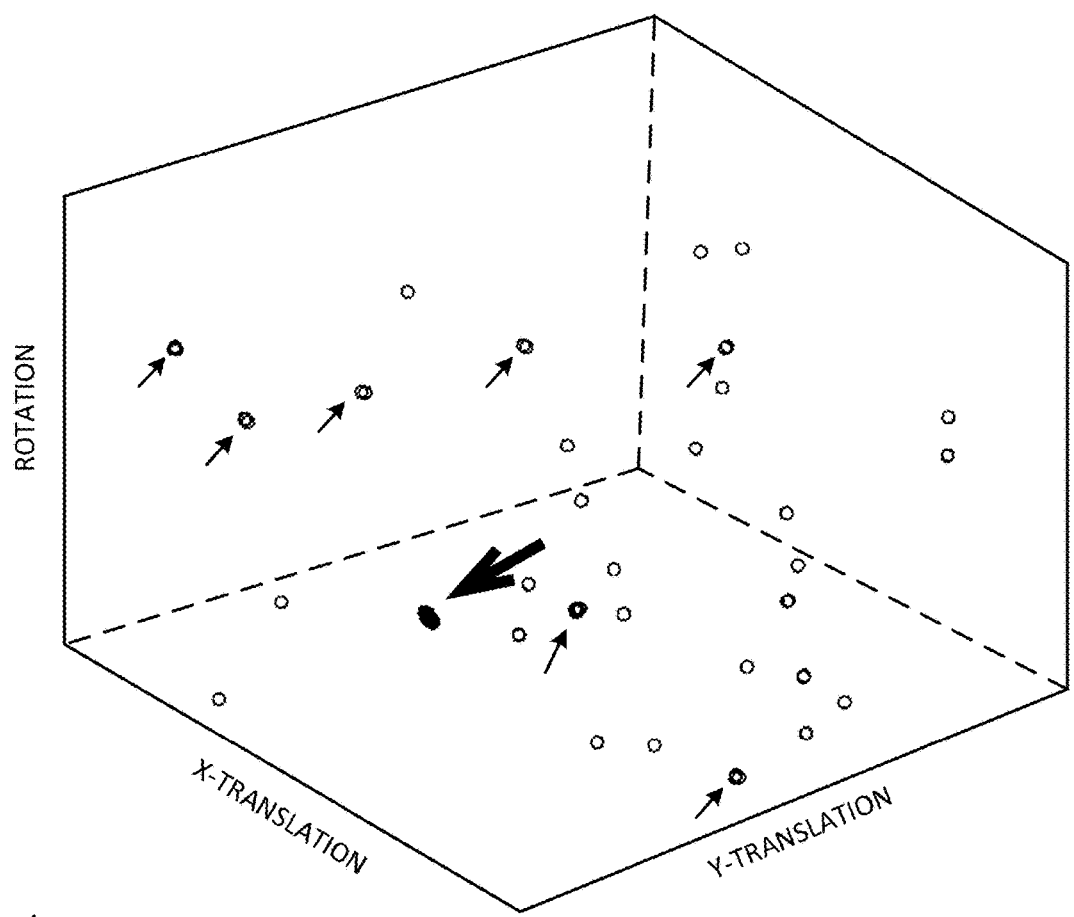
FIG. 15 shows results like FIG. 14A, but in three dimensions (rotation, x-translation, and y-translation).

FIGS. 14A and 14B have a horizontal "Peak Rank" scale. This is lost in FIG. 15, which plots three of the 4D parameters indicated by the top 100 candidates derived from an illustrative image region. (The fourth parameter—scale—isn't shown in FIG. 15 due the difficulties of depicting a 4D chart.) The larger arrow shows the consistent pose indicated by the top dozen or so peaks. The chart also shows, by smaller arrow, how secondary clumps can also form—comprised of smaller numbers of (typically) lower-ranked peaks. In some embodiments, watermark decoding can be attempted at a few (e.g., a dozen) candidate pose states indicated by these clumps—the pose most voted-for among the top peaks, and the next-several. Only one will yield correctly-decoded payload data. (Correct decoding is confirmed by a valid CRC check from the payload data.)

(If a signal is detected, the affine state information corresponding to the top peaks will typically agree within a narrow range, e.g., with rotation to within two degrees, scale state to within three percent, and x- and y-translation to within one waxel. Such agreement may be termed "coincident" pose states.)

This leads to a third approach to pose determination. Instead of considering the weighted average pose determined from the top consistent peaks, a larger group of N high-valued peaks can be considered (e.g., N=100 or 1000). The pose indicated by each peak is determined. Plural clumps are then formed among the indicated pose states.

Clumping can proceed as described above, using the same "consistency" metric as before. A first clump grows so long as each successive peak indicates a pose state that is consistent with one of the pose states already in the first clump. When a pose state is encountered that is outside the bounds of consistency, a second clump is started. Further peak-indicated pose states are considered, and are assigned to either the first or second clumps until a pose state is encountered that is consistent with neither of the existing clumps. A third clump is then formed. This process continues until all N peaks have been considered and assigned to a clump (some of which may contain only a single pose state).

A weighted average pose state is next computed from each clump. Each weighted average pose state is then refined, using the process detailed earlier. Each refinement process concludes with a correlation value—indicating the best correlation that could be achieved by the detailed iterative perturbation process, between the image excerpt (after processing to counteract the indicated pose state), and the watermark signal block. One of these refinement processes will yield a correlation value higher than the others. The refined pose state associated with this highest correlation value is then taken as the correct pose state. Its parameters are passed to the watermark decoder for extraction of the watermark payload from the image excerpt.

Figure 16:
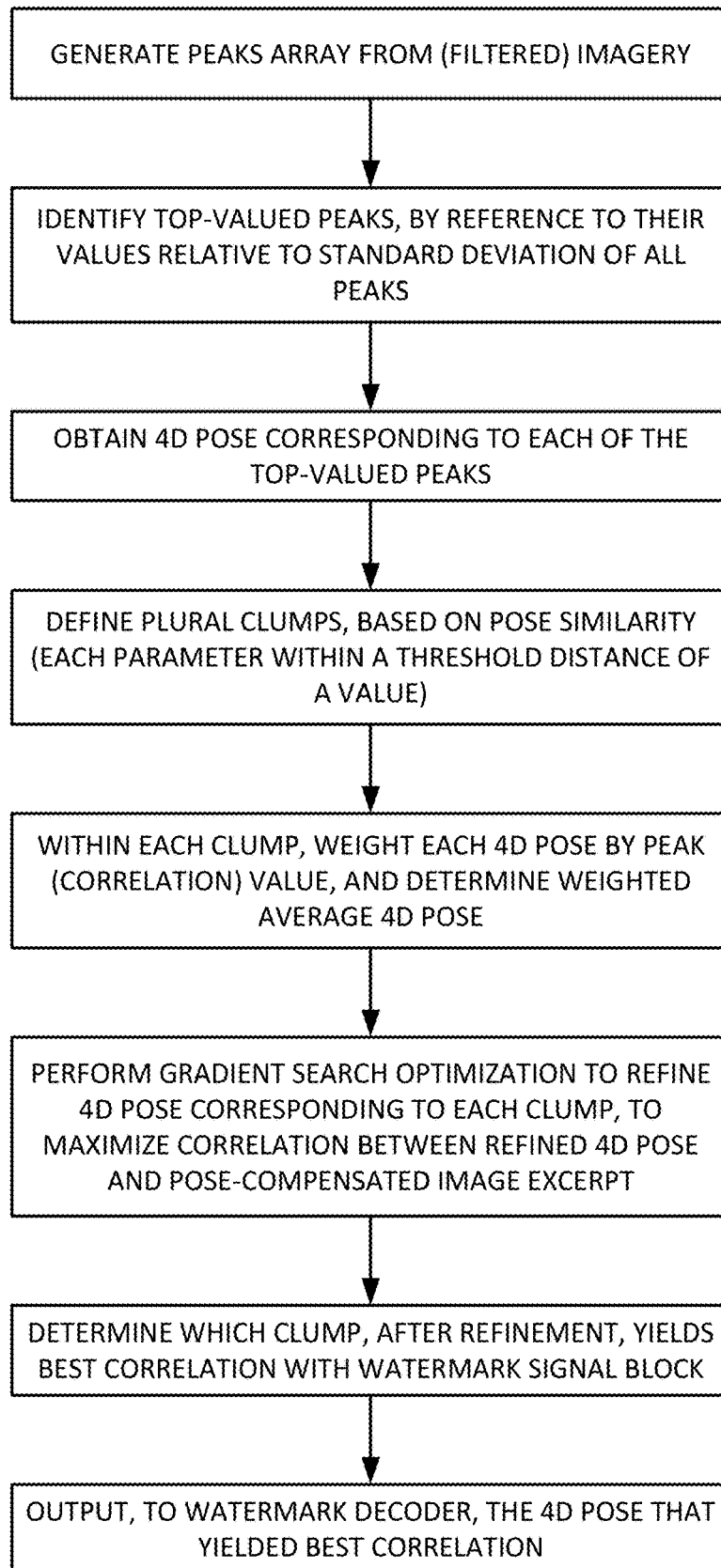
FIG. 16 details an algorithm according to one embodiment of the present technology.

Such approach may be termed a "plural clumps" approach. In most cases—but not all—the best correlation value will be achieved by refinement of the clump having the largest number of members. This approach is illustrated by FIG. 16.

A fourth approach to pose determination is premised on the assumption that the captured imagery depicts generally planar artwork (or at least locally planar artwork), and to test two excerpts from the imagery for consistency of indicated pose.

Figure 17:
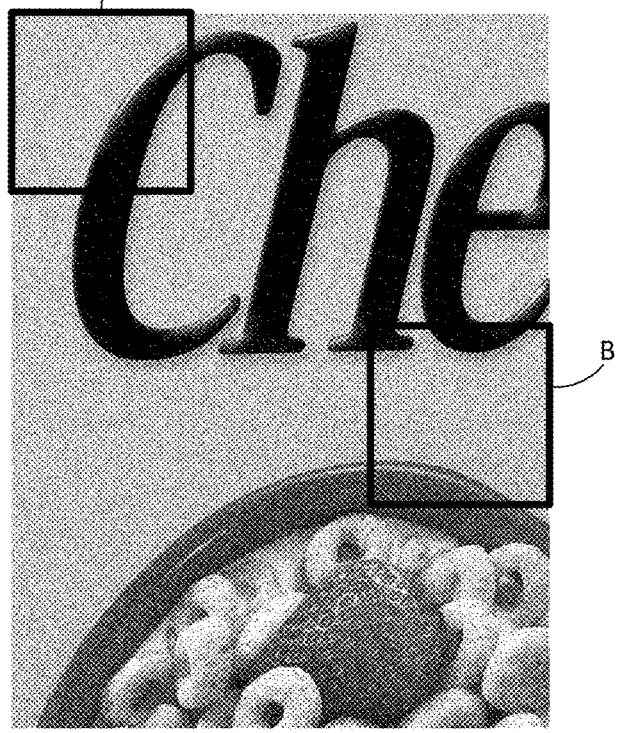
FIG. 17 shows two image regions excerpted from an image, used in a cross-patch approach to pose determination.

Consider the image of FIG. 17, showing a camera-captured image of part of a cereal box. Two different, non-overlapping regions, "A" and "B" are separately examined. Region A is processed as above (placed in a zero-filled array, transformed to the Fourier domain, point-wise multiplied with the Fourier template 73', and inverse transformed back to produce a peaks array). The largest N peaks (e.g., 5 or 20) from that array are identified, and the 4D pose corresponding to each peak is determined.

The process is repeated with Region B.

If a 4D pose state ("PoseB") determined for Region B is consistent with a 4D pose state ("PoseA") determined for Region A (e.g., within the thresholds discussed earlier for grouping and clumping), it is highly unlikely that such coincidence is random. Instead, this is evidence that the commonly-indicated pose state is the correct pose state.

Once such consistency has been found, a clump is formed of all the determined 2N pose states that are consistent with PoseA or PoseB. (This clump may include just the two pose states, or it may be as large as 2N pose states.) A weighted average of these clumped pose states is determined (i.e., weighting each pose state by its respective peak value), and the result is then passed to the pose refinement procedure detailed earlier.

Figure 18:
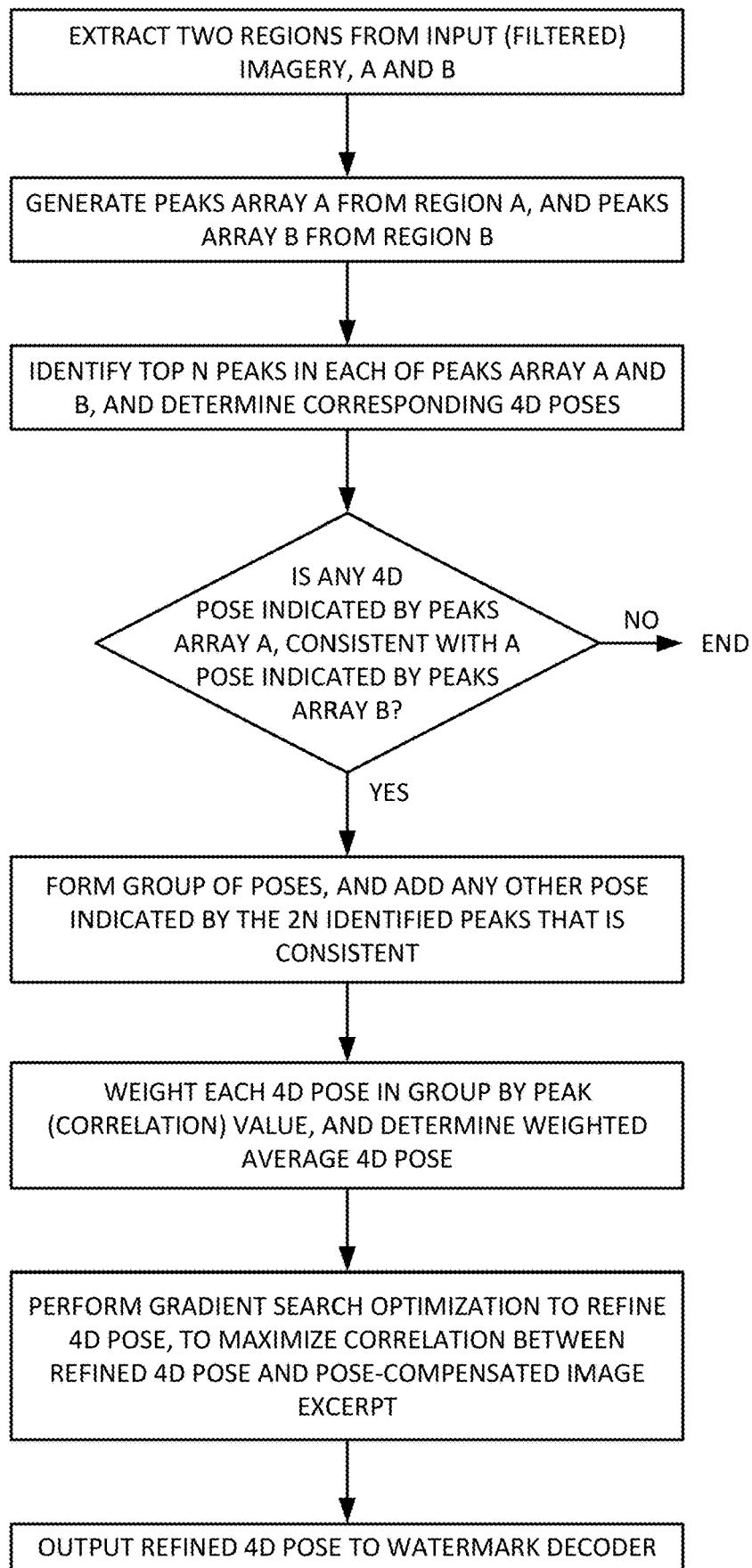
FIG. 18 details an algorithm according to one embodiment of the present technology.

The just-detailed fourth procedure may be termed "cross-patch clumping" or "intra-patch clumping"—referring to cross-checking between patches within a single captured image, for consistency of indicated poses. This approach is illustrated by FIG. 18.

In variant embodiments, instead of considering two regions, the process can be extended to three or more regions—again checking that a peak corresponding to each indicates a consistent pose. If a large number of regions is considered (e.g., five or more), then some allowance may be granted for a small fraction of the regions not having a peak indicating a consistent pose. For example, if a 128×128 image excerpt is divided into 16 non-overlapping 32×32 regions, then if 13 or 14 or 15 of the regions all yield a top peak indicating consistent poses, then this may be taken as a confident determination of the indicated pose. (The odds of, e.g., 13 out of 16 small regions all indicating a common pose is somewhat astronomical.)

In another embodiment, a 128×128 patch of query imagery is divided into 16 component patches of size 32×32. Each is processed using one of the above-described methods to generate an array of peaks. Again, the top peaks resulting from each patch are compared with such peaks from other patches to find a consensus set of pose parameters. Ideally, each indicates a consistent scale and rotation. And the x- and y-translation values should be spaced-apart by some x- and/or y-increment of 32, depending on position of a particular patch among the 16 patches excerpted from the 128×128 patch.

The above-detailed procedures yield results that are sometimes startlingly superior to results from prior art watermark detection methods.

Figure 19:
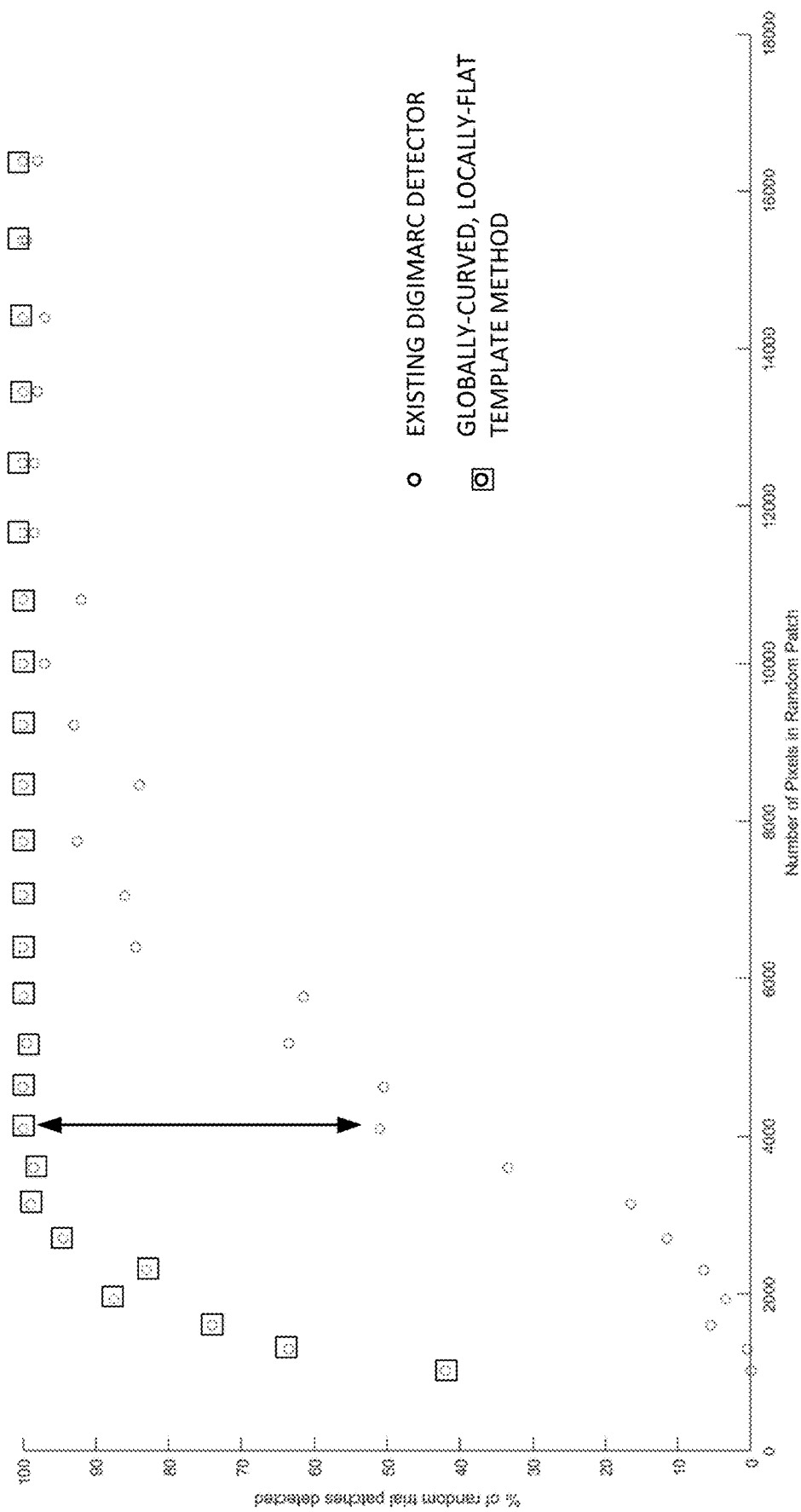
FIG. 19 contrasts the performance of an embodiment of the present technology with a prior art arrangement, demonstrating better performance in determining scale and rotation of small image excerpts.

FIG. 19 contrasts results of the just-described arrangement (labeled "Globally-Curved, Locally-Flat Template Method") with those of the existing Digimarc watermark detector. The horizontal axis is the number of pixels in the query image region. The vertical axis indicates the success percentage (i.e., accurately reporting the scale/rotation/x-translation and y-translation of the query image region, for randomly scaled, rotated, and translated query excerpts). As shown by the double-headed arrow, at patch sizes of 64×64 pixels (i.e., 4096 pixels) and less, the present method correctly determines affine state at least twice as reliably as the existing Digimarc detector.

While FIG. 19 details relative performance of the above-described method as a function of patch size, another study shows performance as a function of watermark strength. In this study, 20 trials were conducted at each of plural different watermark strengths. Indicated in Table I, below, is the number of times—out of twenty—that the different methods yielded the correct affine state information:

TABLE I

| Watermark Strength | Existing Digimarc Detector | Above-Detailed Method |
|---|---|---|
| .1 | 19 | 20 |
| .06 | 16 | 20 |
| .04 | 3 | 20 |
| .035 | 1 | 20 |
| .03 | 0 | 14 |
| .025 | 0 | 13 |
| .02 | 0 | 2 |

(The Watermark Strength corresponds to the amplitude of the calibration signal, such as the gridgain variable in the MatLab code referenced herein.)

Table II shows a further test—this one performed on image patches measuring 32×32 pixels, randomly taken from a watermarked egret. Here, the watermark strength is a relative scale, with "1" corresponding to a gridgain value of 0.03. This test involved a template 73 that measured 32 megs, spanning all rotation states, and scale states in the range of 80-120%. 1000 trials were conducted at each watermark strength. The table shows the percentage of time that the different methods yielded the correct pose.

TABLE II

| Watermark Strength | Existing Digimarc Detector | Above-Detailed Method |
|---|---|---|
| 5 | 98.5% | 100% |
| 4 | 96.1% | 100% |
| 3 | 87.1% | 100% |
| 2 | 48.8% | 99.9% |
| 1.5 | 17.2% | 95.1% |
| 1 | 3.4% | 50.9% |
| 0.75 | 1.3% | 14.4% |
| 0.66 | 1.2% | 5.8% |

As can be seen, the above-detailed method succeeds reliably at low watermark strengths, at which the existing Digimarc detector succeeds rarely—if at all.

Applicant believes that this superior performance of the detailed arrangement is due to the fact that the existing Digimarc detector tries to discern dozens of different signals—the spatial frequency peaks defining the calibration signal—in order to judge pose. The above-described method, in contrast, considers just a single signal: a match between the query image excerpt and the template 73. Since the former method requires dozens of different signals to be identified—instead of just one—more aggregate watermark signal must be present in order for detection to occur reliably.

To review, one particular arrangement of the present technology defines first data in a first data structure (e.g., a template). This first data represents a tiled 2D signal at plural rotations and plural scales. Such data is globally curved.

Next, a 2D excerpt of second data is compared with this first data, to determine a first location within the first data where the excerpt best matches. Based on this location, a corresponding set of affine state information for the 2D excerpt is determined. A digital watermark decoding procedure can then be applied to the 2D excerpt, based on this determined affine state information.

Figure 20:
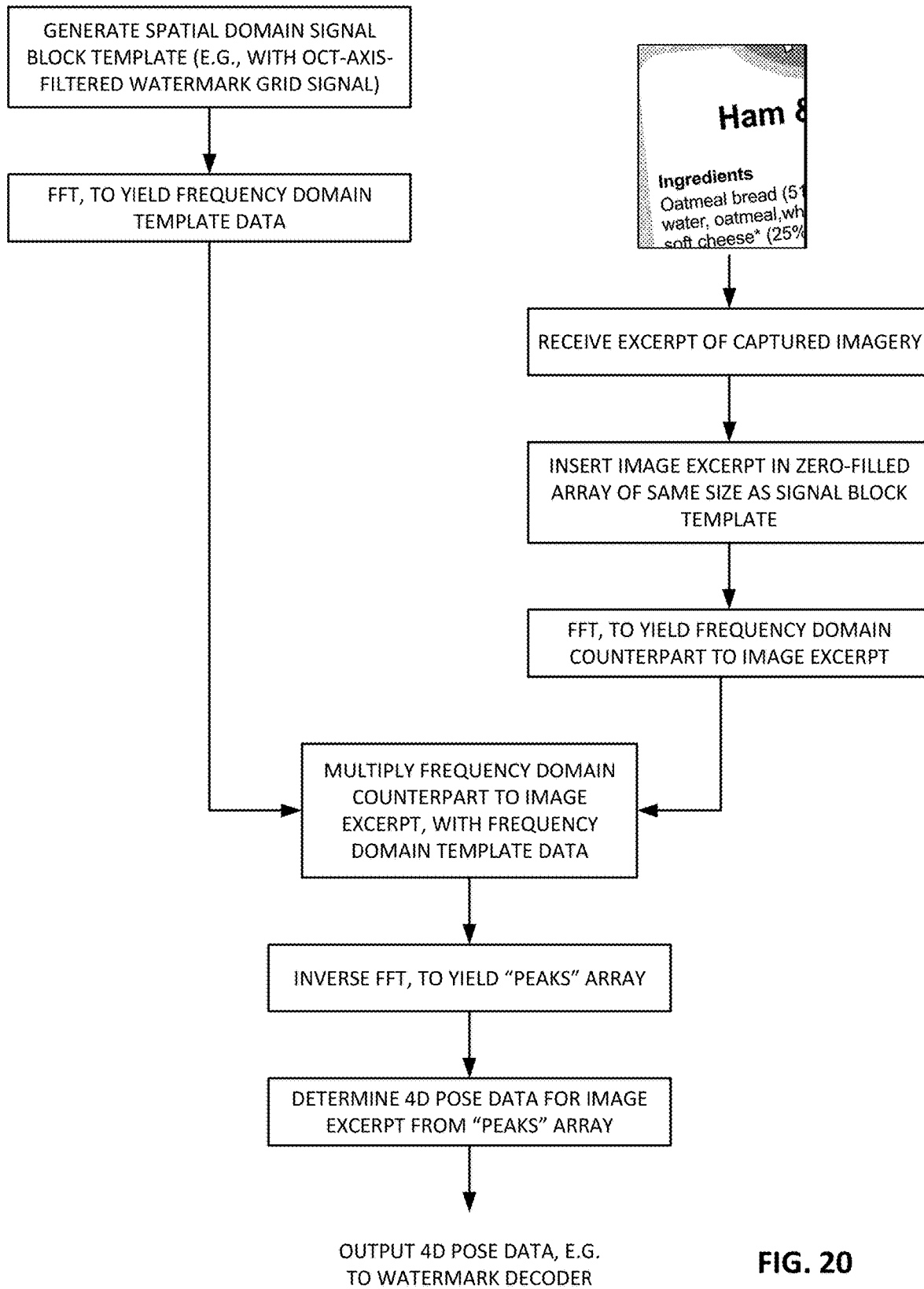
FIG. 20 details an algorithm according to one embodiment of the present technology.

FIG. 20 illustrates another particular arrangement.

Although four dimensions of pose are discussed above, many more can be employed, including tip, tilt, perspective parameters, and curvature.

Tip may be regarded as the distortion introduced when a subject is not parallel to a camera's imaging plane, but is oriented so that its top edge is closer (or further) from the camera sensor. Ignoring perspective, this results in a shortening of the side edges. Tilt is the same, but orthogonal, and may be regarded as the distortion introduced when a subject is oriented so that a side edge is closer (or further) from the camera sensor. This results in a shortening of the top and bottom edges.

Figure 21:
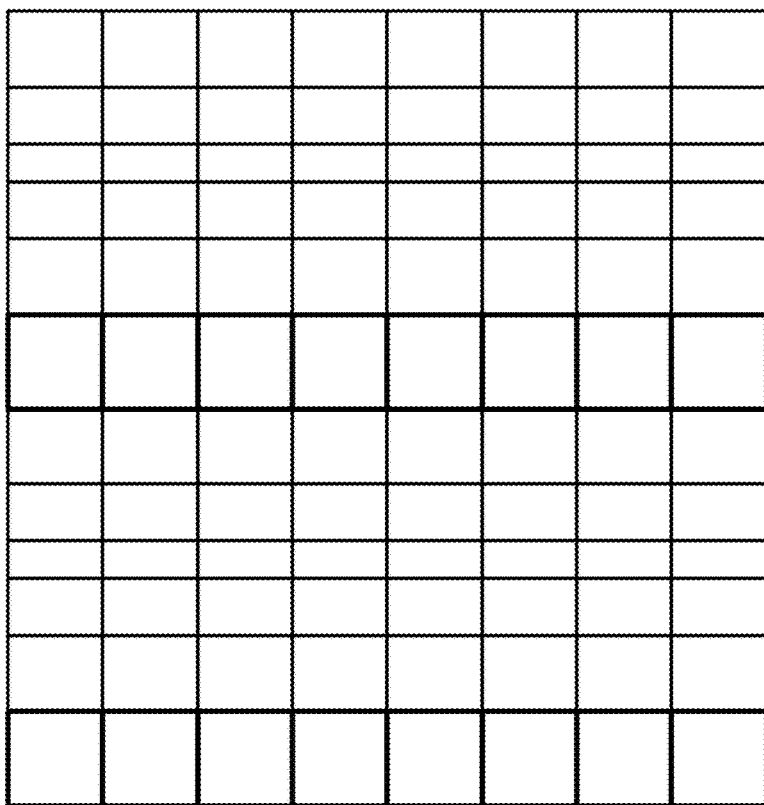
FIG. 21 illustrates that the array of blocks, to be sampled with the curved arcs, may be non-uniform, e.g., with tip and tilt (differential scaling).

To extend the present technology to include tip and tilt, the square watermark tiles can be arrayed in a fashion that presents them with various degrees of tip, shortened vertically, as shown in FIG. 21. Such an array can be sampled with the circular arcs 18, as described earlier. Although the depicted array includes only tipped depictions of the signal block, these are sampled so as to also represent tilt, since the sampling arcs traverse them both vertically and horizontally during the course of their 360° travel.

As before, each sample point in the resulting template is associated with a set of affine parameters—now numbering six (scale, rotation, x-translation, y-translation, tip and tilt).

The added two dimensions requires a larger array of blocks to sample, if the rotation and scale resolution of non-tip/non-tilt blocks is to be kept at the same granularity as before. This can require sampling that starts with a radius larger than 9,455.53 waxels, and with angular increments smaller than 0.005493°. Although somewhat more complicated, it will be recognized that the array of FIG. 21 can be sampled with modulo methods, like those detailed earlier.

Figure 22:
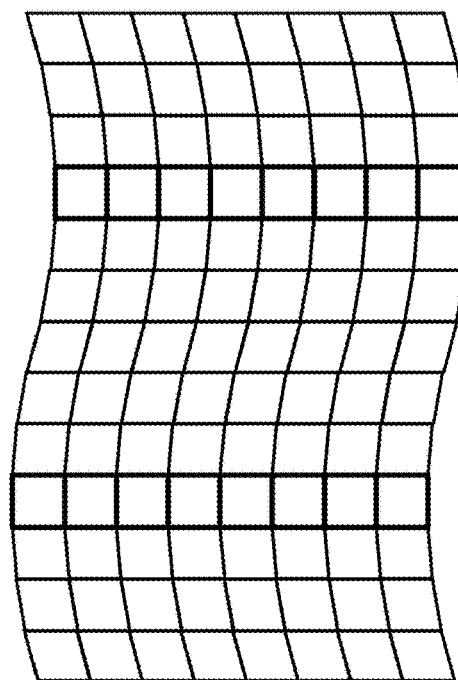
FIG. 22 illustrates that the array of blocks, to be sampled with the curved arcs, may be non-uniform, e.g., with shearing.

FIG. 21 depicts a very simple warping of the FIG. 1 tiled array 12. FIG. 22 shows a another—this one permitting horizontal and vertical shearing to be determined. It should be recognized that much more complicated warps of the FIG. 2 tiled array 12 can be employed, leading to sampling of other distortion phenomena.

Instead of warping the array of blocks that is sampled, the same and other effects can be produced by distorting the sampling arcs from their earlier-described circular shapes.

Figure 23:
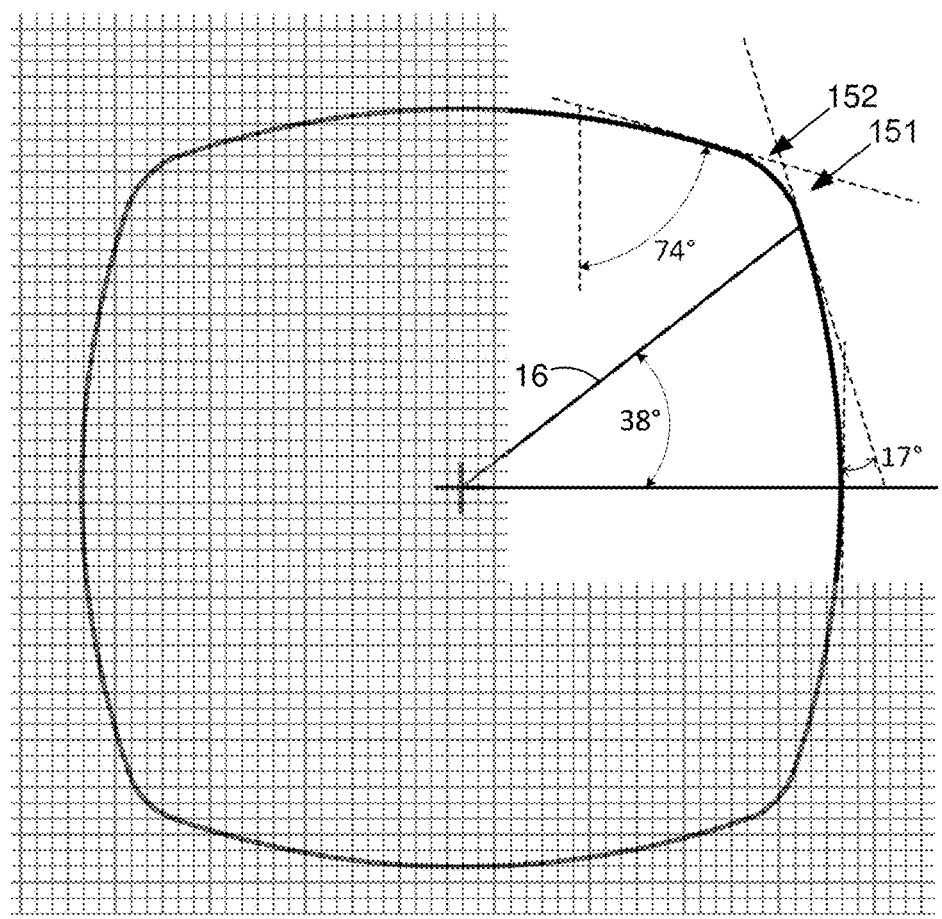
FIG. 23 shows how the arcs along which angular samples are taken can be other than circular.

Consider, by way of introduction, the sampling path shown in FIG. 23. (For clarity's sake, only one sampling path is detailed; others (e.g., 2047 others) are concentric, at progressively larger scales.) Sampling can start to the far right and proceed in a counter-clockwise direction, as described earlier. The tangent to the sampling path, at this starting point, is a vertical line.

As sampling progresses in the counter-clockwise direction, this tangent varies only slowly. During the first 38 degrees of travel by the sampling radius 16, the tangent to the sampling path changes only 17.° This results in a very fine-grained sampling of the rotation parameter through this range of 0 to 17.°

The upper right "corner" of the sampling path is just the opposite. The tangent changes from 17° to 74° in the course of just about 10° of rotation of the sampling radius 16

(between locations 151 and 152). Data corresponding to the signal at rotations between 17° and 74° are thus very sparsely sampled.

Along the top of the path, the rotation again changes very slowly, again resulting in very dense sampling of data corresponding to the watermark signal at rotations between 74 and 106° degrees. Etc.

Sampling paths like that just-described are useful when the input imagery submitted for watermark-decoding is reliably captured with a camera held vertically or horizontally, or nearly so. This may be the case, e.g., when consumers use smartphones to capture imagery of products resting on store shelves. The subject is vertically and horizontally oriented on the horizontal store shelf, and the camera is typically held in a corresponding vertical or horizontal position. In contrast, the FIG. 23 arrangement would not be useful in decoding watermarks from products passed over a checkout point of sale (POS) scanner—at which subjects are commonly depicted at random angles.

The sampling path of FIG. 23 is characterized by a monotonically-increasing tangent angle. This need not be the case. Consider the concentric scanning paths of FIG. 24. The tangent varies both up and down along the course of the path (as a sinusoidal modulation on a circular path).

Figure 24:
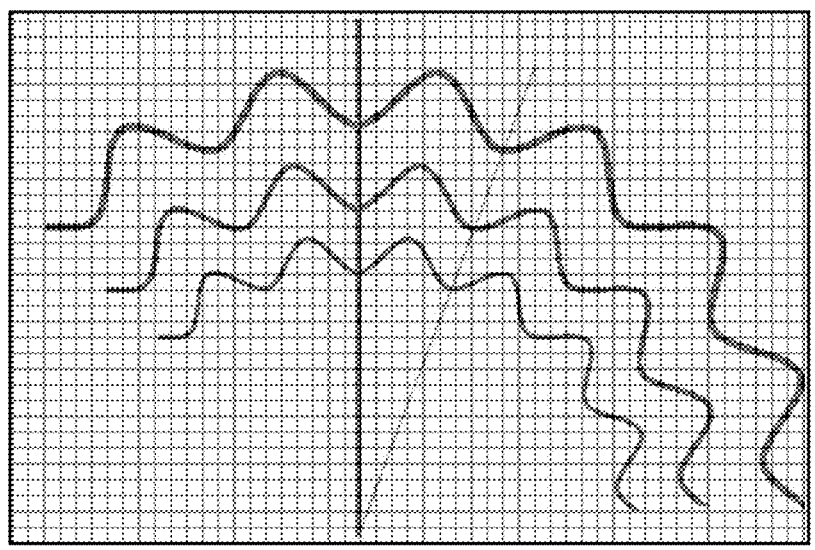
FIG. 24 shows how the arcs along which angular samples are taken can be other than closed.

The number of scanning paths, and the variety of their geometries, is limitless. FIGS. 23 and 24 just begin to explore the subject.

Moreover, the scanning paths needn't define closed shapes. As shown in FIG. 24, the end of each scanning path needn't meet up with its beginning. A range of pose states are thereby not characterized in the resulting template, but in some applications, such an omitted range of pose states is acceptable.

Applicant terms scanning paths like those shown in FIGS. 23 and 24 "meandering paths." Again, modulo methods can be employed to sample data in such embodiments.

In the arrangements described above, an oct-axis-processed known watermark signal (or other 2D signal) is sampled at a great number of points to yield a reference template 73. This template is transformed into a frequency domain representation 73,' multiplied with a frequency domain counterpart of an oct-axis-processed query signal, and then inverse-FFT'd back to the spatial domain to yield a result array that indicates an answer. While this is the most common case, other embodiments switch the reference and query data roles. That is, a patch of query imagery is oct-axis-processed, (optionally tiled) and sampled at a great number of points to yield a query template. This template is transformed into a frequency domain representation, where it is multiplied with a frequency domain counterpart of the oct-axis-processed known watermark signal (e.g., calibration signal). The result is then inverse-FFT'd back to the spatial domain, where top peaks are ranked and indicate the affine state answer, as before.

The methods described above can be simplified in various respects; the above descriptions help in understanding the technology but may not be suited for particular implementations.

For example, while the detailed arrangement yields affine state information for a query region of imagery, this comes with a computational burden that is larger than may be necessary. A different approach breaks the process into stages.

A first stage compares the query image region with a smaller, coarse template, e.g., of size 32,768×1024. (This coarse template is generated by the foregoing process, but with a less granular sampling of the affine pose universe, e.g., with angular increments of 0.01099°). A coarse assessment of the image region's affine state is thereby obtained, e.g., specifying its rotation to within 5 degrees, and its scale to within 5%.

In a second stage, a small piece is excerpted from the FIG. 8 template 73. By limiting the rotation to within 5 degrees, 355 degrees of other rotation data can be discarded, or 98.6% of the vertical extent of the depicted FIG. 8 template 73. Similarly, by limiting the scale to within 5 percent (within the template's range of 90% to 110%), three-fourths of the template's width can similarly be disregarded. An FFT of such a narrowed region of the template can be computed (or may be selected from a library of pre-computed transformed such regions), multiplied by the FFT of the image region, and the small result quickly inverse-FFT'd to yield the result array data, from which peaks can be examined as before.

Still further optimizations can employ other fractions of the above-detailed data. For example, matching can be based on 1D line data, rather than 2D image data.

Consider that either a horizontal row (or vertical column), of 48 elements taken from the 48×48 element set of oct-axis data produced from the query image region (the query data), should closely correspond to a string of 48 consecutive values in some row of the template 73.

An approximate string-matching algorithm can be employed to identify N such candidate matches in the template.

Each candidate match can be checked by considering the two rows in the template that adjoin a candidate row, and checking for correspondence with the two adjoining rows from the query data.

To illustrate, consider the following. Exemplary oct-axis data consists of only 9 possible values. For expository convenience, consider them to be a, b, c, d, e, f, g, h, and i. A row of data from the middle of the query data patch (corresponding to the query image) may be:

AcheBedEgadBachAcidBidIdeaAcidChiaAgedEach-IceAcheBig (Capitals are inserted simply to help aid comparison.) Searching for approximate string matches in the template may find two candidates—each off by three letters:

(a) . . . AcheBadEgadBachAcidBidIdeaAcid-ChiaAgedEachIceAcheBag . . . ; and (b) . . . AcheBedEgadBachAcidBedIdeaAcid-ChiaAgedEachIceAcheBeg . . .

(Each row in the FIG. 8 template 73 has 2048 elements, so a 48 element string is just a small fraction of a row—thus the ellipses.)

These two candidate matches can be further checked by considering the values in the template 73 immediately above, and immediately below the candidate matches, looking for correspondence with an adjoining row of data from the query data.

An adjoining row of data from the set of query data may read:

CagedAgedBidAgeHideEgadEgadAidDigIcedHead-CagedBagBig

Above and below candidate row (a) in the template may be data:

(1) . . . AchedAideChaiAcidIdeaHadEachBegBedBeg-EgadHeadCagedHag . . . ; and (2) . . . AidAchedIcedAgedHideBadgeAbideBeadAge-dIdeaIcedAideEachIce . . .

No close match there. (More than 49 symbols are included in the above, as a match may be shifted left or right by one or two elements, depending on the rotation state.)

Above and below candidate row (b) in the template may be data:

(1) . . . IdeaAgeHeadAbideAceBideHeadDiceDigChaiBegAbideEgadBeach; and
(2) . . . CagedAgedBigAgeHideEgadEgadAidDaglcedHeedCagedBigBig . . .

Bingo. Below candidate row (b) in the template is a second string of data that closely corresponds to the second row of query data. This indicates a high probability match. The affine data associated with the middle element of the template string that matched the middle row of the query data indicates the affine state of the query image patch.

Instead of performing approximate string matching, correspondence can alternatively be determined by concatenating all rows of the template 73 together into one long 1D vector, and performing a 1D FFT on this data. A similarly-long 1D vector can be produced by starting with the 49 symbols from the middle row of the query data, with zeros filling the other string positions. Again, a 1D FFT is performed on this query data. The results of the two FFTs are multiplied, and the results are inverse FFT'd. As before, the peaks in the result array can be examined as candidate matches.

(A variety of approximate string matching techniques are known, as illustrated, e.g., by the Wikipedia article entitled "Approximate String Matching" and U.S. Pat. Nos. 6,535,642, 9,280,577, 20060004744, 20070214130 and 20070260595.)

Geometry

Figure 25:
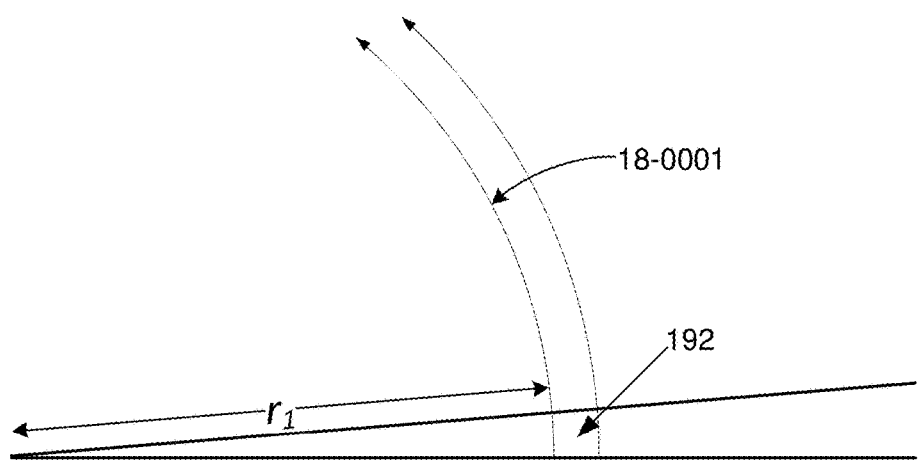
FIGS. 25 and 26 detail geometrical constraints associated with obtaining essentially square sampling of the 2D signal.
Figure 26:
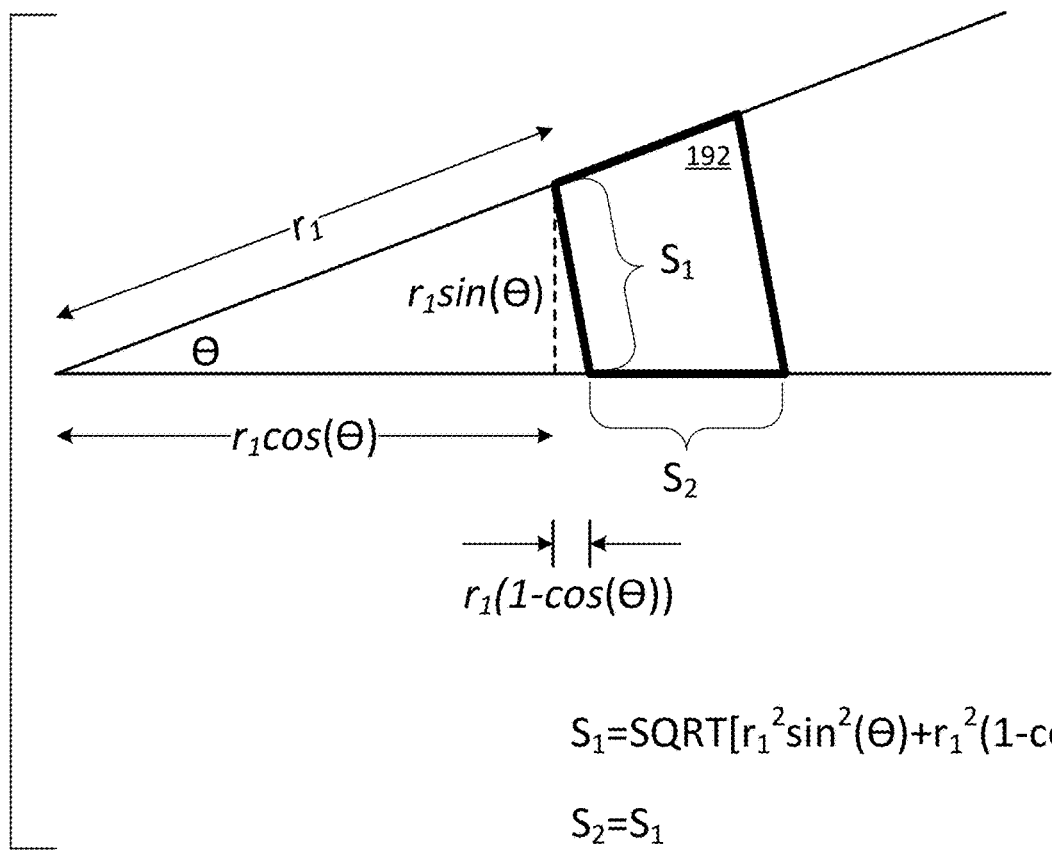

Referring to FIGS. 25 and 26, it is desirable (although not essential) that sample spacings along the radial lines, and along the angular increments, define elemental mesh units 192 with nearly equal sides.

Consider the unit of angular increment to be θ. In an earlier example, if there are 2^16 angular increments, spanning a full 360 degrees, then θ=360/(2^16)=0.005493 degrees.

If a first circular arc 18-0001 is 9455.53 waxels away from the origin (call this distance $r_1$), the distance between the first sample points on the first and second radial lines (call this distance $S_1$) is $k*r_1$, where $k=\sqrt{\sin^2(\theta) \pm (1-\cos^2(\theta))}$. In this example, k=0.000135586 and $S_1$=0.9065 waxel. The first sample spacing along these two radial lines (call this distance $S_2$) should also be set equal to $S_1$.

NOTES ON APPENDICES TO PRIORITY APPLICATIONS

Attached to previous application 62/611,404 are software appendices 12-A through 12-DD. Attached to application 62/581,523 are software appendices A2-P2 and A3-D3. Attached to previous application 62/573,601 are appendices A1 and J-T. Attached to previous application 62/565,659 are software appendices A-I. These previous applications are incorporated herein by reference, so their appendices also form part of the present specification.

An image that is commonly used to exercise much of the code depicts an egret, shown in FIG. 27A. This image is watermarked, and different square excerpts are taken from a central region of the watermarked image for testing. One such excerpt is shown in FIG. 27B. As noted, such image excerpts are commonly oct-axis processed to attenuate the host image signal, leaving the watermark signal with an enhanced signal-to-noise ratio. The excerpt of FIG. 27B, after such oct-axis processing, is shown in FIG. 27C.

Appendix 12-A (attached to 62/611,404) is MatLab code (main.m) that practices an implementation of the above-detailed methodology. Parts of the code serve as an experimental testing platform, e.g., providing visualization of certain parameters, and gathering statistics to facilitate evaluation and comparison of a particular implementation with other implementations, and with Digimarc's existing Digimarc watermark detector.

A watermark signal useful with the software code in all these applications comprises 60 components of different phases (specified in radians) in the spatial frequency domain (u, v). Parameters for that signal are defined in Appendix 12-DD. (Another such watermark signal is detailed in an appendix to the predecessor application Ser. No. 15/641,081.)

The watermark signal block is defined at lines 45-46 of the Appendix 12-A code (by reference to SampleGrid, found in Appendix 12-DD). The width (and height) of the watermark signal block is given at line 40: NN=128. When added to the egret image, the strength of the watermark signal is set by the gridgain parameter. (Noise is also added to the egret image, in an amount established by the noisegain parameter.) Function GenGridGivenQuad generates a spatial domain grid containing all specified grid points from the SampleGrid, but replicating such points as necessary to produce a quadrant-symmetric grid. The tif image 100 mm×100 mm_100 wpi is a tile of the grid signal, plus payload, at 100 waxels per inch.

The 128×128 array of watermark signal values (pattern1) is used frequently, and boundary issues often arise—when calculations rely on neighborhoods of points that extend into adjacent watermark blocks. To deal with this, the code employs an enlarged signal block, which includes additional values at the edges, representing points in adjoining blocks. This data structure is termed patternSupped (line 50, and Appendix 12-N).

Another variant of the 128×128 array of watermark signal values, again created to ease later computations, is gridPacked, detailed in Appendix 12-W.

Figure 28:
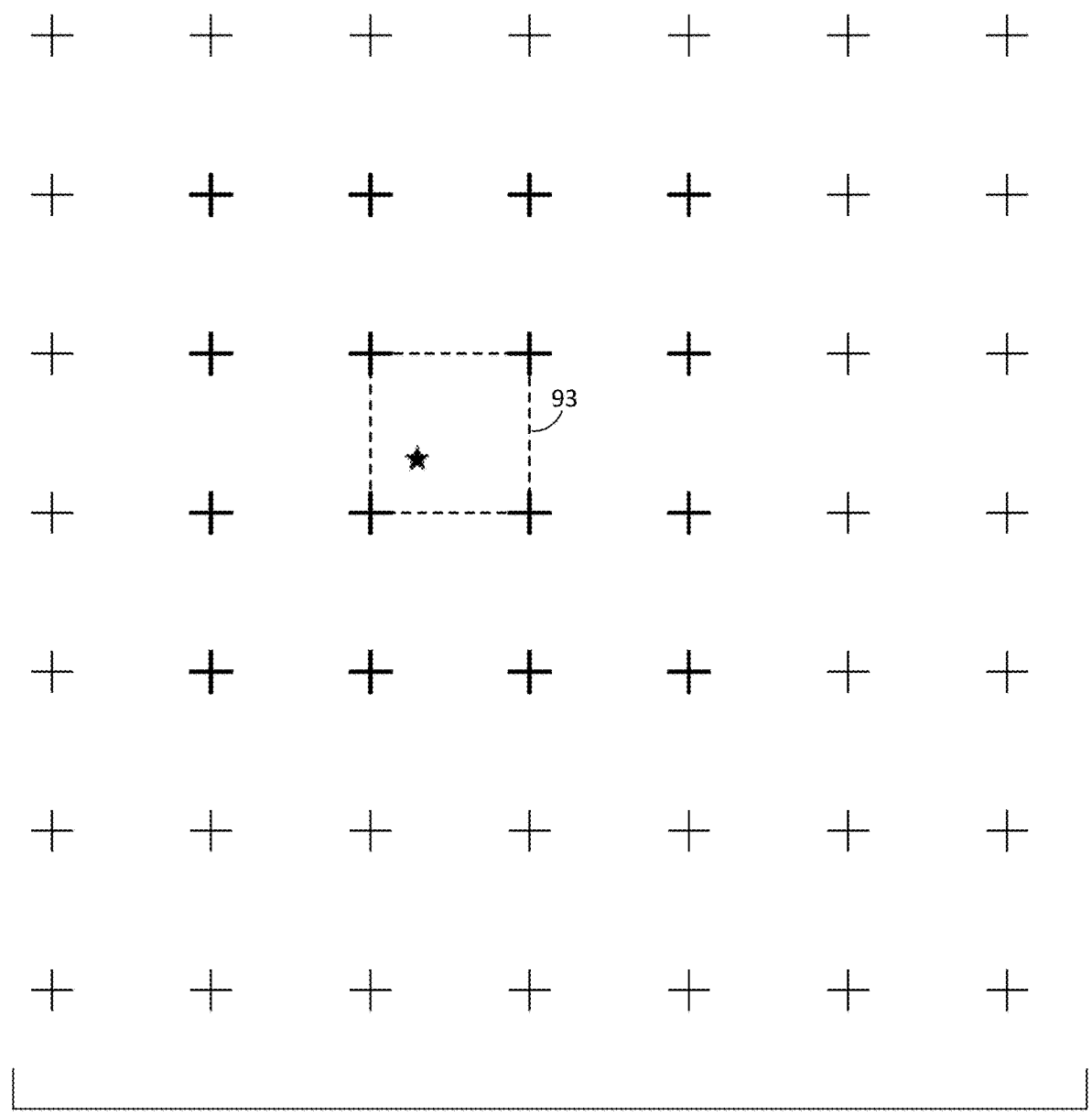
FIG. 28 helps illustrate a data structure used in interpolation, in accordance with one aspect of the technology.

The sampled watermark signal block, pattern1, is an array of discrete values, taken at different points. Some operations require interpolation between these discrete points. Consider FIG. 28, in which the discrete 128×128 watermark signal block is depicted as an array of plus symbols—each representing one location and one value. We may need to estimate the watermark signal value at the intermediate point denoted by the star. To do this, the code interpolates based on values of the nearest 16 discrete signal points (shown by bold plusses). There is a different set of 16 such signal points, for each different square region 93 that may contain an intermediate point of interest. And there are 128×128 such square regions 93. The array gridPacked contains the 16 watermark signal values associated with each of the 128^2 square regions for which an intermediate value may be needed—allowing these points to simply be recalled when needed.

The main.m code of Appendix 12-A can operate to locate the watermark signal block in the egret, or to locate the watermark signal block in a flat grey image (a "pure watermark tile"—used primarily for debugging).

The spatial domain watermark signal block template 73 is termed the allPose array in the software code. This template, together with its Fourier-transformed counterpart (allPoseF) is defined at line 53 of Appendix 12-A, in conjunction with Appendix 12-D.

At lines 88 and 126, the main.m code calls the compiled Matlab function uCDetectGrayMEX2017, which corresponds to Digimarc's current commercial watermark detector SDK. This is done, in the former instance, to check that the target image being worked with is properly watermarked, and in the latter instance, to obtain data about the watermark found in the image excerpt, against which results of the present technology can be compared. This function returns an array, ostats, that details various parameters discerned from the watermark. It will be recognized that this function is used in testing capacities only, and is not required to practice the technology described herein.

Line 93 of main.m begins a section of code in which a camera model is applied to the target image (e.g., the watermarked egret), to define an image excerpt as might be captured by a camera, of random scale, rotation, and x- and y-offset. These pose parameters are stored (as Pose_actuals) for later checking against results produced by the present technology.

Beginning at line 105 is the code that determines the pose of this image excerpt (targetPatch), culminating in the point-wise multiplication of the template 73' (allPoseF) and the Fourier counterpart to the image excerpt, and the inverse-Fourier transformation of the result to generate the peaks array, peaks, at line 143.

The peaks array is the same size as the template 73, i.e., large. For a 65,536×2048 template, the peaks array has 1.34 million values. Only the largest values are of consequence. To deal with this array more efficiently, the code applies a threshold—considering only peaks larger than 3 standard deviations from the mean value (Appendix 12-A at line 150). This smaller set of peaks is then sorted in descending order (line 152).

The scale and rotation indicated by each peak is determined by the row and column of the peak in the peaks array table. This is done at lines 161-166. The x- and y-translation values for each peak is determined at lines 171-175. These candidate pose values are then clumped together, as described earlier, into consistent groupings.

The Appendix 12-A code next diverts into some testing procedures—allowing different variables to be visualized.

The Appendix 12-A code concludes with instructions that perform a gradient-based pose refinement operation on a set of pose data.

Applicant has found that the peaks array can be biased by certain characteristics of the watermark signal, and/or the host image signal. This biasing seems particularly dependent on watermark scale. Accordingly, in accordance with a further aspect of the present technology, the peaks array can be normalized to mitigate the peak values' dependence on features other than correlation.

In one particular embodiment, the standard deviation is calculated for each of the, e.g., 2048 columns in the peaks array (corresponding to 2048 different scale states). The peaks in each column are then normalized by dividing their respective values by the standard deviation for that column. These normalized peaks are then used in all of the peak processing detailed herein. (Of course, other methods can be employed instead.) The result indicates each peak's value above its innate scale-dependent noisiness. Such processing involves the code detailed in Appendix 12-Q.

Appendix 12-B is an interpolation algorithm favored by applicant.

The code of Appendix 12-G takes, as input, a camera model (camera in), together with user-specified values of affine state (e.g., rotation, translation, tip, tilt), and defines an array of camera rays based on the specified model and the specified affine state.

As indicated, Appendix 12-N supplements an input tile (e.g., a 128×128 watermark signal) and adds a modulo-based border beyond the edges, so that operations can be performed on elements at the edge of the tile without running out of adjoining data. It is used, e.g., when interpolating near the edge of the 2D watermark signal.

Appendix 12-V generates a spatial domain calibration signal, based on the frequency domain signal specification provided in Appendix 12-DD.

Appendix 12-F (intraPatchClumps.m) concerns the clumping operations defined earlier. The function starts by considering correspondence between rotation angles indicated by different peaks. Translations in x- and y- are then considered, followed by correspondence between scale states. Line 46 tests whether pairs of parameters sets, corresponding to a pair of peaks, evidence clumping of the two peaks within the specified threshold values. The following code takes these results and aggregates them to determine global clumps (rather than just peak pairs). The variable clumpList.list defines each clump as a list of peak indices. The weighted voting for the pose values indicated by each clump is performed at lines 83-93. The variable clumpPoses contains the 4D affine state parameters for each of the clumps.

The specification earlier noted that the x-translation and y-translation data associated with each element in the spatial domain signal block template 73 (and the peaks template) can be stored in one or more data tables (e.g., aPTX and aPTY). Such tables, in a basic implementation, are large, each having the same dimensions as the peaks array (and the spatial domain signal block template). In the earlier-discussed example, the x-translation table would store an x-translation datum for each of the 65,536×2048 elements in the spatial domain signal block template 73.

One alternative is to characterize the data in such tables as functions that follow known curves, which thus can be described by polynomial equations.

Figure 29A:
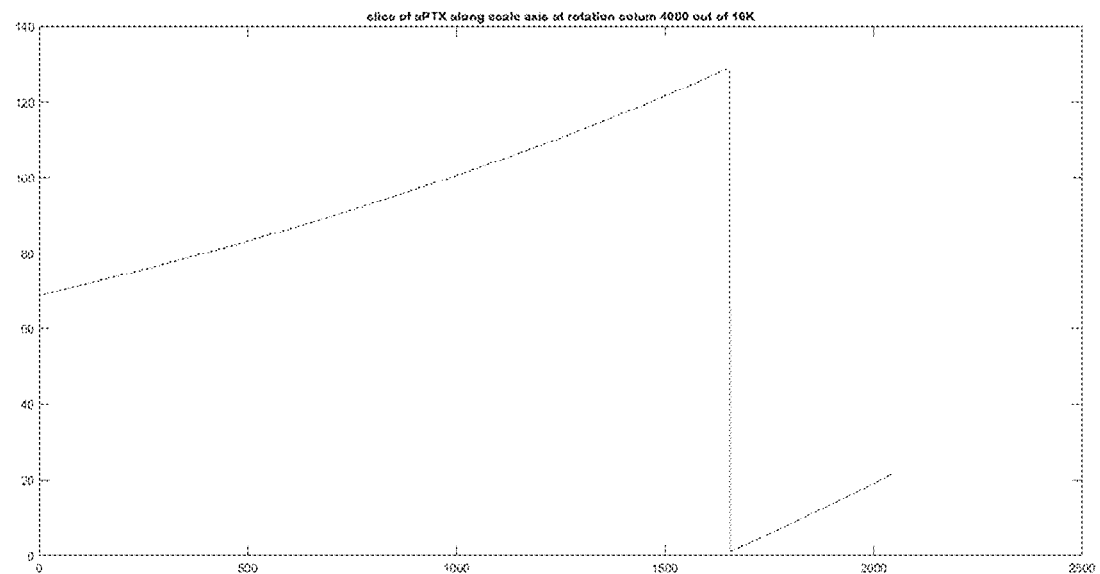
FIGS. 29A-29D show exemplary curves depicting variations in x-translation along different columns and rows of a spatial domain signal block template.

FIG. 29A shows an exemplary curve, showing x-offset values (which range from 0 to 128 waxels) at different values of scale state (along the horizontal axis), when the rotation state is fixed at column 4,000 (out of 16,384 rows in a 16,384×2048 spatial domain signal block template on which this data was based).

Figure 29B:
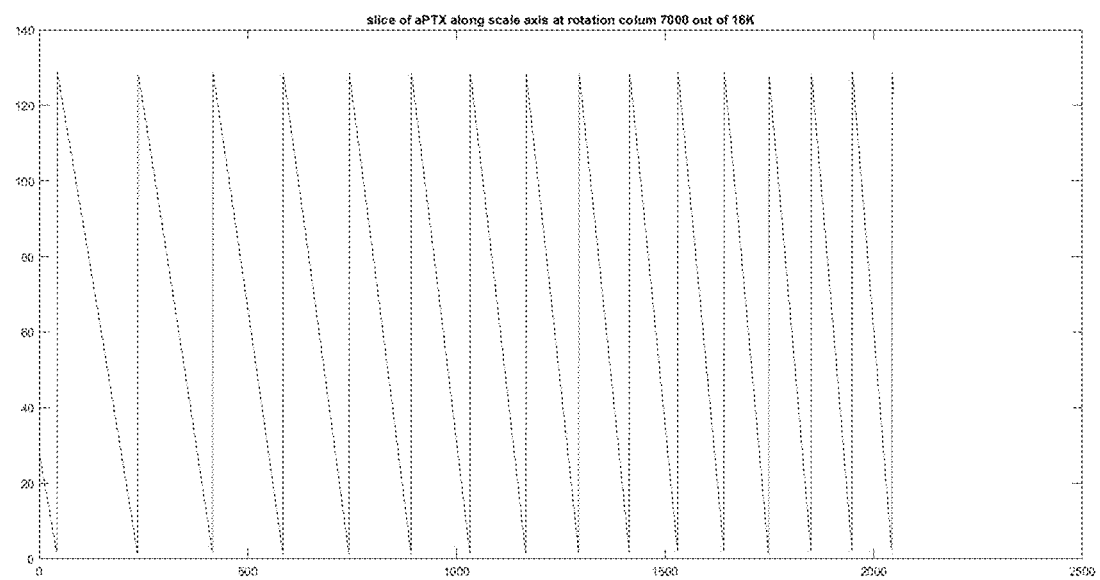

FIG. 29B is similar, but depicting a curve of the x-offset value, as a function of scale state, when the rotation state is fixed at column 7,000 (of the same 16,384 row template).

Figure 29C:
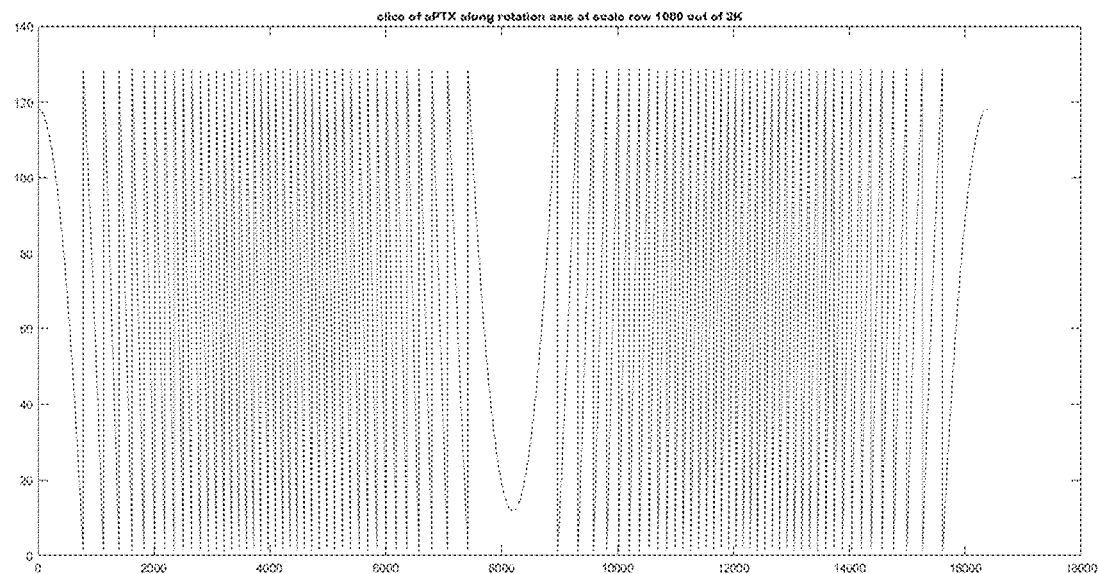

FIG. 29C shows such a curve when data is taken from the same 16,384×2048 template, but down a column, instead of across a row. The vertical axis is still the value of x-offset, between 0 and 128. The horizontal axis now represents the different values of rotation state, ranging from 0 to 360 degrees (in 16,384 steps), when the scale state is fixed at row 1000 (out of 2048).

Figure 29D:
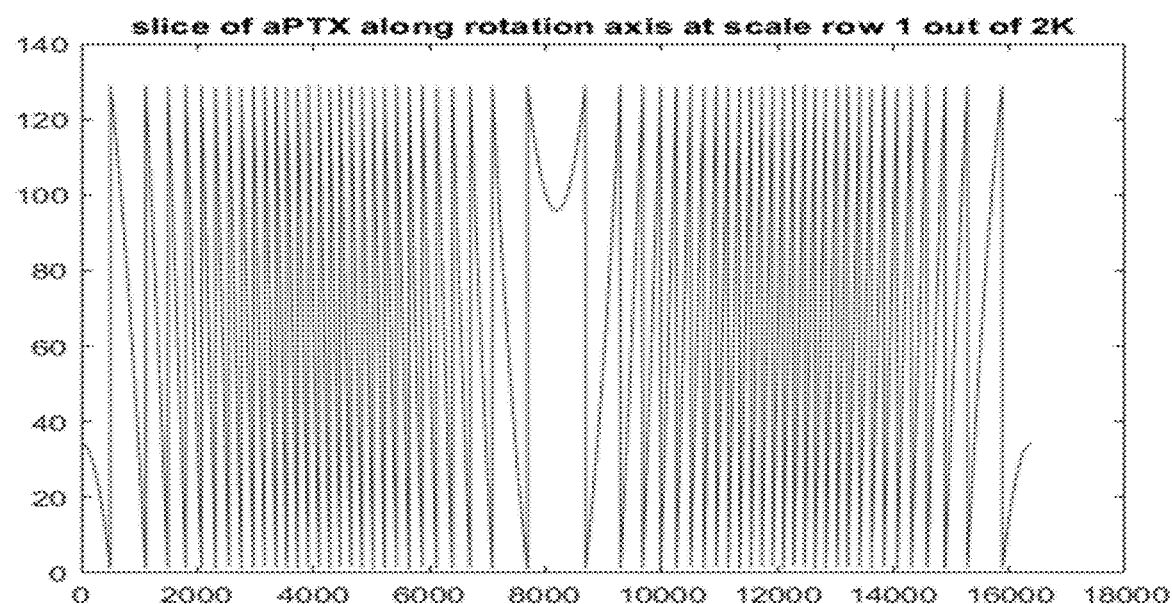

FIG. 29D is similar to FIG. 29C, but shows the curve defined by the data at row 1. The artisan will recognize that such curves, e.g., each defined by a row of x-translation (and similarly y-translation) data, can be described by formulas characterized by a relatively small number of parameters. For each such row, these parameters can be stored, instead of the thousands of translation values themselves. When an x-translation value is required corresponding to a given row and column in the peaks template, the equation parameters corresponding to the specified row are recalled from memory. The thus-parameterized equation is then computed, based on the specified column, yielding the x-translation value. A similar set of curves can be parameterized and employed to discern the y-translation.

(While the foregoing paragraph defines curves based on rows of translation data, the same approach can be used with curves defined by columns of translation data.)

In a variant embodiment, instead of parameterizing curves, i.e., one per row (or column) of the signal block template 73, the curves can be considered—jointly—to define a surface, and a (larger) polynomial can then be designed to describe the surface.

In their favor, the just-described approaches—of using parameterized curves or a surface to define x- and y-translation values—provides interpolation (i.e., translation values between those specified in the table) as an inherent feature. But this approach is more complex than the next alternative.

The next alternative for determining x- and y-translations, from row/column coordinates of the peaks array (which corresponds to the row/column coordinates of the spatial domain signal block template 73) is to recognize that the x- and y-translations were evident when the spatial domain signal block array 73 was first generated. Each point in the array was sampled from, in essence, a tiled array of 128×128 signal blocks. The origins of these tiled signal blocks (blocks 14 in FIGS. 2, 4 and 5) are found at intervals of 128 waxel spacings from the origin of the x- and y-axes. Given a point sampled at an "X" in FIG. 4, its x-offset (translation) from the origin of the signal block in which it is contained is simply modulo-128 of its x-location coordinate, since this point is to the right of the origin. The x-offset (translation) of any point to the left of the origin can be likewise determined, with slight adjustment to account for the fact that the origin of a signal block is further-negative than the points within it. The y-translation for each sample point, relative to the origin of the block in which it is contained, can be similarly determined, based on the modulo-128 value of its y-location coordinate.

While that's an intuitive description, the code (found in module main.m in Appendix 12-A, at lines 171-175) look like this:

predictedAngles=rad2 deg(2*pi*(thetaRowsCenter−1)/numRotations);
dx=cosd(predictedAngles);
dy=sind(predictedAngles);
xCenters=2+mod(dx.*r(scaleColsCenter),NN)−1;
yCenters=2+mod(dy.*r(scaleColsCenter),NN)−1;

where predictedAngles is the rotation angle of the captured image excerpt, as determined from the peaks array. The last two lines are based on corresponding lines in the code used to generate the template 73, found in module GenerateAllPose (Appendix 12-D, at lines 23-24).

Some of the code refers to pose in terms of four parameters ("Pose_actuals"). Other of the code references pose in terms of a 6D vector ("SixDvector"). This may be explained with reference to FIG. 30.

Figure 30:
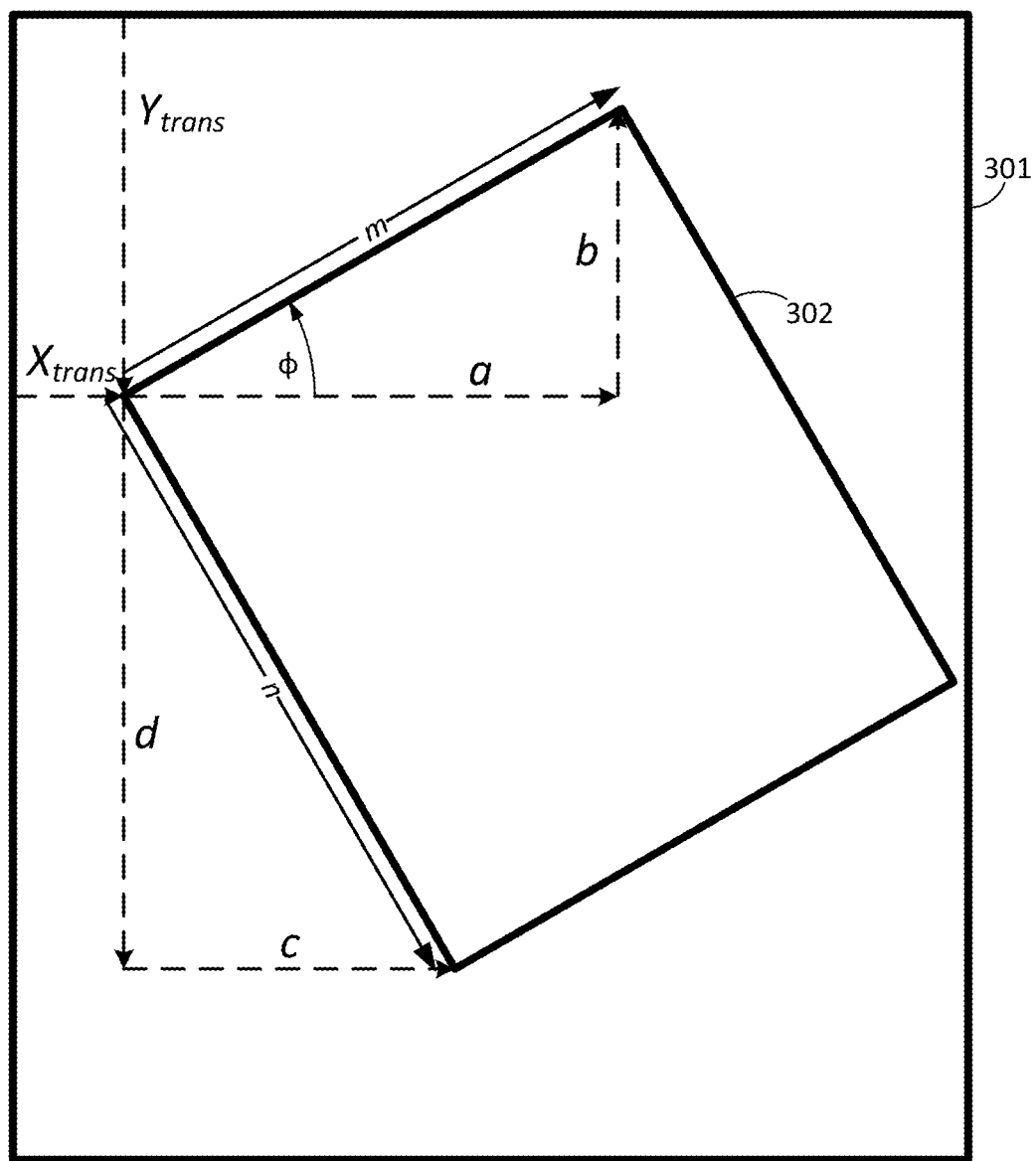
FIG. 30 helps illustrate a 6D pose vector.

The outer frame 301 in FIG. 30 indicates the boundary of an image excerpt captured by a camera. Depicted in the imagery is product packaging artwork (not shown) including a steganographic watermark block 302.

The first two parameters of the 6D pose are the x- and y-offsets to the origin of the watermark block, from the upper left corner of the image excerpt. (The origin of the watermark block is its upper left corner, as the watermark was originally embedded. Coincidentally, the origin is still to the upper left in the image excerpt depicted in FIG. 30, although this is not always the case.)

The next, third, parameter, a, is the x-component of a vector (labeled m) extending from the watermark origin and pointing along the first row of the watermark block, for a distance of one block. (A distance of one waxel can alternatively be used.) The fourth parameter, b, is the y-component of this vector. The length of this vector m (i.e., the square-root a squared plus b squared) indicates the watermark scale in the horizontal (row) direction.

The fifth parameter, c, is the x-component of a vector (labeled n) extending from the watermark origin and pointing along the first column of the watermark block. The sixth parameter, d, is the y-component of this vector. The length of the vector n indicates the watermark scale in the vertical (column) direction.

Ideally, the height and the width of the watermark block are identical. But depending, e.g., on the viewpoint from which the camera captured the image excerpt, one of the dimensions may be shorter than the other (as in FIG. 30). Likewise, ideally, the corners of the watermark block are all right angles. Again, however, this is not always the case—depending on camera viewpoint, etc. The use of the 6D parameters allows these different forms of distortion to be represented.

(In the ideal case—that of a square watermark block, c and a have the same length; likewise with b and d, so the pose may be expressed as just 4 parameters. The scale of the block is indicated by the length of the vector n. For example, if n is 2 pixels in length, and we a priori know that the watermark is embedded at 1 wpi and so should have a width of 1 pixel at a scale of 1, then we know the scale of the block is 2/1, or 2. The rotation angle φ is the arc-tangent of b/a.)

Machine Learning

Machine learning is well suited to the present technology. When the described methodology is applied to an excerpt of query imagery, a result array of peaks is produced. Each of the points in the result array is associated with, in one example, four pose parameters (e.g., x-translation, y-translation, scale and rotation). Additionally, each peak has an ordinal position in the ranking (e.g., 1-1000), and/or may be associated with the value of the peak (indicating correlation between the query imagery and the watermark signal). If the sorted top 1000 peaks in the result array are considered, then a 5000 element feature vector for a particular image excerpt is produced, comprising—for each peak—its ordinal position (or value), and four affine parameter data.

One or more classifiers can be trained with multiple such feature vectors, each generated by the techniques detailed herein, based on image excerpts taken at known pose states. These known pose states serve as ground truth "labels" that can be used, e.g., with reverse gradient descent (aka gradient ascent) methods, to iteratively adjust the network parameters, so that the output(s) of the network—when stimulated with other such image excerpts, tend to converge on the correct pose state parameter(s). (Gradient ascent is employed, rather than gradient descent, because we are interested in maximizing the correlation between the query excerpt and the template patch, as opposed to minimizing a loss function.)

Figure 31:
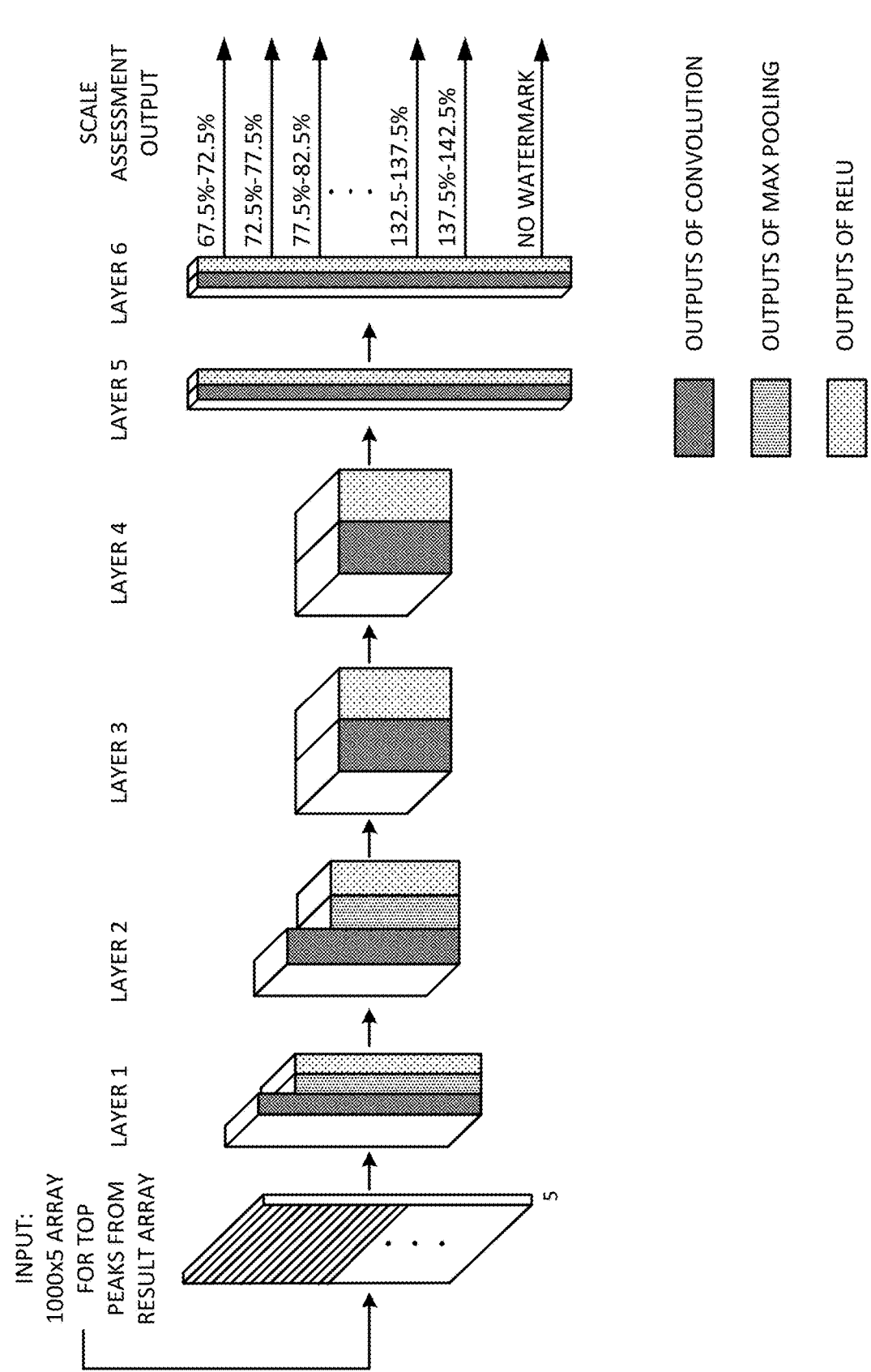
FIG. 31 shows a convolutional neural network that can be used to produce pose data for an image excerpt.

FIG. 31 depicts one such network, of a convolutional neural network variety, comprised of convolutional layers 1-4, and fully-connected neuron layers 5 and 6. In this example, the last layer has plural outputs, each corresponding to a range of scale states. (Similar networks can have ranged outputs for each of the other affine pose parameters.) The outputs form a multi-element output vector.

In a training phase, thousands of 5000 element feature vectors are input, each produced from an image excerpt of known pose state. The parameters of the convolutional layers 1-4, and the weights of the fully-connected layers 5 and 6, are then adjusted so as to bias the array of outputs to a correct state for each training vector. For example, if a feature vector corresponds to an image excerpt at a scale of 73%, then training should lead the outputs to produce an output vector of {0, 1, 0, . . . 0, 0, 0}. This is a form of "one hot" encoding, in which the "1" of the vector here corresponds to the output indicating a scale state of between 72.5% and 77.5%. Many cycles of such training are performed, until the resulting output vectors corresponds to the correct target value, within some error threshold.

An alternative network need not use convolutional stages. Rather, it may be a logistic linear regression classifier that maps the 5D input vector to a corresponding linear output value of scale state, or other affine parameter.

Another embodiment extends the foregoing model to multiple dimensions of output data, known as a multivariate regression classifier. Such a classifier maps the 5D input vector to, e.g., a particular scale state, and a particular rotation state, etc. (See, e.g., the reference books by Timm, Applied Multivariate Analysis, Springer Verlag, 2002, and Fahrmeir, et al, Multivariate Statistical Modelling Based on Generalized Linear Models, Springer Science & Business Media, 2013, as well as an article attached as Appendix U to application 62/581,523: Reinsel, Multivariate Linear Regression, 1998.)

In the above examples, the input vector includes—for each peak in the result array—data indicating the ordinal position of the peak in the ranked list, and data indicating the four affine parameters. The FIG. 31 network outputs just scale data, so three of the four affine parameters may be irrelevant and might be omitted. In this case, the 1000 input vectors for each query excerpt would thus each be two elements long, rather than five. However, applicant believes that there may be some value to using the full set of 1000×5 data. If certain of the parameters (e.g., x-translation or y-translation) don't matter to determination of scale, then the network will learn that fact during training.

In a variant embodiment, plural different excerpts are analyzed from a single image, resulting in two or more 1000×5 element feature vectors for the image. These two or more feature vectors are both/all submitted to the classifier during training, to exploit the consistency of scale, rotation, tip and tilt parameters across different portions of the image. After training, two or more such feature vectors are submitted to the classifier during use, to determine the pose of the plural image excerpt.

Other embodiments may be based on larger or smaller sets of data from the peaks array, rather than just the 1000 highest value extrema. In some cases, the entire peaks array can be used.

(In the software code discussed below, the four pose parameters on which training can be based are xCenters, yCenters, Scale, and Theta.)

Many more details concerning machine learning architectures and training methods are provided in the documents incorporated herein by reference.

More on 1D Arrangements: Generating Reference Data

Figure 32:
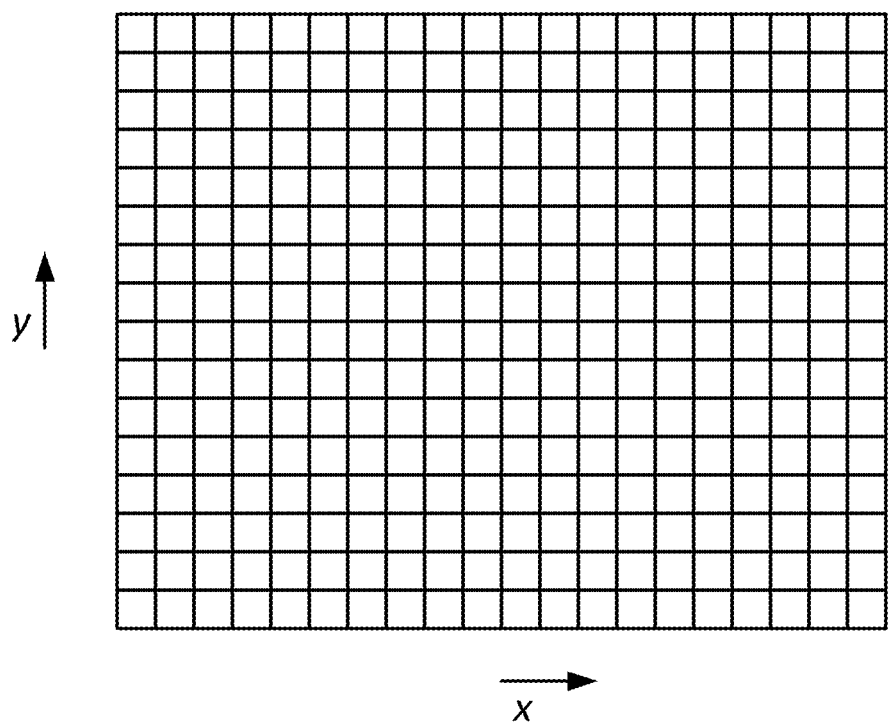
FIG. 32 shows a tiled array of signal blocks.
Figure 33:
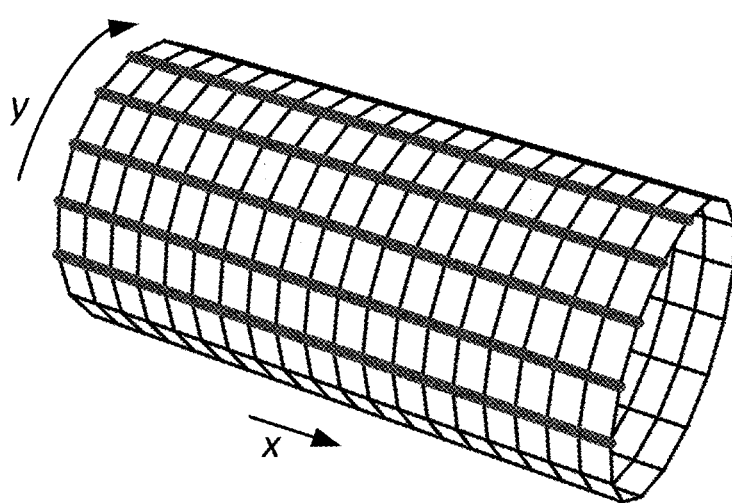
FIG. 33 shows the FIG. 32 array with two opposite edges connected, forming a cylindrical surface.
Figure 34:
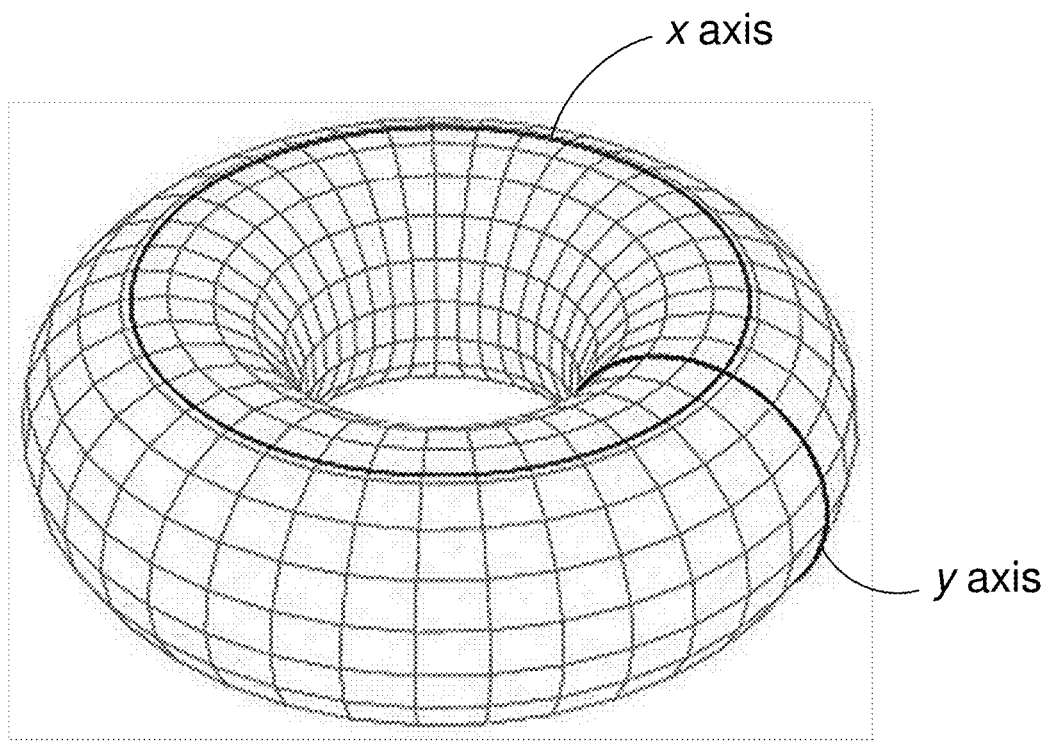
FIG. 34 shows the cylindrical surface with the other two opposite edges connected, forming a torus.

FIG. 32 shows a tiled array of signal blocks. If the top and bottom edges are lifted up out of the plane of the paper and glued together, a cylinder results, as shown in FIG. 33. If the two ends of the cylinder are stretched around to meet each other, a toroid results, as shown in FIG. 34.

The same morphological operations can be applied to a single signal block, with the top edge curved around to meet the bottom edge, and the left edge curved around to meet the right edge.

A reason this works is that the values and derivatives of the reference (grid) signal are continuous at the edges of the block, so there is no discontinuity when the planar block (or array of blocks) is curved and glued to yield a torus.

Figure 35:
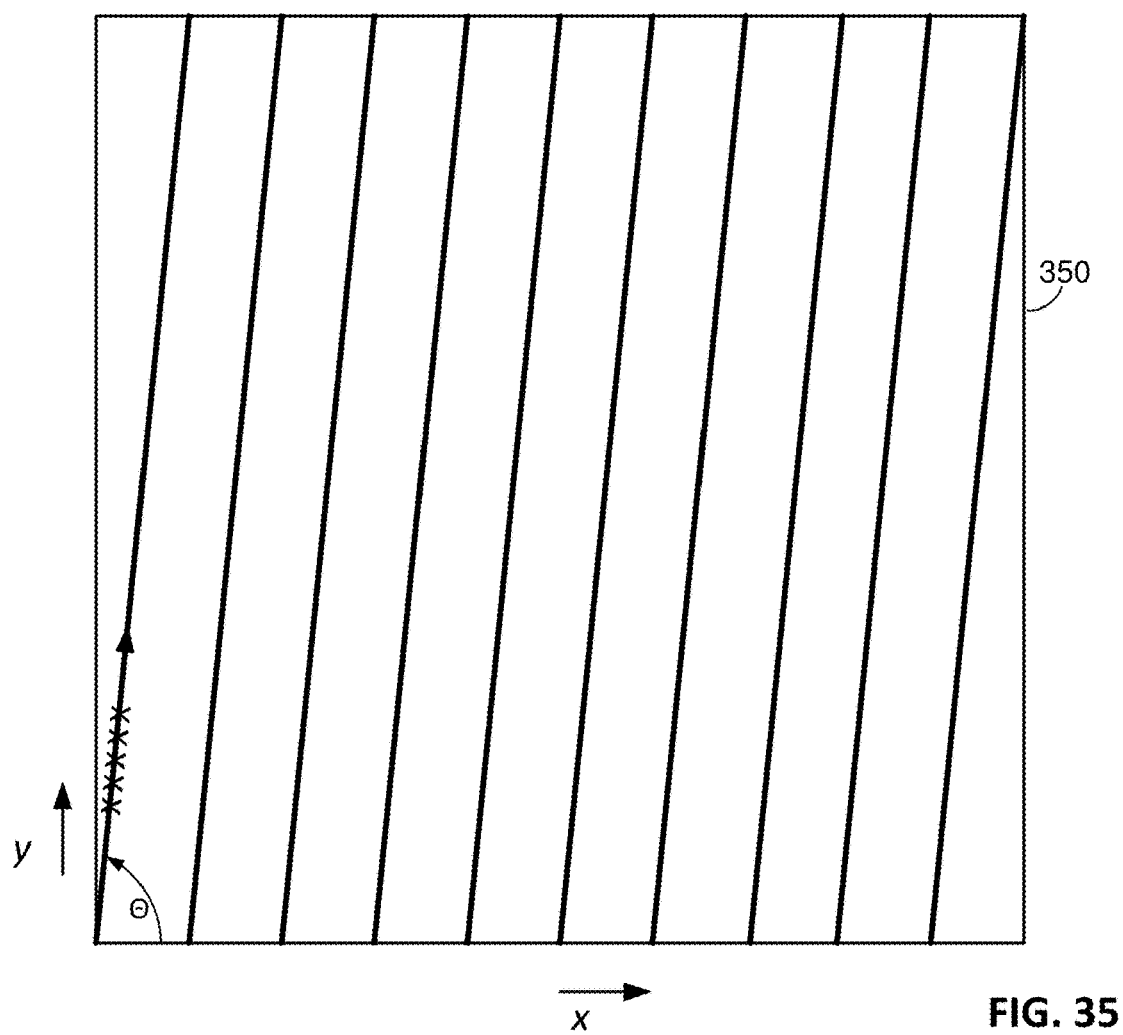
FIG. 35 shows a single signal block, and its sampling in a modulo fashion.

FIG. 35 shows a single such signal block 350, and the "X"s show a few sampling points that are spaced along a linear track (the dark line) that traverses the block, in modulo fashion. FIG. 35 is thus similar to FIGS. 10A-11D.

Figure 36:
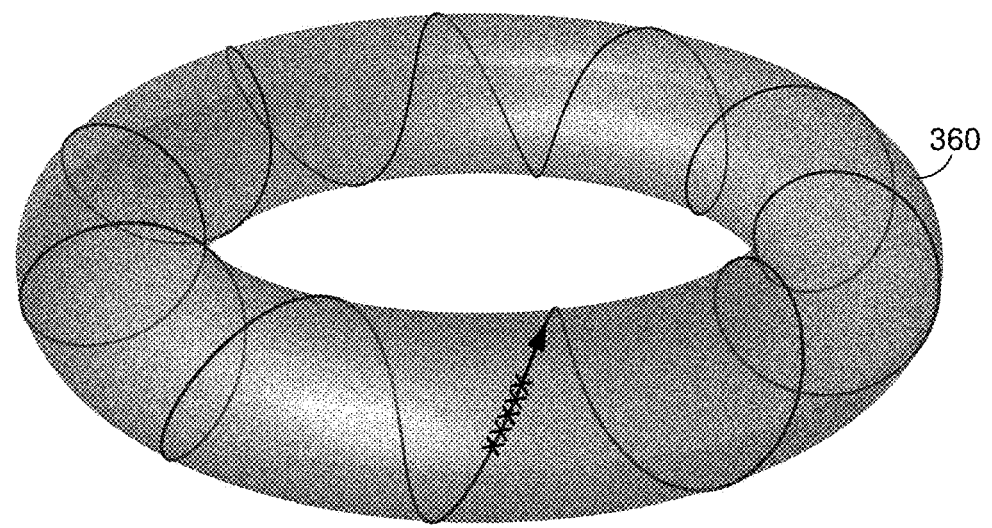
FIG. 36 shows the signal block of FIG. 35, stretched and twisted to form a torus.

FIG. 36 shows the signal block 350, stretched and twisted to form a torus 360. The "X"s in FIG. 36 correspond to those of FIG. 35. As can be seen, a straight inclined line across the signal block 350 maps to a helical coil wound around the toroid 360.

In the illustrated case, the angle θ of the line (i.e., 5.711°) is selected so that the line returns to its starting point over the course of a single block (i.e., so that the line returns to its starting point over the course of a single circuit around the torus). Its period may thus be said to be 1. During this track, the line loops around the torus (i.e., crosses both equators of the torus) ten times.

If the angle θ is changed slightly, e.g., to 5.44° or 6.009°, the line will return to its starting point over the course of two blocks (two circuits around the torus). Their periods may thus be said to be 2. (The former line loops around the torus 21 times during such circuits; the latter loops around the torus 19 times.)

More information on the paths traversed by lines on toroids can be found in the book by Berger, A Panoramic View of Riemannian Geometry, Springer, 2007.

Figure 37:
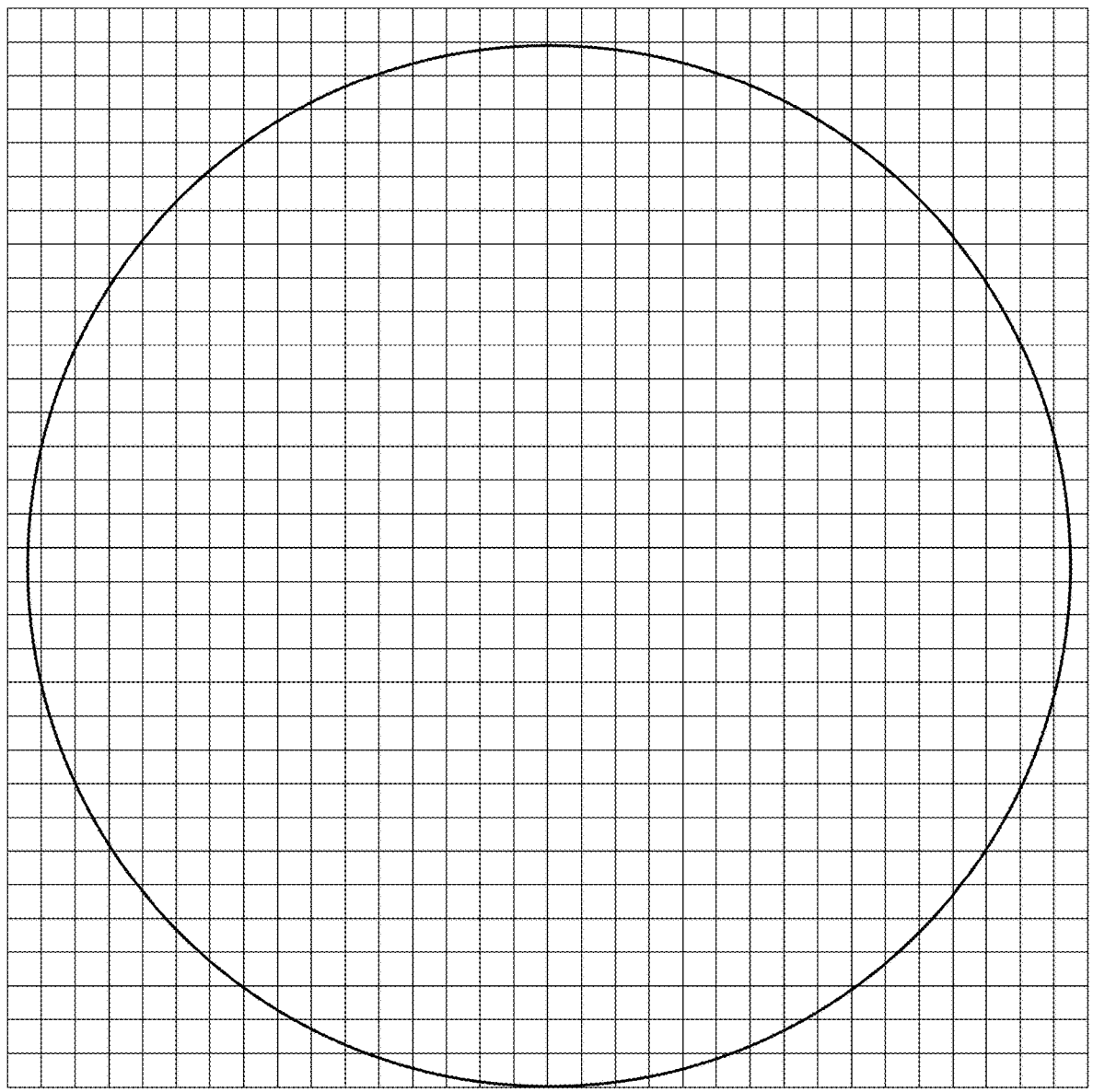
FIG. 37 shows a sampling arc traversing an array of signal blocks.

FIG. 37 is akin to FIGS. 2-5. However, while those figures show a family of plural sampling arcs traversing a tiled array of signal blocks, in FIG. 37 there is just one sampling arc. The idea, as before, is to take samples from the signal block at multiple positions, by sampling along a line that traverses blocks at different offsets and at different angles. In actual practice, many more blocks are sampled than are shown. That is, instead of traversing about 120 blocks (as shown in FIG. 37), many thousands of blocks are typically traversed. Each individual block shown in FIG. 37 may actually represent dozens or hundreds of blocks. This is shown by block 380 in the enlargement of FIG. 38, which actually comprises a large number of blocks.

Figure 38:
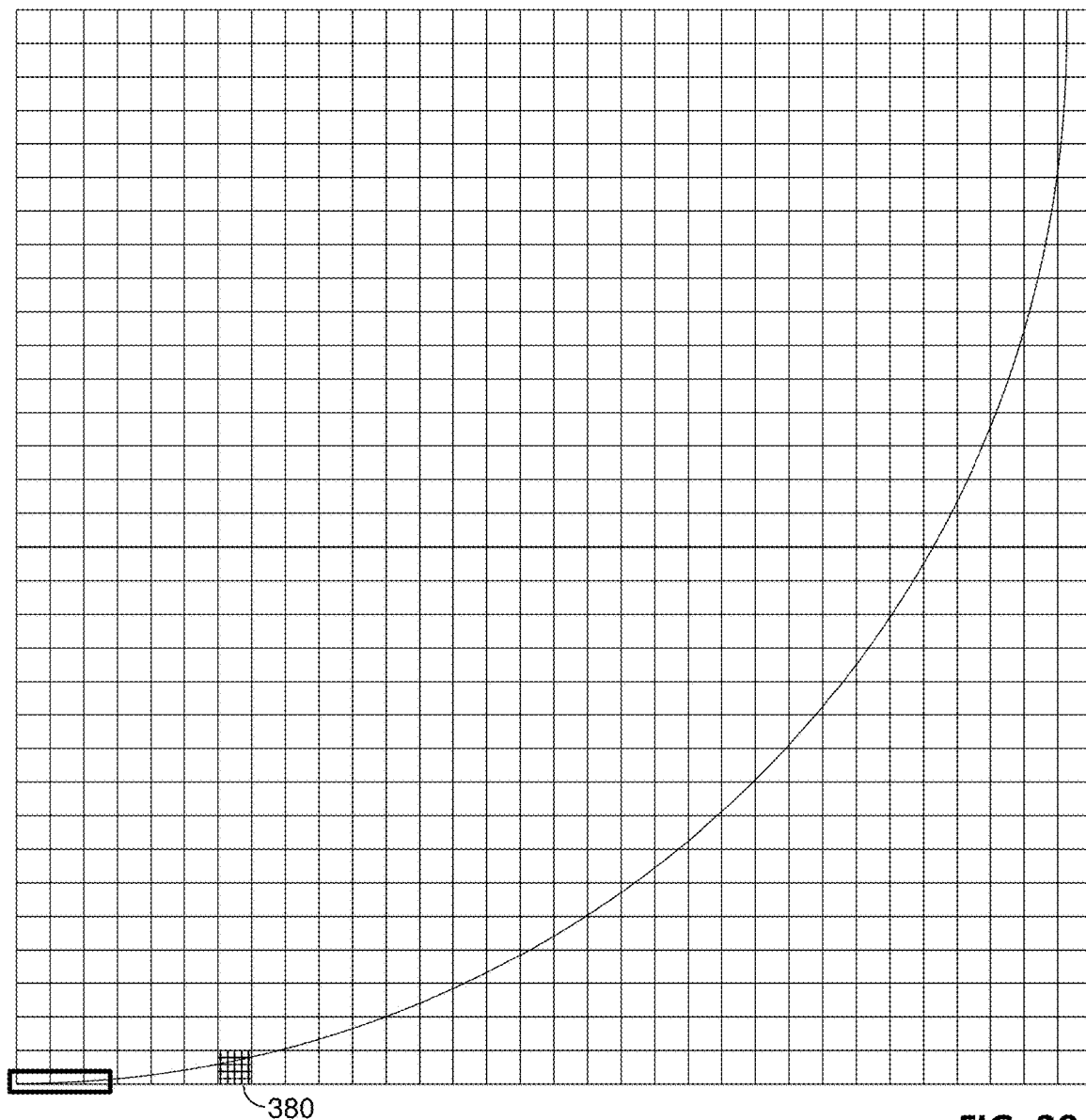
FIGS. 38 and 39 are enlarged excerpts from FIG. 37.
Figure 39:
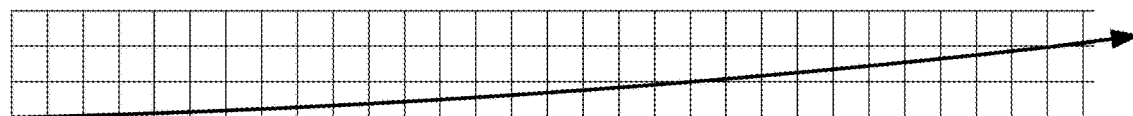

The region outlined by the dark rectangle in the lower left of the enlarged FIG. 38 is shown in further enlarged fashion in FIG. 39. The curved sampling arc is shown to traverse dozens of signal blocks, instead of just the two and a fraction shown in FIG. 38.

In FIGS. 37-39, the sampling arc ends at its starting point. Depending on the number of blocks sampled in this circuit, that may be adequate. Applicant has found, however, that it can be advantageous not to end with a single curved circuit through the tiled array of signal blocks, but instead to perform a second, and third, and perhaps further circuits—yielding additional samples.

Figure 40:
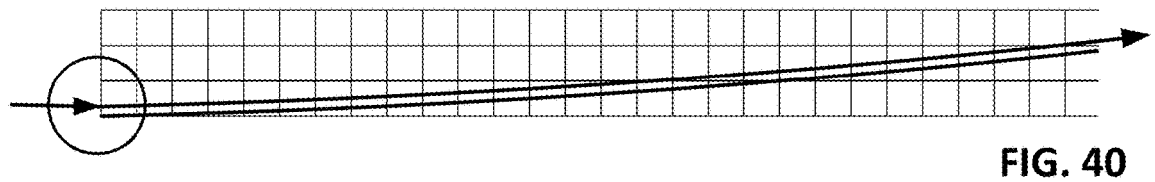
FIG. 40 shows a sampling arc repeatedly traversing an array of signal blocks, with each traverse not exactly returning to its starting point.

This is partially shown in FIG. 40, in which—at the circled location, the sampling arc returns from its circuit to a point displaced slightly in the y direction above the original starting point. This displacement can be much smaller than shown. For example, if each signal block is 32×32 waxels, the displacement can be 0.25 waxels. The sampling arc then begins a second circuit. Once it has traversed a second 360 degree arc, it comes to a point that is displaced even further up in they direction. This continues several, or several dozen or several hundred, times.

Such curved paths, which do not return to their origins, can be implemented in various ways. One is to perturb the equation defining the arc's path by a variable that increases the y position of the line linearly with angle, from 0° to 360° and beyond.

For example, if the starting angle θ, at the bottom of the arc's transit, is 0 degrees, and the radius of the arc is R waxels, then the values of x and y that define the arc, as a function of angle, can be:

$x = R - R \sin(\theta + 90)$ $y = R \cos(\theta - 90) + \theta(0.25/360)$

Thus, when the arc has traversed its first 360 degrees, its y position is 0.25. After 720 degrees, it is 0.5, etc. The art thus traces a coiled path, which gradually climbs upward in the y direction.

An alternative implementation is not to shift the y parameter of the arc gradually up with angle, but to decrease the radius R gradually with angle. E.g.:

$x = R - (R - \theta(0.25/360))\sin(\theta + 90)$ $y = (R - \theta(0.25/360))\cos(\theta - 90)$ This arrangement results in a spiral-shaped sampling path, with the radius diminishing 0.25 waxels for each 360 degrees.

As before, implementation of sampling is commonly done on the basis of a single block, which is sampled in modulo fashion, e.g., as shown in FIGS. 10A-11D, rather than by virtually constructing a large array of signal blocks for sampling. As before, sampling spacing is typically on the order of a single waxel, and is most typically in the range of, e.g., 0.5-1.5 waxels.

Applicant was surprised to find that the foregoing methods do not provide a near-uniform sampling of the signal blocks. The sampling arcs tend to clump somewhat close together in some parts of the signal block, while leaving other parts of the signal block relatively less-sampled.

Figure 41:
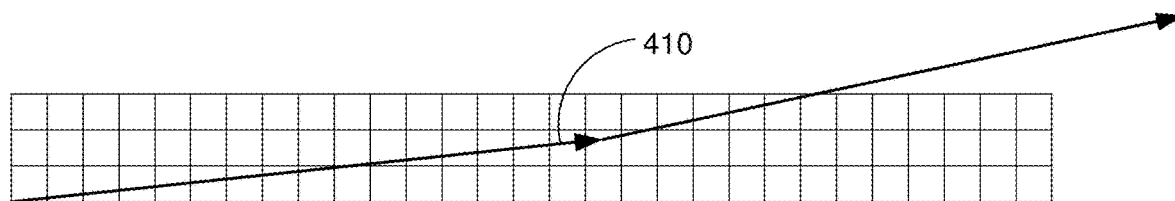
FIGS. 41 and 42 show a variant sampling arrangement, using straight segments.

FIG. 41 shows a different sampling arrangement. This arrangement is characterized, in part, by sampling along a track that is not curved. Instead, the sampling path 410 is straight, here at an angle of about 6 degrees. After it has gone a distance, the path changes angle to about 12 degrees. A further distance is again traversed, at which time the path changes angle to about 18 degrees. This continues in repeating fashion, causing the sampling arc to transit a segmented polygonal path through the array of tiled signal blocks.

Figure 42:
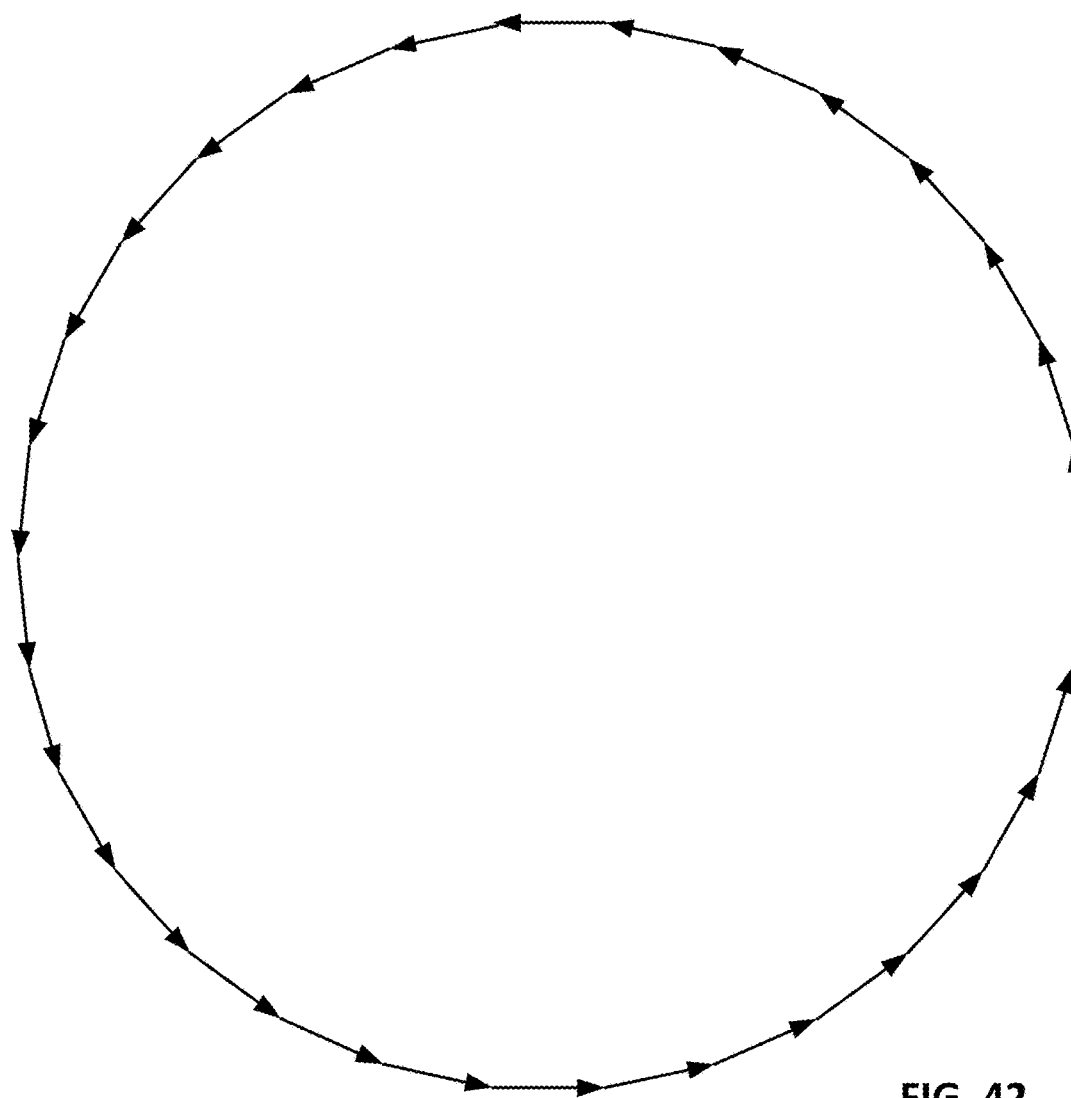

FIG. 42 shows such a polygonal path. This path ends at its origin. However, techniques such as those described above, and illustrated in FIG. 40, can be employed to define other paths that do not conclude the track back at the origin, but instead define a non-closed path, such as a coil or a spiral.

Angular increments of these lines, from 6, to 12, to 18 degrees, are coarser than would generally be used in practice. More typically, increments on the order of three degrees, a single degree, or a third of a degree, are used.

Figure 43:
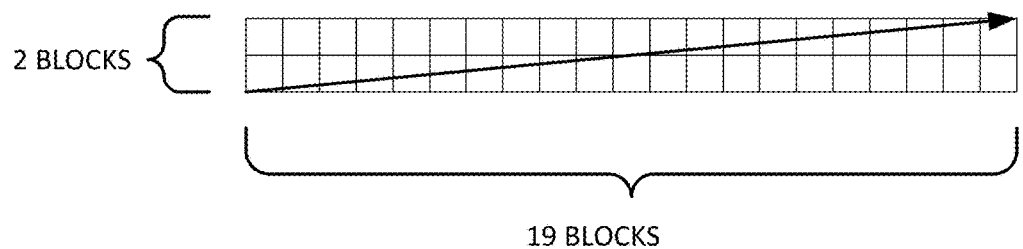
FIG. 43 shows the use of prime numbers in orienting a straight segment, like that shown in FIGS. 41 and 42.
Figure 44:
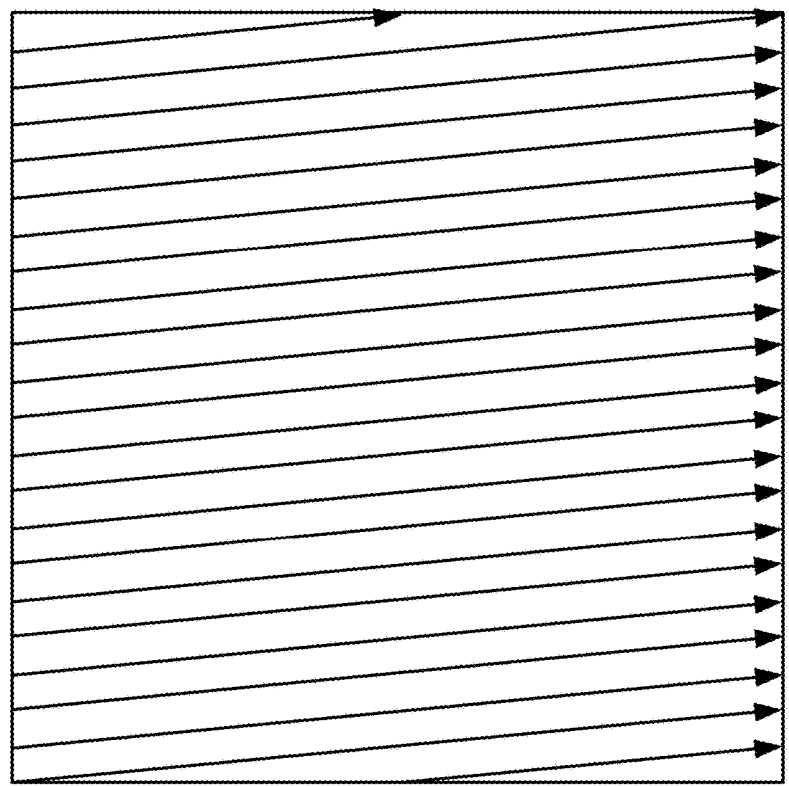
FIG. 44 shows uniform coverage of a signal block produced using a prime number arrangement.

To provide more uniform sampling of the signal blocks, applicant has found it advantageous for the first segment of linear sampling path 410 to traverse a subregion of H×W signal blocks, where both H and W are prime numbers. Such an arrangement is shown in FIG. 43, in which H=2 and W=19. The line segment starts at the lower left corner (origin) of one block, and ends at the upper right corner of another block (i.e., the origin of a block just-beyond). When implemented in modulo fashion, the sampling begins at the lower left corner of the block, and ends at the same location. The sampling track traverses this single block (H+W+1)=22 times. The sum of H and W may be termed the value "K." Importantly, these tracks are uniformly spaced across the modulo block, as shown in FIG. 44. All of these sampling tracks have an angle of A TAN(2/19) or 6.009.°

If the signal block measures 64×64 waxels, and we want sampling lines with a spacing of about 0.25 waxels, then we need to traverse the sampling block about 64/0.25, or 256 times, instead of the 22 times illustrated. Thus, the sum of the width and height of the block (i.e., K) should be about 256. (If the signal block measures 32×32 waxels, K should be about 128.)

Height and width primes that sum to about 256 are detailed below. Each pair of numbers defines an angle (also shown below) for the associated line segment:

| | |
|---|---|
| {1, 257} | 0.223° |
| {2, 257} | 0.446° |
| {3, 257} | 0.669° |
| {5, 251} | 1.141° |
| {7, 251} | 1.597° |
| {11, 251} | 2.509° |
| {13, 251} | 2.965° |
| {19, 239} | 4.545° |
| {23, 233} | 5.637° |
| {29, 229} | 7.217° |
| {31, 223} | 7.914° |
| {37, 223} | 9.421° |
| ... | |
| {257, 2} | 89.554° |
| {257, 1} | 89.777° |

(Tables of prime numbers are readily available. Calculation of the angle defined by a pair of primes is simply the arctangent of their ratio, as noted above. A data structure can be seeded with primes from a published table, and augmented by values computed by a programmed hardware processor, such as sums and angles. This data structure can then be searched to yield primes having desired sum and angle properties.)

If we want to sample the reference signal block at an angle of 6 degrees, we can use a pair of primes in the above list that yields a close value, e.g., 23 rows in Height, by 233 columns in Width, which yields an angle of 5.637.°

If we want an angle that is still closer to 6 degrees, we can consider primes that sum to more than K. This results in the signal block being sampled by lines that traverse the signal block at spacings less than the target of 0.25 waxels, but that's not a bad thing per se. For example, 31 rows in Height, by 233 columns in Width yields an angle of 6.04 degrees. These primes sum to 264. The signal block will thus be over-sampled by a factor 264/256, or about 3%.

The vertices of the polygon should be mitigated in some fashion, since no excerpt from query imagery will (or should) match such a disrupted path. One approach is to go around the block array two or more times. Due to the different prime ratios involved, the polygonal path typically doesn't close on itself as rotation reaches 360. Instead, the second orbit traces a different path, with vertices positioned differently. In this richer set of sample data, a sample of image query data can find a good match—composed of samples all taken along a smooth path.

The sample values taken from the signal block, at increments along the angle-inclined sampling tracks, can be stored sequentially in an array in memory—in association with the block positions (e.g., x- and y-offset from the top left corner, and optionally the rotation of the track) from which they were respectively sampled.

It will be recognized that target values of sampling track angles, and waxel spacings, usually cannot be precisely met. Applicant has found that angle values that are within 10% of the angular increment, from the target angle value, will generally suffice (e.g., to within 0.1 degrees if the angular increment is one degree). Applicant has further found that waxel spacings within even 20% of the target value (e.g., anywhere in the range 0.2 waxels to 0.3 waxels, if 0.25 waxels is the target) will suffice.

Figure 45:
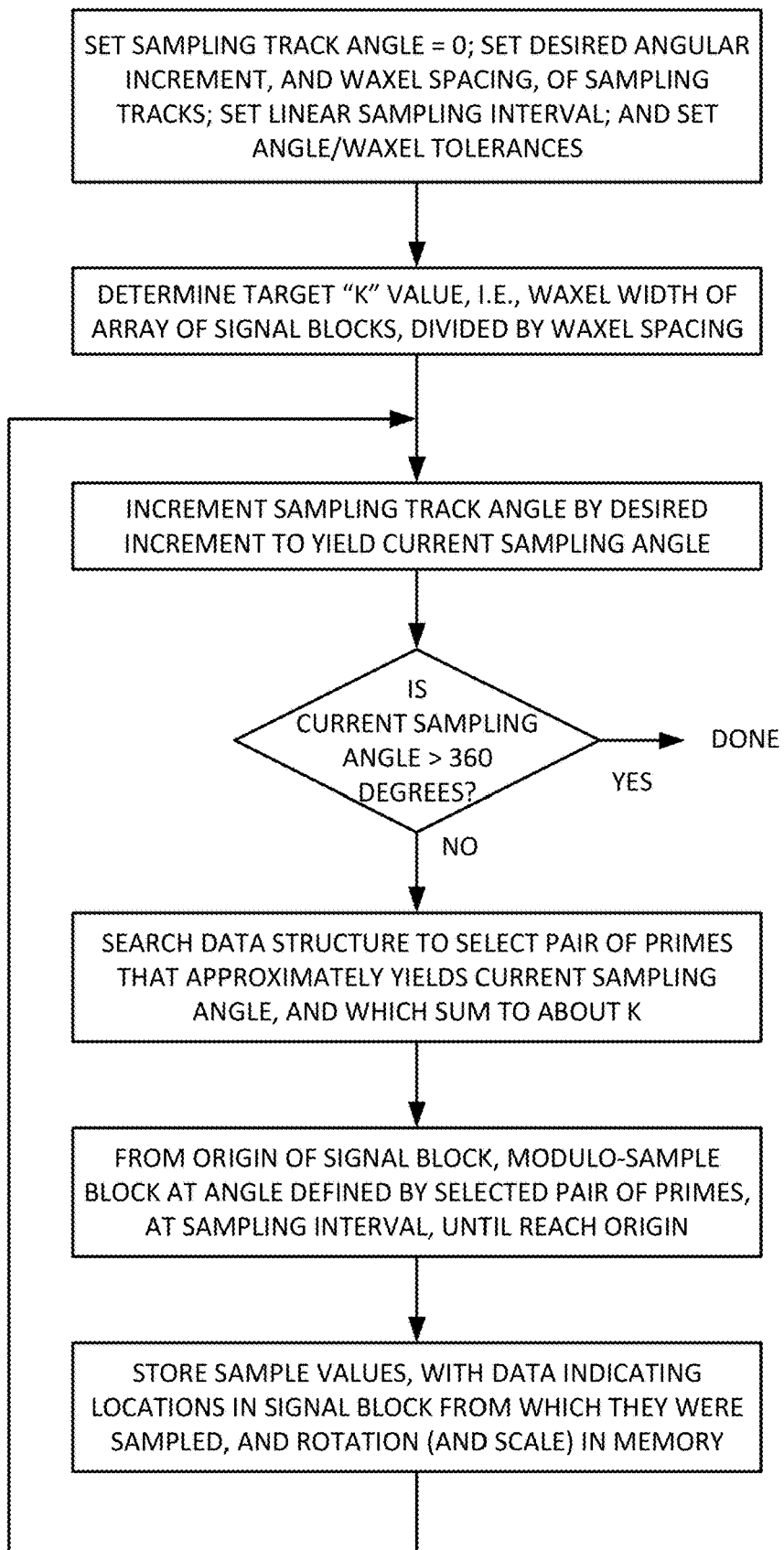
FIG. 45 details an algorithm for sampling a signal block, according to one embodiment of the present technology.

FIG. 45 summarizes one particular implementation of the above-discussed algorithm for sampling the signal block.

The sampling of 32×32 waxel reference signal blocks, at sample track spacings of about 0.25 waxels, at sample spacings of 1 waxels, and at rotation increments of about 2 degrees (from 0° to 360°), yields a set of reference data comprising about 800,000 samples. If sampling continues beyond 360°, a second time or third time or multiple times around, as described above, multiple millions of samples can result. This data is stored in a reference data memory.

An advantage of the torus construct is that affine and other distortions of the reference signal can be represented simply by differently shaped tracks, or by non-uniform sampling intervals, around the torus.

More on 1D Arrangements: Determining Image Pose

In the below-described arrangement, determining the pose of query imagery involves correlating an excerpt of image data with the sampled reference data (e.g., a matched-filtering operation). However, unlike most of the previously-detailed arrangements, this correlation can be performed on 1D data—not 2D data. Moreover, the correlation need not involve any domain transformation.

Figure 46:
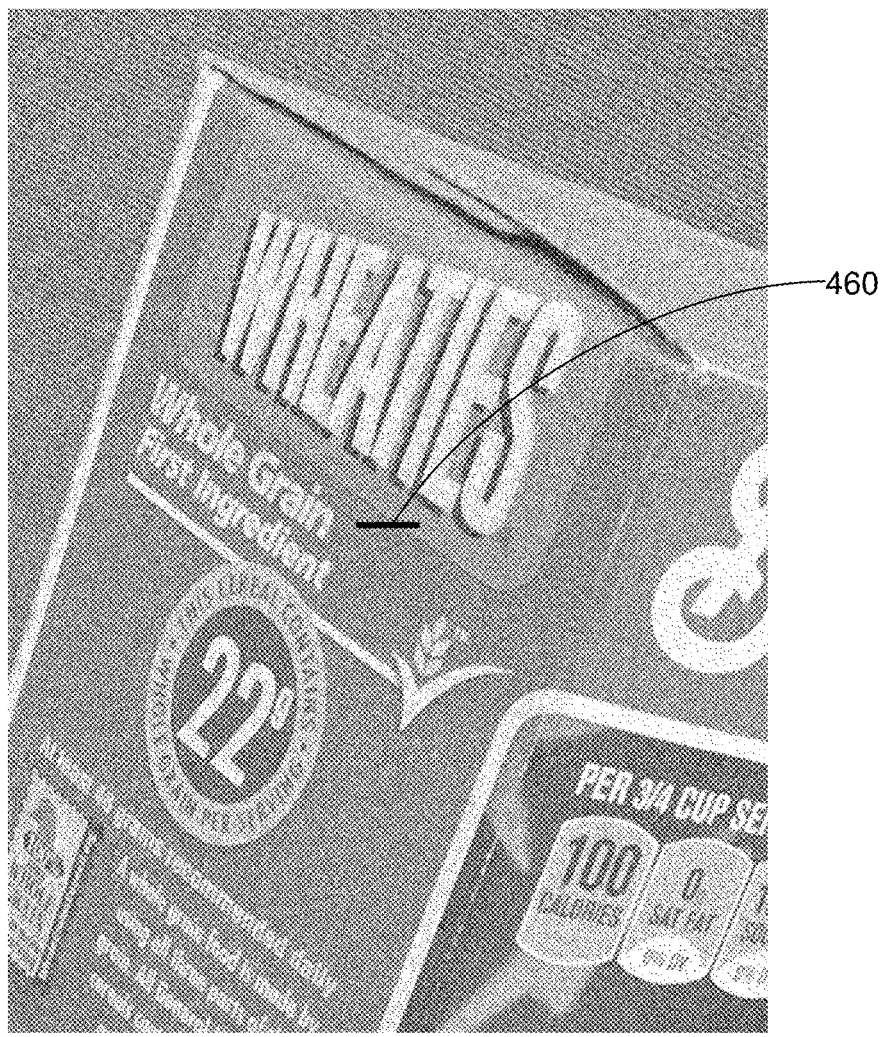
FIG. 46 shows a row of pixel values from a query image.

Instead, in a particular embodiment, a series of query values from a known location within the oct-axis filtered image data (e.g., corresponding to a row or column of 64 pixel values, as shown by the bold line 460 in FIG. 46), is element-wise multiplied by a same-length series of reference data samples values from the memory, and these products are summed, yielding one correlation datum. This operation is repeated, using different series of reference data samples from the memory, to thereby locate one or more sequences of reference data that yield the highest correlations with the oct-axis filtered image query data. (The series of 64 samples of oct-axis filtered image query data may be termed a RasterString.)

Figure 47:
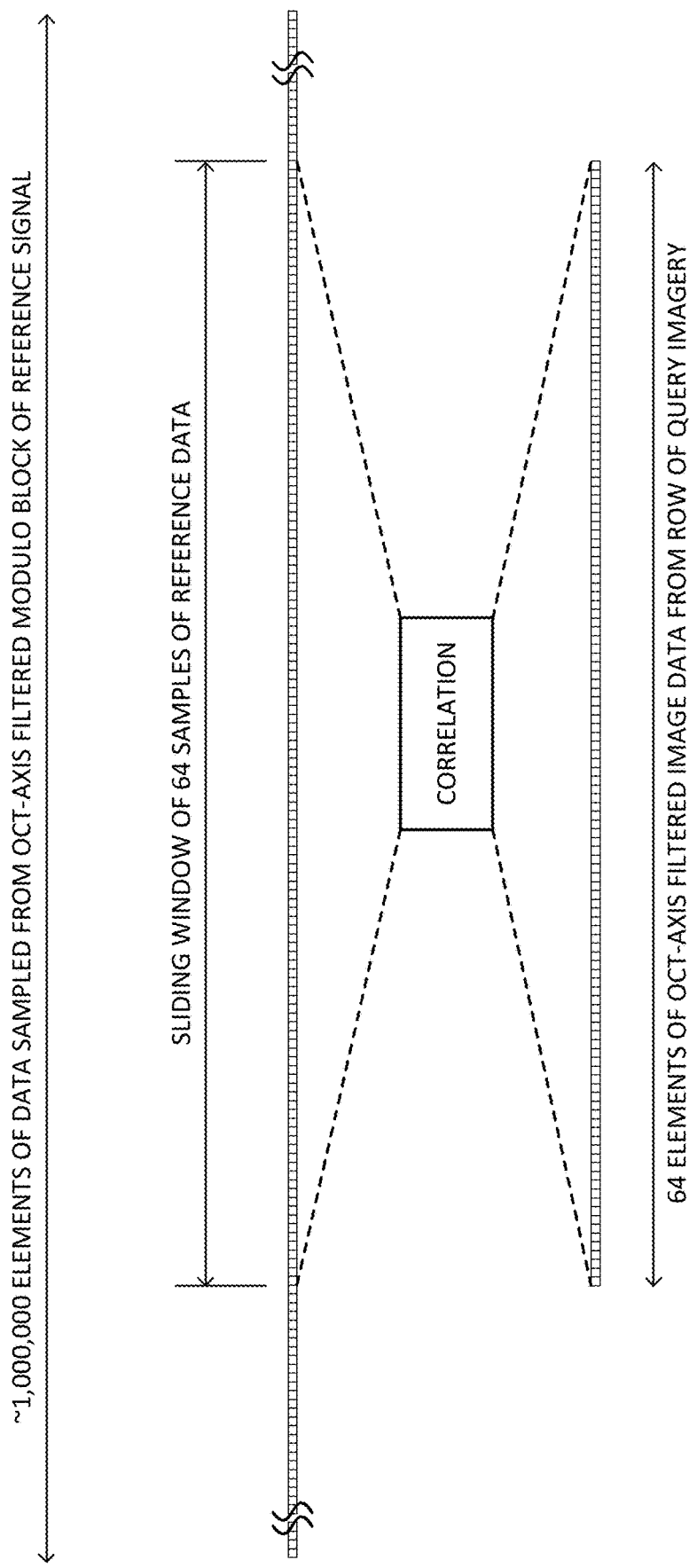
FIG. 47 depicts how a sequence of samples from reference data is correlated with a sequence of samples derived from a query image.

This foregoing operation is depicted by FIG. 47, in which a sliding window of 64 samples from the reference data is correlated with the 64 element RasterString. The sliding window advances one sample, and the operation is repeated—searching for large correlation values.

In an ideal world, the excerpt of reference data that yields the highest correlation with the image query data should correctly identify the pose of the image data, by reference to a particular track through the reference signal block, starting at a particular {x,y} position (measured in waxels, offset from the origin of the watermark signal block), at a particular angle. But to assure better results, the highest N correlations are typically considered, where N is, e.g., 20, 200 or 2000 (or more). Each is associated with corresponding pose information: a particular {x,y} position, and angle. The pose parameters for these N highest correlations are examined for clustering, to establish a consensus determination for x, y and rotation.

Note that scale is not determined in the just-detailed arrangement. The scale of the image is presumed to be the same as the scale of the reference watermark signal block. Only the rotation and offset of the image excerpt is unknown. If scale variability is desired, the above-described sampling of the reference signal block can be performed repeatedly, each time at a different scale increment, e.g., the block modulo-sampled at a scale of 66%, and then at 68%, and so forth up to, e.g., 150%. The sample data can be stored with data indicating the scale value to which it corresponds.

The RasterString query data from the image can then be correlated with each set of reference data, with the best match determining the correct scale.

Alternatively, the sampling increment can slowly vary, as described earlier, e.g., starting by sampling the reference signal blocks at increments of 0.8 waxels, and ending by sampling the reference signal blocks at increments of 1.2 waxels. The sample data is then stored in association with information indicating the then-current sampling increment. The consensus pose determination can then extend to determination of the scale.

In yet another arrangement, the RasterString data generated from the line or column of imagery is interpolated to increase or decrease its scale, e.g., so that is correlated—at one extreme—to 32 samples of reference data, and—at the other extreme—to 128 samples of reference data (instead of a nominal 64 samples of reference data). Differently-scaled variants can then be correlated with the reference signal samples, to identify which scale of image query data yields the highest correlation. Different interpolation factors can be tried, and then can be refined, in binary search fashion, to more accurately refine the scale estimate.

As before, the consensus-best angle and offset (and optionally scale) image pose data determined from correlation with the reference data is passed to the watermark decoder, together with some or all of the image (or its oct-axis filtered counterpart). The decoder then uses this pose data to extract the watermark payload from the image, optionally beginning with further pose refinement analysis.

A particular arrangement is next described in further detail, employing a ring buffer (sometimes termed a circular buffer).

A ring buffer is a data structure in which the starting and ending memory locations are logically—if not physically—adjacent. They are typically illustrated as circles, although they are usually implemented as a linear array of memory. A pointer serves to identify the location containing the start of the data. A second pointer can be used to identify the end of the data, but in the present case we utilize a ring buffer of 64 locations, and they are always filled, so we can dispense with the second pointer.

Figure 48A:
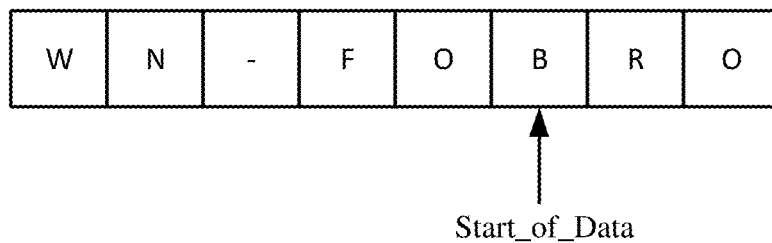
FIGS. 48A-48E show different states of data in a ring buffer.

FIG. 48A shows an 8 location ring buffer, through which the text "THE QUICK BROWN FOX JUMPED OVER THE LAZY DOG" is streaming. A Start_of_Data pointer shows the start of the data currently in the buffer (i.e., "BROWN-FO").

Figure 48B:
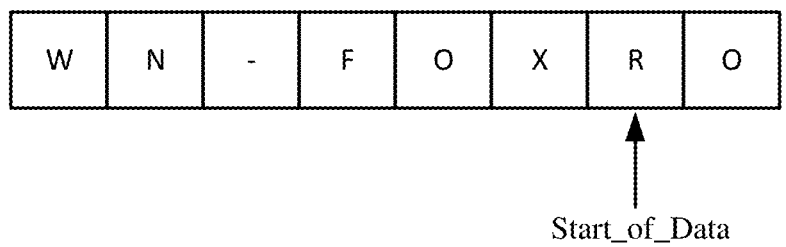

At the next phase of operation (e.g., the following clock cycle), the next character in the data stream ("X") is received, and overwrites the oldest datum in the memory "B." This overwriting occurs where the Start_of_Data pointer was just located. The pointer is advanced one position to indicate the new start of data. This state of affairs is shown in FIG. 48B.

Figure 48C:
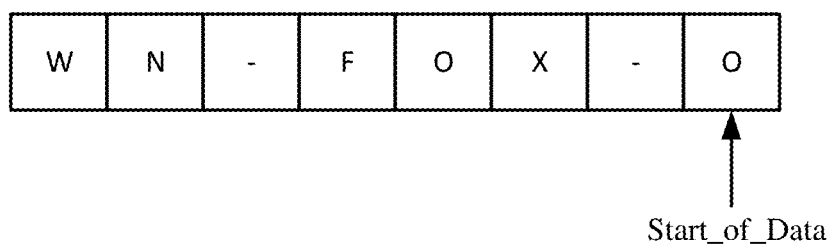
Figure 48D:
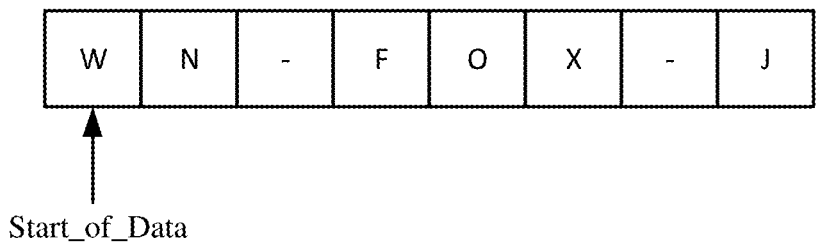
Figure 48E:
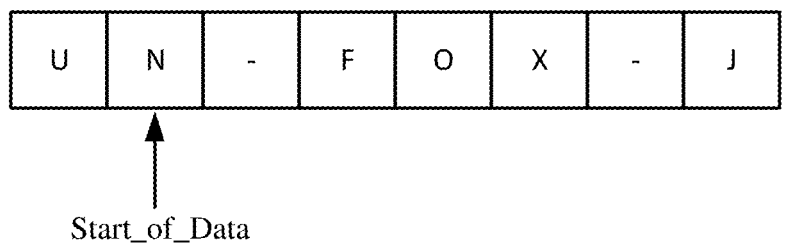
Figure 49A:
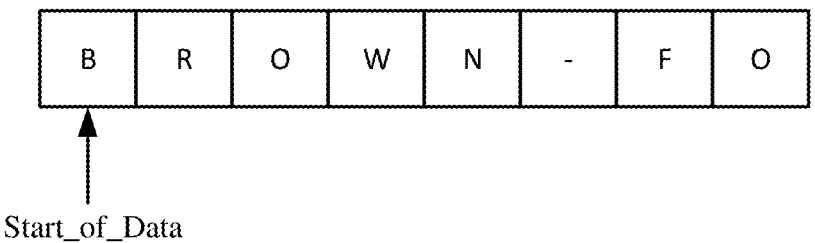
FIGS. 49A-49E show a logical view of the data shown in FIGS. 48A-48E.
Figure 49B:
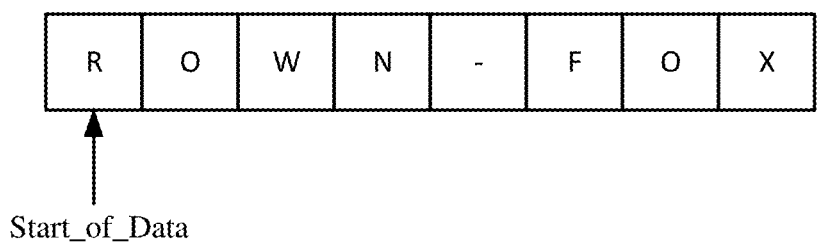
Figure 49C:
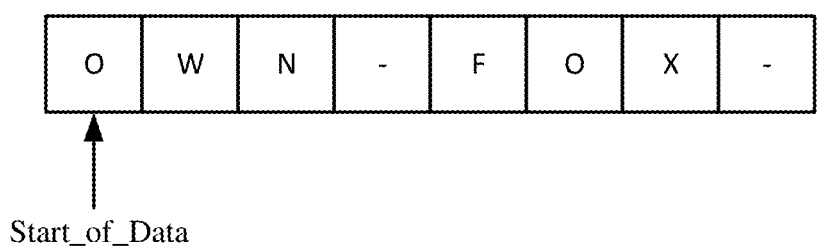
Figure 49D:
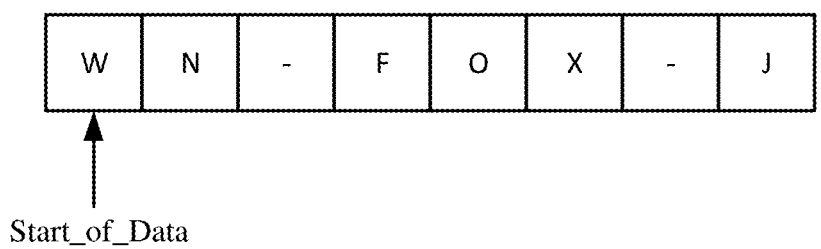
Figure 49E:
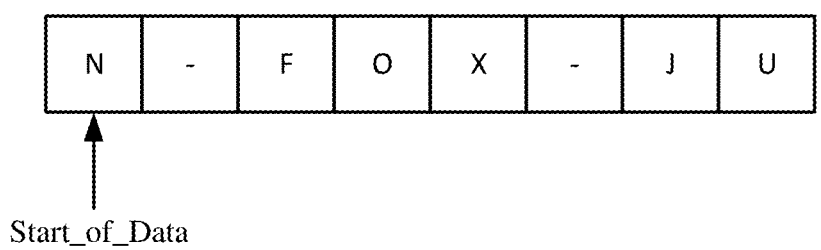

Operation continues in this fashion, with the buffer receiving successive elements of the data stream—each overwriting the oldest data previously in the buffer, and the Start_of_Data pointer advancing accordingly, as shown in FIGS. 48C-48E. When the end of the physical memory locations is reached, new data continues to be entered starting at the physical beginning of the buffer, and operation continues.

It will be recognized that the data values are physically stationary in the buffer. Once written (e.g., the "X" introduced to the buffer in FIG. 48B), the data persists for 8 successive phases of operation (e.g., clock cycles), until new data overwrites it. Yet in a logical sense, if the pointer is taken as the start of the logical memory, then data marches through the buffer. This is shown in FIGS. 49A-49E, which correspond, respectively, to FIGS. 48A-48E, but which depict a logical view of the data, as determined by the Start_of_Data pointer.

Figure 50:
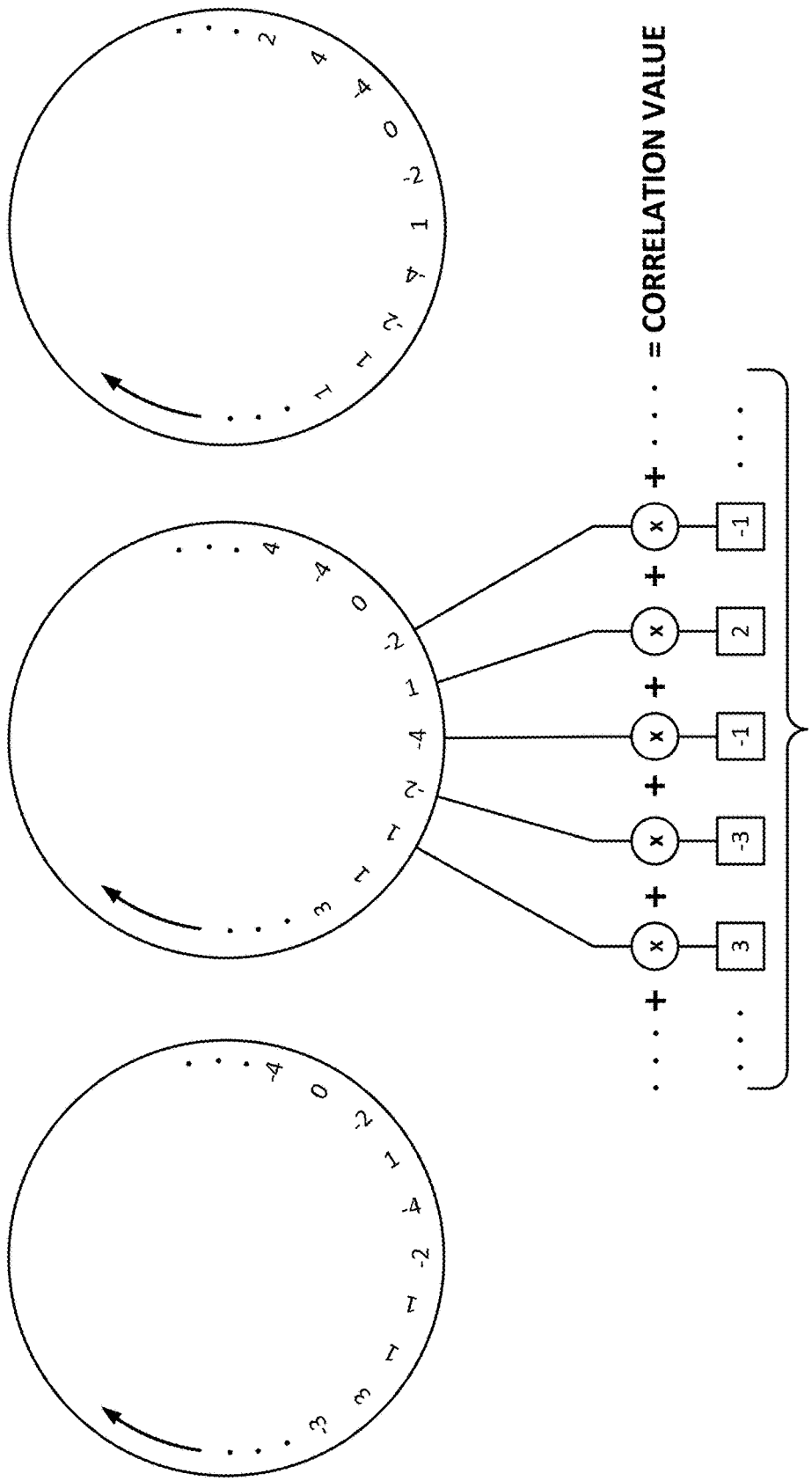
FIG. 50 illustrates correlation using a ring buffer, at successive clock cycles.

FIG. 50 shows the correlation operation, using the ring buffer. Three buffers are shown, showing the logical location of the reference data immediately before, at, and immediately after the illustrated correlation operation (e.g., at successive clock cycles). While the reference data logically moves around the ring buffer, the RasterString data is stationary and unchanging.

Since the RasterString data and the reference data are typically oct-axis processed, and have a limited number of states, e.g., {−4, −3, −2, −1, 0, 1, 2, 3 4} in the depicted embodiment, a lookup table can be employed in lieu of actually performing multiplications on corresponding reference and RasterString data, with the two operands indexing a location where their product is stored, to obtain their product.

Figure 51:
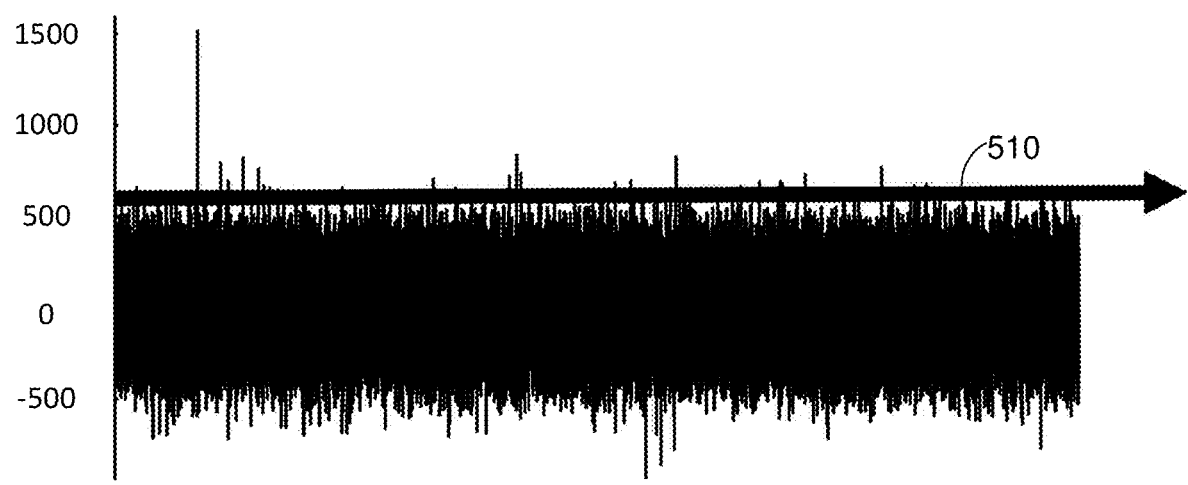
FIG. 51 shows a sequence of correlation values produced by the arrangement of FIG. 50.

For each set of 64 successive samples of reference data, a correlation value is produced. FIG. 51 shows a plot of the first few thousands of these correlation values. A threshold value 510 is heuristically determined, and for those correlations above this value, corresponding pose data is sent to a software module that performs a cluster analysis. (As noted, there may be tens, hundreds, or thousands of correlation peaks exceeding this threshold value.)

Although not plotted, the corresponding rotations, X-offsets and Y-offsets associated with some of these correlation peaks will cluster (since there may be several instances of reference data that nearly match the query data), and pose data for other cluster peaks will scatter (since some high correlation peaks will occur as a matter of random happenstance). To separate this chaff from the wheat, the foregoing analysis is repeated second, third and further times, with second, third and further excerpts of image-based query data (i.e., further RasterStrings), as shown at 522, 523, etc., in FIG. 52. These further RasterStrings are the same length as original excerpt 460 (i.e. corresponding to 64 image pixels) and are typically adjoining, e.g., taken from adjacent rows (or columns) of the image.

Again, some of the resulting pose data will be consistent, and other of it will be scattered. But since the further pose data corresponds to parallel lines in the imagery, the correct pose information will tend to emerge—identified by a regularity due to the regularity of the parallel image excerpts.

In particular, pose data corresponding to some of the peak correlations in these successive query excerpts all share the same rotation (since they are taken from a small patch depicting a planar object that rotates as a unit). In the depicted example, the pose data corresponding to these correlation peaks share almost the same x-translation. But they differ, in their y-translation—each line being one pixel trace removed, in the y-dimension, from the predecessor.

Figure 52:
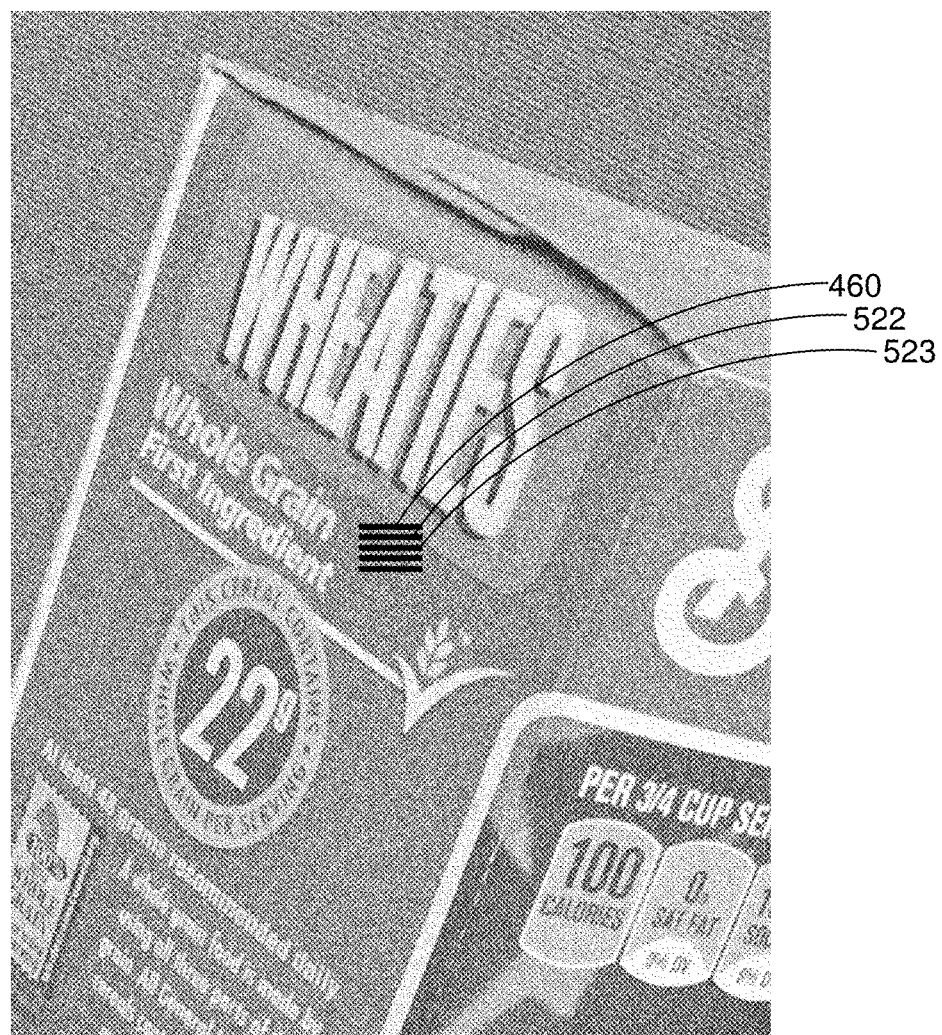
FIG. 52 shows plural rows of pixel values from a query image.
Figure 53:
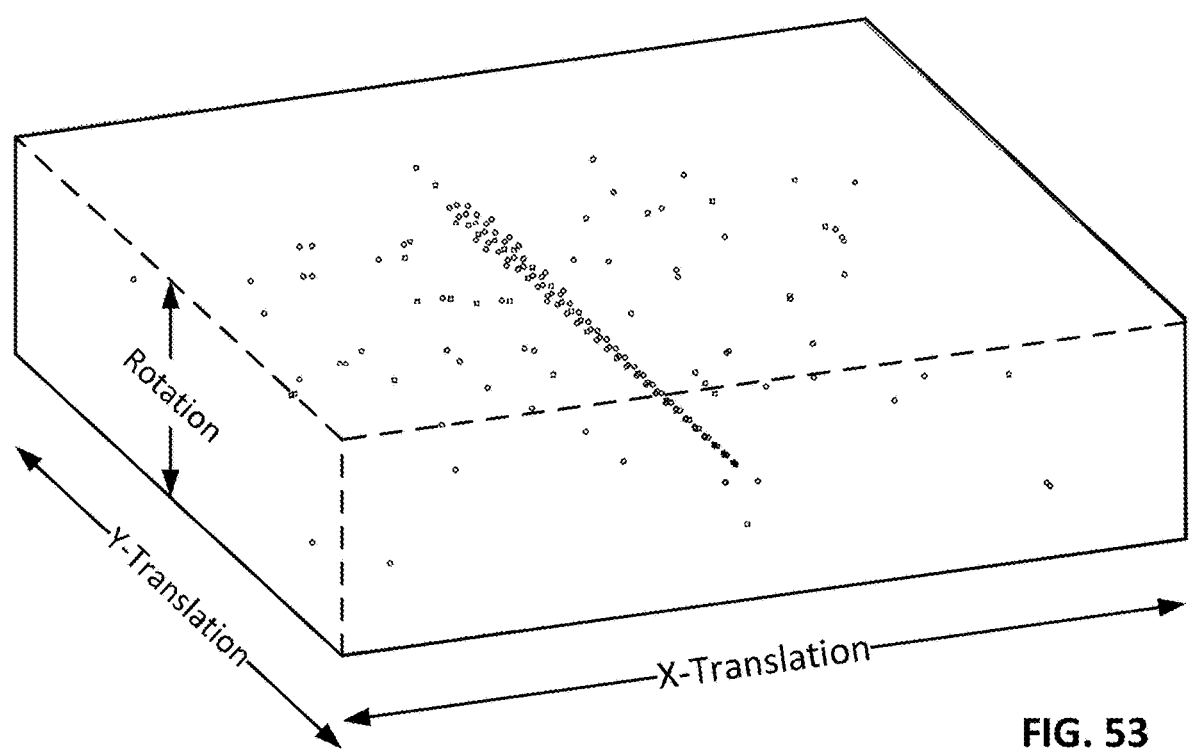
FIG. 53 shows pose clustering that can be discerned from processing the plural rows shown in FIG. 52.

A graphical representation of the clustering is shown in FIG. 52, which plots the x-offset, y-offset, and rotation corresponding to each of the correlation peaks that exceeds the threshold. The evident clustering, with consistent rotation and x-translation, makes plain the correct pose of the parallel query lines 460, 522, 523, etc. (i.e., the pattern of similar poses traversing the 3D pose space), due to the linear arrangement of a subset of the pose data in the 3D space.

The methods described earlier can be used to identify, and refine, the clustered pose data—looking for improbable coincidences of data among randomness.

If memory is limited, then it is not necessary to modulo-sample the reference signal block in advance—repeatedly sampling across different tracks at different angles, compiling a million or so reference data. Instead, these sample points, along these different tracks, can be generated on-the-fly, as needed, and provided to the ring buffer for correlation with the RasterString.

On-the-fly generation of the sample data can be achieved by storing discrete values within the reference signal, and interpolating between them. For example, in a 32×32 waxel reference signal block, the value of the signal can be computed at grid points separated by one waxel vertically and one waxel horizontally, and stored in memory. If the on-the-fly need happens to be for a value at exactly one of these 1024 points, the corresponding value can be directly read-out. More commonly, the needed value is at some location in-between four of these discrete points. A 2×2, or more typically a 4×4, interpolation kernel can be applied to the neighborhood of 4, or 16, discrete values surrounding the desired location. The kernel weights are set in accordance with the position of the desired sample point within the central four points. With a few multiplies and adds, an interpolated reference signal value at the desired position is thereby produced.

The processes described above are well suited for compact implementation in hardware. The small number of operations required (64 multiplications and adds per cycle to determine the correlation value) enables implementation with a small number of gates. The oct-axis data that is typically processed has nine states {−4, −3, −2, −1, 0, +1, +2, +3, +4}, but by a further innovation, this data can be represented by just three bits. In particular, when a value of "0" would otherwise be represented, the system can randomly assign either a value of −1 or +1, thereby averaging out to zero in net effect. The hardware gate count drops commensurately with the drop in data size, from four bits to three.

The detailed arrangement also lends itself to hardware parallelization. In one embodiment, the million or so points of reference data are not examined, in one long sequence, for correlation with the RasterString. Instead, it is divided into excerpts, and the excerpts are processed in parallel.

Figure 54:
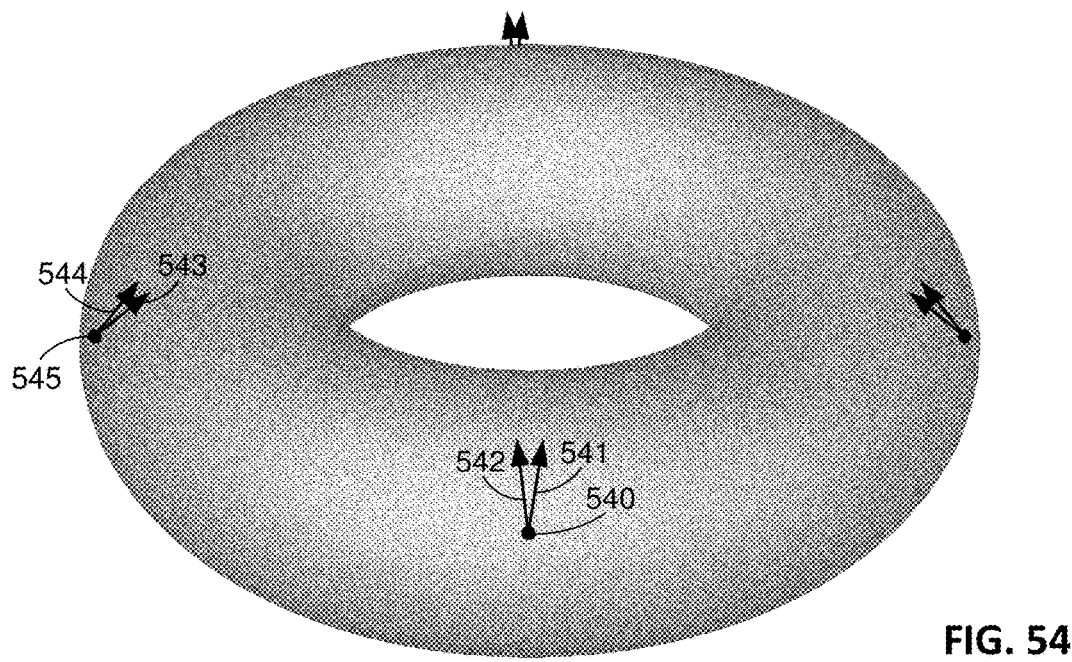
FIG. 54 shows that different RasterStrings from a torus may be processed in different threads.

Referring to the torus of FIG. 54, one thread of operation correlates the query RasterString with reference data obtained by sampling the reference signal from a point 540 on the equator of the torus-wrapped reference signal, and proceeding up and to the right in coiled fashion. A second thread of operation can correlate the RasterString with reference data obtained by sampling the reference signal from point 540 in the opposite direction, proceeding up and to the left.

A second pair of such threads 543, 544 can start from a second point 545 that is 90 degrees around the torus. Four further threads can correlate the RasterString with data generated by sampling the reference block (torus) with points at 180 and 270 degrees around the equator. By this, or other such parallelizations, image pose can be determined that much more quickly.

It will be recognized that the detector's operation on successive rows or columns of imagery makes it well suited for implementation in, e.g., printer drivers and scanner drivers, which commonly process imagery in successive sets of horizontal image lines.

Concluding Remarks

Having described and illustrated the principles of the technology with reference to illustrative embodiments, it should be recognized that the technology is not so limited.

For example, the sampling paths needn't be spaced exponentially. Instead they can be spaced, e.g., linearly, or otherwise.

Likewise, assignment of affine state data to elements of the 2D template needn't be based on elements at the lower right corner of patch regions. Any reference position can be used; the center and upper left corners are other common choices.

Similarly, the precise placement of the query image data within a zero-filled template (for transformation by an FFT and multiplication with the transformed template 73') isn't critical. Different placements can be used.

While the detailed embodiments employ an FFT transform (and an inverse FFT transform), in other embodiments, different transforms may be used.

Naturally, the size of the 2D template (65,536×2048), the range of rotation angles (0°-360°) and the range of scale states (90%-110%), etc. can be varied as best fits the requirements of particular applications. For example, another embodiment employs a template of 8,192×1024, with a 180° range of rotation angles, and scale states varying from 82% to 121%, with the first sampling arc having a radius of 2143.217 waxels. Of course, the size of the query excerpt from the captured imagery can be made larger or smaller, as particular circumstances may dictate.

In most embodiments, sampling of the calibration signal to yield the template 73 produces a number of data points exceeding, by an order of magnitude or more, the number of elements found in a block of the calibration signal within the query imagery. For example, if a block of the calibration signal is 128×128 waxels, then the number of data points in the template 73 is typically an order of magnitude greater than 128×128, i.e., greater than 163,840. Commonly, the number of sampled points is still larger. Sampling of a signal to yield more values than the signal block has elements, by a factor of 50 or more, is termed "hyper-sampling" (or "hyper-sampled") herein.

Oct-axis processing of the tiled signal and the query excerpt is not necessary. Any form of filtering that attenuates the host imagery from the latter can be employed. Some such alternatives, and many variants of oct-axis processing, are detailed in the predecessor application Ser. No. 15/641,081.

In some embodiments, no filtering is employed. An excerpt of raw image pixels (optionally converted into greyscale) can be correlated with a template of raw watermark signal (or 1D reference data), and a ranked list of top candidate peaks can be generated, and processed as detailed above. Additionally, or alternatively, watermark decoding can be tried based on different of the candidate pose data in the ranked list until one decoding effort succeeds, or a threshold number of attempts (e.g., 10) is tried without success.

As noted, any tiled signal can be processed in the detailed manner. Watermark calibration signals are typically consistent despite variations in payload signals. Some classes of watermarks may also have portions of their payloads that are consistent, despite other portions that are varying. Any such consistent signal, or combination of consistent signals, can be used.

While the description commonly focused on watermarks using both positive and negative tweaks to signal values (e.g., representing chrominance or luminance), the technology is likewise applicable to marking arrangements that make tweaks in only a single direction. Sparse watermarks, of the sort that may be formed by thermal printers, are an example. (See, e.g., pending application Ser. No. 16/002,989, filed Jun. 7, 2018, which is incorporated herein by reference.)

Reference was made to globally-curved, locally-flat, data in the template. The globally-curved aspect refers to the fact that boundaries between sampled signal block data include curved paths (as shown in the right pane of FIG. 9). The locally-flat aspect refers to the fact that, since matching from the template is based on relatively small excerpts from this template, distortions due to these curves are modest enough to still permit detectable correspondence with rectilinear arrays of data samples (e.g., corresponding to a square excerpt of query image-related data).

A rough measure of curvature of the component quadrilaterals in the right pane of FIG. 9 is the largest percentage by which the length of one side of a quadrilateral exceeds the length of the opposite side. For the circled quadrilateral in FIG. 9, for example, this value is 18%. Also relevant is the ratio of sizes between the rectilinear excerpt for which a match is sought, and the size of the signal block represented by the quadrilateral in the template. For instance, when attempting to match a 48×48 data element excerpt based on a captured image, with a 128×128 element signal represented by the quadrilateral, this ratio is 0.383. The product of these two values, 18% and 0.383, is 6.75%. This value is small enough to be regarded as locally-flat (as would still higher values, such as 10%).

The segmented approximation of curves, e.g., as shown in FIG. 42, is also regarded as globally-curved (and non-straight)—despite the absence of any curve in a strict sense.

To read a payload from a watermarked image excerpt, the existing Digimarc watermark detector warps an oct-axis-processed version of the query image excerpt so as to geometrically match the scale, rotation, and x/y offset of the watermark calibration signal. By so doing, the 128×128 element array of waxels in the image (or oct-axis data), in which the payload is conveyed, is properly registered and can be read.

If one corner of the query image excerpt is properly aligned, the opposite corner can be mis-registered ("off") by about one waxel, and the watermark will still read correctly (thanks, in some measure, to forward error correction). This indicates another metric of "locally flat." That is, if the curved sampling arcs 18 shift one waxel or less to the left, in the course of traversing the first watermark block on the horizontal axis (e.g., the block 14 of FIG. 4), then the resulting template can be said to be locally-flat.

The just-noted metric holds true for query image regions having a size equal to the watermark block size, or larger. For smaller query regions, having a maximum dimension spanning N waxels (e.g., the 48×48 pixel example), a similar metric may be based on the size of N. That is, if the curved sampling arcs 18 shift one waxel or less to the left, in the course of traversing the first N waxel rows of the tiled signal, then the resulting template can be said to be locally-flat.

Of course, the best test of locally-flat is whether the sampled data in the template is good enough to produce useful correlations with query image-related (e.g., oct-axis) data. If it is, then it is locally-flat enough.

(The phrase "generally orthogonal" is sometimes used to refer to 2D sampling, e.g., in the template, that is locally-flat.)

While the illustrated embodiments have generally concerned 2D implementations, it will be recognized that the same principles can be extended to three or more dimensions. In one such embodiment, the template has three dimensions, which may be regarded as comprising multiple templates 73 stacked together. One of these layered templates is like the template described above—produced by sampling tiled square signal blocks (or a single block in modulo fashion) to produce a template having dimensions corresponding to scale and rotation. Others of these layered templates may be produced by sampling distorted versions of the signal blocks, e.g., with different degrees of tip/tilt, perspective, or cylindrical distortion, etc.—again with the two dimensions corresponding to scale and rotation. Correlation proceeds as described above. However, the 2D query image data is here zero-padded to yield a 3D array, which is transformed to the frequency domain and element-wise multiplied with a counterpart of the 3D template in that transform domain. The result is inverse-transformed back into the original domain, and the resultant peaks indicate the position of greatest correlation between the query data and the template—in this case possibly indicating that the greatest correlation occurs in one of the template layers corresponding to some type of distortion.

It will be recognized that, in generating the template, the 2D image signal is sampled in two generally orthogonal directions. In one direction, the angular direction (i.e., the vertical direction in FIG. 4), the samples are typically spaced equally. In the other direction, the radial direction (i.e., the horizontal direction in FIG. 4), the samples are typically not spaced equally. For example, they may be spaced exponentially. (Both uniform and exponential spacing may be regarded as forms of "regular" spacing, in the sense that each has a constant, definite pattern.)

In the illustrated embodiments, it will be understood that regular samples are taken along straight lines in one dimension (the radial dimension), and are taken along non-straight lines in the other dimension (the angular dimension).

Just as the sampling paths (arcs) needn't be uniform, neither do the array of blocks. Irregular arrangements of blocks—including some distorted and/or some not—can be employed.

It will be understood that aspects of certain embodiments commonly require interpolation, e.g., between available samples of signal data. Suitable interpolation methods employ bi-cubic and spline-based approaches. As noted, applicant employs a different interpolation method, "patternSupped," detailed in Appendix 12-N. In this method, the first and second derivatives are continuous.

Machine learning methods can be employed to perform various of the decision-making detailed above, such as finding locations in the template to which excerpts of image data best match, and judging consistency among candidate sets of affine data.

In a variant embodiment, the query excerpt is placed at an initial position in the template, and an error signal—indicating divergence between the query excerpt and the template patch it overlays—is generated. This error signal is applied to a lookup table that indicates a row and column offset from the current location, within the template, to which the query excerpt should be moved, and the process repeated. By such process, a match between the query excerpt and a corresponding patch of template data, can be iteratively determined in a few steps, without resort to any domain transformation (and inverse-transformation).

In one such embodiment, the data in the lookup table is generated by an intensive process that takes excerpts from a tiled watermark signal—of random size, orientation, and location, and places each randomly on the template. An error signal is generated, which can be a matrix of size equal to the dimensions of the query data excerpt (based on element-wise differences between the query data excerpt and the elements of the template over which each element overlays). Each of these query excerpts is also analyzed by the earlier-detailed methods to determine the location in the template to which it best corresponds. An offset from the thus-determined matching location, and the random placement location, is stored in the lookup table in association with the error signal.

(In such a procedure, the template location to which the excerpt is initially mapped can be fixed, e.g., the upper left corner of the template, with a top of the edge aligned with the top of the template, and likewise with the left edge. So the initial offset data can all be related to this initial template location. Data for other template locations is called into play only in second and following phases of operation, as the excerpt is iteratively moved to different locations.)

It is not practically possible to perform this operation for all possible affine states of the query data, placed at all possible locations in the template. However, a sparse sampling of such data can be generated. A convolutional neural network can use such data as training data, and learn to predict (estimate) an offset that should be indicated when unfamiliar data is presented.

While the specification referred to the detailed pose determination methods as the preamble to a watermark decoding operation, other arrangements are possible. For example, a prior art watermark locating and/or decoding operation can be applied to imagery and, if the watermark payload is not successfully recovered (e.g., as indicated by CRC bits), then a pose determination method as detailed above is attempted. Watermark decoding can then be re-attempted, based on the pose indicated by the present method.

Similarly, the present technology needn't provide just a single pose estimate to a watermark decoder. A ranked list of candidate poses may be provided, and the watermark decoder can employ each, in turn, as a starting point for its own operations (which may include further refinement of each candidate pose—such as by the bit error metrics indicated above).

In most embodiments, the calibration signal is high-pass filtered prior to sampling to create the template 73. The query image excerpt is similarly high-pass filtered. As used herein, "high-pass" does not require frequencies above a threshold to be passed without attenuation. Nor does it require that frequencies below the threshold to be completely attenuated. Rather, this term means that lower-frequency image energy is reduced more than higher-frequency image energy. (As noted, oct-axis and Wiener filters are examples of high-pass filters.)

It should be emphasized that the present specification should be read as an elaboration of the predecessor specification, Ser. No. 15/641,081. Methods and applications detailed in that application can be used in conjunction with the technology detailed herein, and vice versa.

One example taught in the predecessor application is that the affine state information determined by applicant's technology can be put to uses other than decoding steganographically-encoded digital watermark data. For example, such data can be used for photogrammetry—making measurements from captured image data. Distance is one such measurement. Distance can be directly derived from the "scale" parameter discussed above, assuming the dimension of the calibration signal block is known. Any camera can thus become a range-finding camera. Still further, accurate characterization of pose can be used in augmented reality—to overlay visual augmentations over a depiction of a physical scene.

In some watermark-decoding applications, pose-state information that is still finer than that provided by one of the above-described arrangements may be required. If so, known iterative techniques can be applied to further refine the pose estimate. For example, watermark payloads are typically encoded with forward error correction schemes that allows bit error rates to be determined. One parameter (e.g., y-translation) of the initial pose estimate can be perturbed by a small increment (e.g., a half or a tenth of a waxel), and the bit error rate checked—did it increase or decrease? Likewise with other parameters. Successive perturbations, with reference to changes in the bit error rate, allow the affine state information to be successively refined to an arbitrary degree of precision. Applicant sometimes refers to such a process as a spider—venturing in different directions, looking for better outcomes. (Such a routine is detailed in the Appendix A code, e.g., beginning at line 430, and also in Appendices K and L. Such a method is also employed in Applicant's patent publication 20170193628, which is incorporated herein by reference.)

The algorithms detailed above can be implemented in a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of the above-detailed processes on a microprocessor—such as the process of performing the zero-filling and Fourier domain transformation on the query data, performing the multiplication in the Fourier domain, performing the inverse-FFT, checking for consistency between sets of affine data, spidering, etc.—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to perform pose estimation, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

An ASIC-based particular implementation of the above-detailed methods, e.g., for the process of performing the zero-filling and Fourier domain transformation on the query data, performing the multiplication in the Fourier domain, performing the inverse-FFT, checking for consistency between sets of affine data, spidering, etc.—begins by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semi-conductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of each of the above-detailed algorithms begins by authoring the algorithm in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, the calibration signal can be defined by parameters stored in a re-writable memory. By such arrangement, the same ASIC may be incorporated into two disparate devices, which employ different calibration signals. One may be a point of sale scanner for reading watermark-encoded product identifiers hidden in grocery item packaging—which looks for a calibration signal comprised of one particular constellation of spatial frequency signals. A second may be an age verification terminal (e.g., at a liquor store) for reading watermark-encoded birthdate information hidden in a driver's license—which looks for a calibration signal comprised of a second, different constellation of spatial frequency signals. The chips are all identically produced in a single semiconductor fab, but are differentiated in their end-use by different calibration signal data stored in memory (which may be on-chip or off).

Yet another hybrid approach employs application-specific instruction set processors (ASIPS). ASIPS can be thought of as microprocessors. However, instead of having multi-purpose native instruction sets, the instruction set is tailored—in the design stage, prior to fabrication—to a particular intended use. Thus, an ASIP may be designed to include native instructions that serve operations associated with some or all of: oct-axis computation, approximate string searching, etc. However, such native instruction set would lack certain of the instructions available in more general purpose microprocessors.

Reconfigurable hardware and ASH' arrangements are further detailed in application Ser. No. 14/842,575, filed Sep. 1, 2015 (now published as 20170004597), the disclosure of which is incorporated herein by reference.

A preferred mobile implementation employs an Apple iPhone device, running the iOS 11 or later operating system, in which filtering and image processing operations are performed on the device GPU, using the Metal 2 API and the Vision framework, where a common memory serves both the device GPU and CPU. Any machine learning aspects are implemented with Apple's Core ML framework.

The artisan is assumed to be familiar with machine learning methods. Additional information is provided in Applicant's patent applications Ser. Nos. 15/726,290, filed Oct. 5, 2017; 15/149,477, filed May 9, 2016 (now U.S. Pat. No. 10,180,339); 62/556,276, filed Sep. 8, 2017; 62/456,446, filed Feb. 8, 2017; 62/426,148, filed Nov. 23, 2016; 62/418,047, filed Nov. 4, 2016; 62/414,368, filed Oct. 28, 2016; 62/404,721, filed Oct. 5, 2016; 61/861,931, filed Aug. 2, 2013; and in published application 20150055855.

Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, etc., in conjunction with associated data.

Machine learning arrangements can be implemented with software tools such as cuda-convnet, cuda-convnet2, Nvidia's cuDNN, Berkeley's Caffe, and Google's TensorFlow.

Hardware support for CNNs is now being included in various chipsets (such as the latest Qualcomm Snapdragon 820 series processors which contain Neural Processing Units (NPUs), which facilitates implementation of CNN functionality on various devices. Cadence and others are providing stock IP hardware designs (e.g., the Vision P5 and P6 DSPs) optimized for CNN applications.

Software and hardware configuration data/instructions are commonly stored as instructions in one or more data structures conveyed by tangible media, such as magnetic or optical discs, memory cards, ROM, etc., which may be accessed across a network.

Different of the functionality can be implemented on different devices. Thus, it should be understood that description of an operation as being performed by a particular device (e.g., a point of sale scanner) is not limiting but exemplary; performance of the operation by another device (e.g., a cloud computer), or shared between devices, is also expressly contemplated.

In like fashion, description of data being stored on a particular device is also exemplary; data can be stored anywhere: local device, remote device, in the cloud, distributed, etc.

Additional details concerning watermark decoding are known from Applicant's previous patent filings. Some are referenced in the Background and Summary discussion, above. Others include U.S. Pat. Nos. 8,401,224, 6,975,744, 6,973,197, 6,912,295, 6,345,104, 6,307,949, 6,122,403, 20100150434, 20120046071, 20120078989, 20140029809, 20140108020, 20140119593 and 20150016664, and pending applications Ser. Nos. 14/725,399, filed May 29, 2015 (now published as 20160275639), 14/724,729, filed May 28, 2015 (now published as 20160217547), 15/072,884, filed Mar. 17, 2016 (now published as 20170024840), and 15/237,110, filed Aug. 15, 2016 (now U.S. Pat. No. 10,303, 988). As noted, such watermarks are most commonly imperceptible, meaning they are not noticeable to an untrained viewer examining watermarked packaging from a typical viewing distance (e.g., 20 inches) in typical retail lighting (e.g., 50-85 foot-candles).

Other work by the present Applicant relevant to the subject technology is found in patent documents 20160189381, 20140071268, 20140119593, and 20140029809.

This specification, and its predecessor, have discussed several different arrangements. It should be understood that the methods, elements and features detailed in connection with one arrangement can be combined with the methods, elements and features detailed in connection with other arrangements. While some such arrangements have been particularly described, many have not—due to the large number of permutations and combinations.

Unless an artisan recognizes that combining a feature from one arrangement into another arrangement would render the latter inoperative, then such combination should be regarded as expressly anticipated by this specification.

Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

The invention claimed is:

1. A method comprising:
   processing input imagery with an electronic processor, said processing including high-pass filtering; and
   step for determining one or more pose parameters for a watermark signal included in the processed imagery, using a first set of reference signal data samples mathematically sampled along at least three globally-curved paths from a computer model of the watermark signal.

2. The method of claim 1 in which the first set of signal data is sampled along plural paths that are globally-curved yet locally-flat.

3. The method of claim 1 in which the first set of signal data is sampled at plural different spatial sample spacings.

4. The method of claim 1 in which the sampled data includes a first sequence of three adjacent samples identically-spaced spaced along a curved arc, and a second sequence of three adjacent samples non-identically-spaced along a straight radial line, the first and second sequences having one sample in common.

5. The method of claim 1 that includes:
   sampling a patch of the processed imagery along paths that are globally-curved yet locally-flat, yielding the first set of data;
   transforming the first set of data into a frequency domain, yielding a second set of data;
   multiplying the second set of data with a frequency domain counterpart of a watermark calibration signal, yielding a third set of data;
   inverse-transforming the third set of data to the spatial domain, yielding a fourth set of data; and
   step for determining, from peaks in the fourth set of data, one or more pose parameters for the watermark signal included in the processed imagery.

6. The method of claim 1 that includes:
   using said first set of signal data to generate a coarse estimate for said one or more pose parameters;
   based on said coarse estimate, identifying a second set of signal data, from among plural alternative sets of signal data; and
   generating a finer estimate for said one or more pose parameters using said identified second set of signal data;
   wherein said second set of signal data is also sampled along at least three globally-curved paths.

7. The method of claim 1 in which said step includes approximate matching of 1D strings.

8. The method of claim 1 that includes:
   identifying a linear sequence of data elements from the processed imagery; and
   determining correlation between the sequence of data elements and differently-aligned excerpts of the first set of signal data, the differently-aligned excerpts of the first set of signal data being produced by advancing data from the first set of signal data through a ring buffer.

9. The method of claim 1 that includes:
   identifying a linear sequence of data elements from the processed imagery;
   determining correlation between the sequence of data elements and each of plural differently-aligned excerpts of the first set of signal data;
   testing correlation values produced by said determining operation against a threshold, to identify a set of plural differently-aligned excerpts of the first set of signal data for further consideration;
   identifying pose data corresponding to each of the differently-aligned excerpts in said set, yielding a set of different candidate pose data; and
   determining consensus pose data from said set of different candidate pose data.

10. The method of claim 1 in which said step does not include a domain transformation operation.

11. The method of claim 1 in which the first set of signal data comprises an ensemble of plural spatial domain sine waves, summed and high-pass filtered.

12. The method of claim 1 in which the first set of signal data is hyper-sampled.

13. The method of claim 12 that further includes:
transforming the hyper-sampled first set of signal data into a frequency domain, yielding a second set of data;
multiplying the second set of data with a frequency domain counterpart of the processed imagery, yielding a third set of data;
inverse-transforming the third set of data to the spatial domain, yielding a fourth set of data; and
step for determining, from peaks in the fourth set of data, one or more pose parameters for the watermark signal.

14. A method comprising:
step for sampling a watermark signal to generate a set of reference information, the samples being taken along at least three globally-curved paths, mathematically-sampled from a computer model of the watermark signal; and
storing said set of information in a memory of a camera-equipped point-of-sale apparatus;
wherein said stored information enables the apparatus to estimate pose of a watermark signal included in imagery captured by its camera.

15. The method of claim 14 that includes step for sampling the watermark signal along a spiral-, rather than a circular-, shaped path.

16. The method of claim 14 that includes step for sampling the watermark signal along a coil-, rather than a circular-, shaped path.

17. The method of claim 14 in which one of said at least three globally-curved paths has a slope characterized by a ratio between two prime numbers.

18. The method of claim 14 in which first, second and third of said at least three globally-curved paths each has a different slope, characterized by a different ratio between two prime numbers.

19. The method of claim 14 in which said sampling comprises hyper-sampling.

20. A method comprising:
step for sampling a watermark signal to generate a set of reference information, the samples being mathematically sampled along paths that are globally-curved yet locally-flat from a computer model of the watermark signal; and
storing said set of information in a memory of a camera-equipped point-of-sale apparatus;
wherein said stored information enables the apparatus to estimate pose of a watermark signal included in imagery captured by its camera.

* * * * *